(12) United States Patent
Salerno

(10) Patent No.: US 7,259,953 B2
(45) Date of Patent: *Aug. 21, 2007

(54) METHOD AND APPARATUS FOR MODULAR EMBEDDED CONTROL SYSTEM

(76) Inventor: Mark Salerno, 13 Harmony Rd., Huntington, NY (US) 11743

( * ) Notice: Subject to any disclaimer, the term of this patent is extended or adjusted under 35 U.S.C. 154(b) by 562 days.

This patent is subject to a terminal disclaimer.

(21) Appl. No.: 10/480,069

(22) PCT Filed: Jun. 6, 2002

(86) PCT No.: PCT/US02/18481

§ 371 (c)(1),
(2), (4) Date: Dec. 5, 2003

(87) PCT Pub. No.: WO02/099605

PCT Pub. Date: Dec. 12, 2002

(65) Prior Publication Data

US 2004/0186929 A1    Sep. 23, 2004

Related U.S. Application Data

(60) Provisional application No. 60/296,597, filed on Jun. 7, 2001.

(51) Int. Cl.
H01H 47/00    (2006.01)

(52) U.S. Cl. .................................. 361/171

(58) Field of Classification Search ............... 361/171
See application file for complete search history.

(56) References Cited

U.S. PATENT DOCUMENTS

| | | | | |
|---|---|---|---|---|
| 5,438,180 A | * | 8/1995 | Eisenbrandt et al. | 219/492 |
| 6,080,972 A | | 6/2000 | May | 219/494 |
| 6,879,741 B2 | * | 4/2005 | Salerno et al. | 385/12 |

* cited by examiner

Primary Examiner—Stephen W. Jackson
(74) Attorney, Agent, or Firm—Gerald T. Bodner

(57) ABSTRACT

An embedded control system is provided, which includes a generically applicable computer module, display module, keyboard module, power supply module, and at least one input/output module. The display module is coupled to the computer module by a first communication bus, and the keyboard module is coupled to the computer module by a second communication bus. The power supply module is coupled to the computer module by a third communication bus, and the at least one input/output module is coupled to the power supply module and the third communication bus. The input/output module is adapted for coupling at least one additional input/output module to the third communication bus. The computer module automatically identifies the input/output modules on the third communication bus in response to applying power to the embedded control system. The system is adapted for different applications using software resident in the computer module.

21 Claims, 44 Drawing Sheets

EMBEDDED MODULAR CONTROL SYSTEM TOP LEVEL BLOCK DIAGRAM

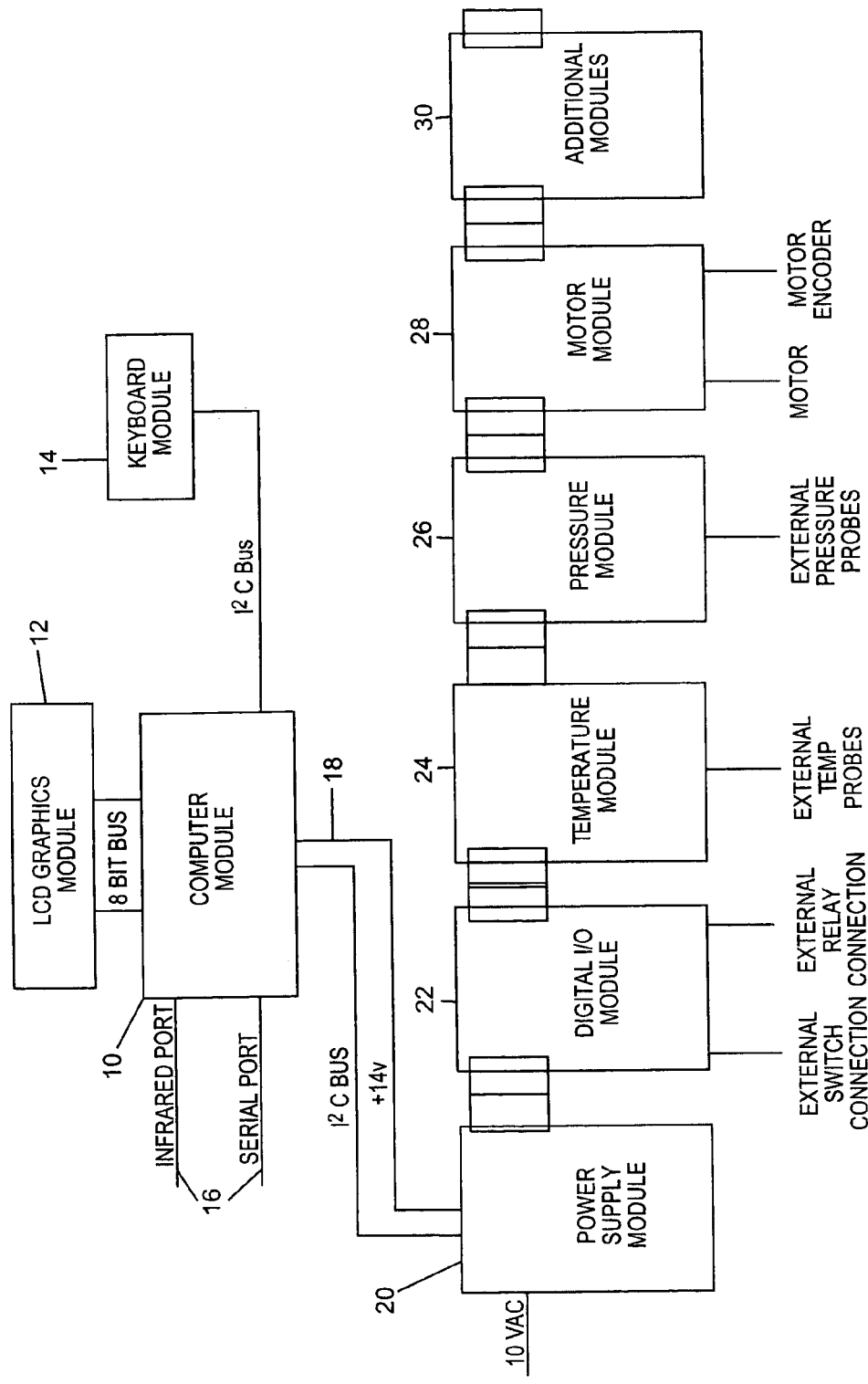
FIG. 1  EMBEDDED MODULAR CONTROL SYSTEM TOP LEVEL BLOCK DIAGRAM

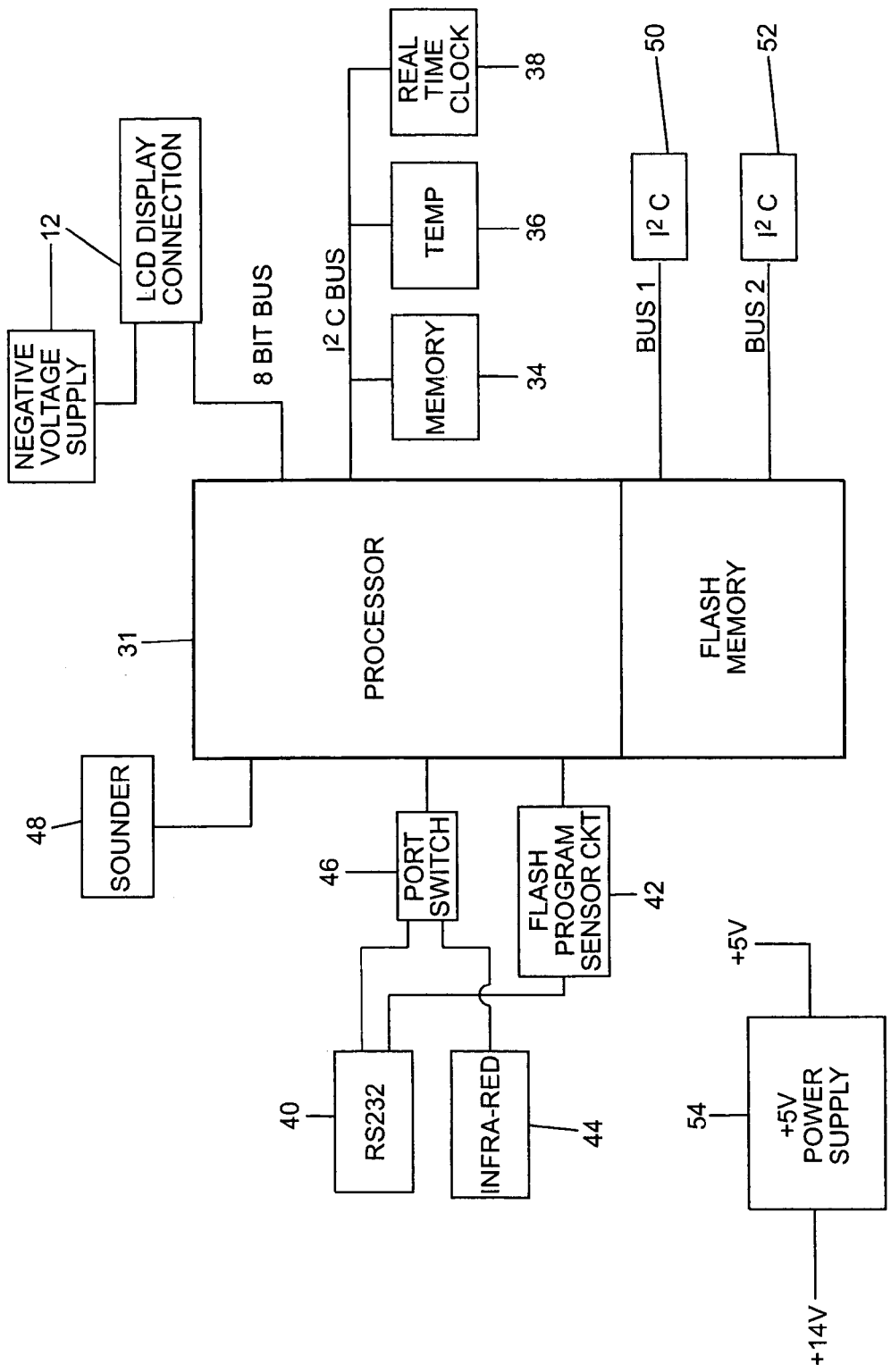
FIG. 2  EMBEDDED MODULAR CONTROL SYSTEM COMPUTER MODULE BLOCK DIAGRAM

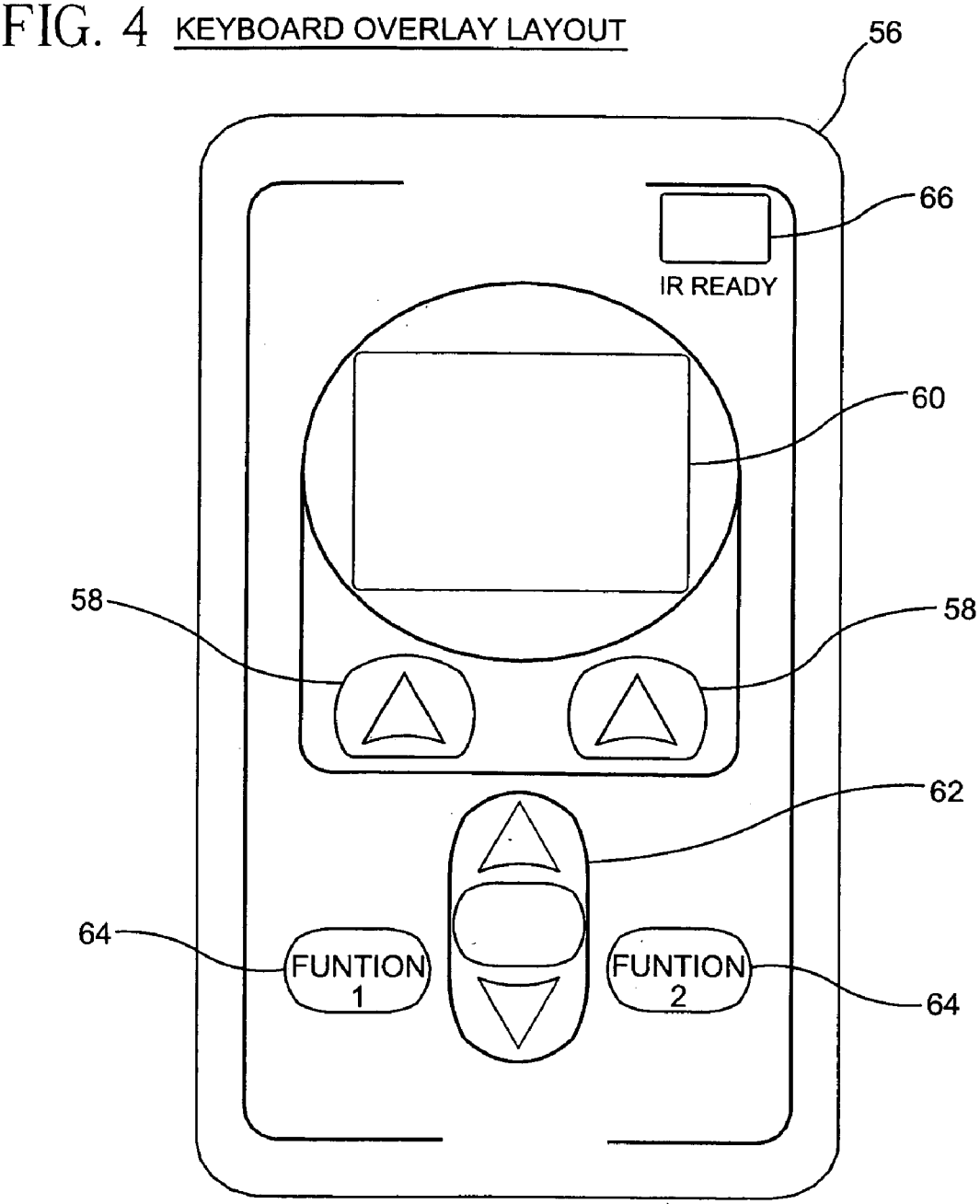
FIG. 4  KEYBOARD OVERLAY LAYOUT

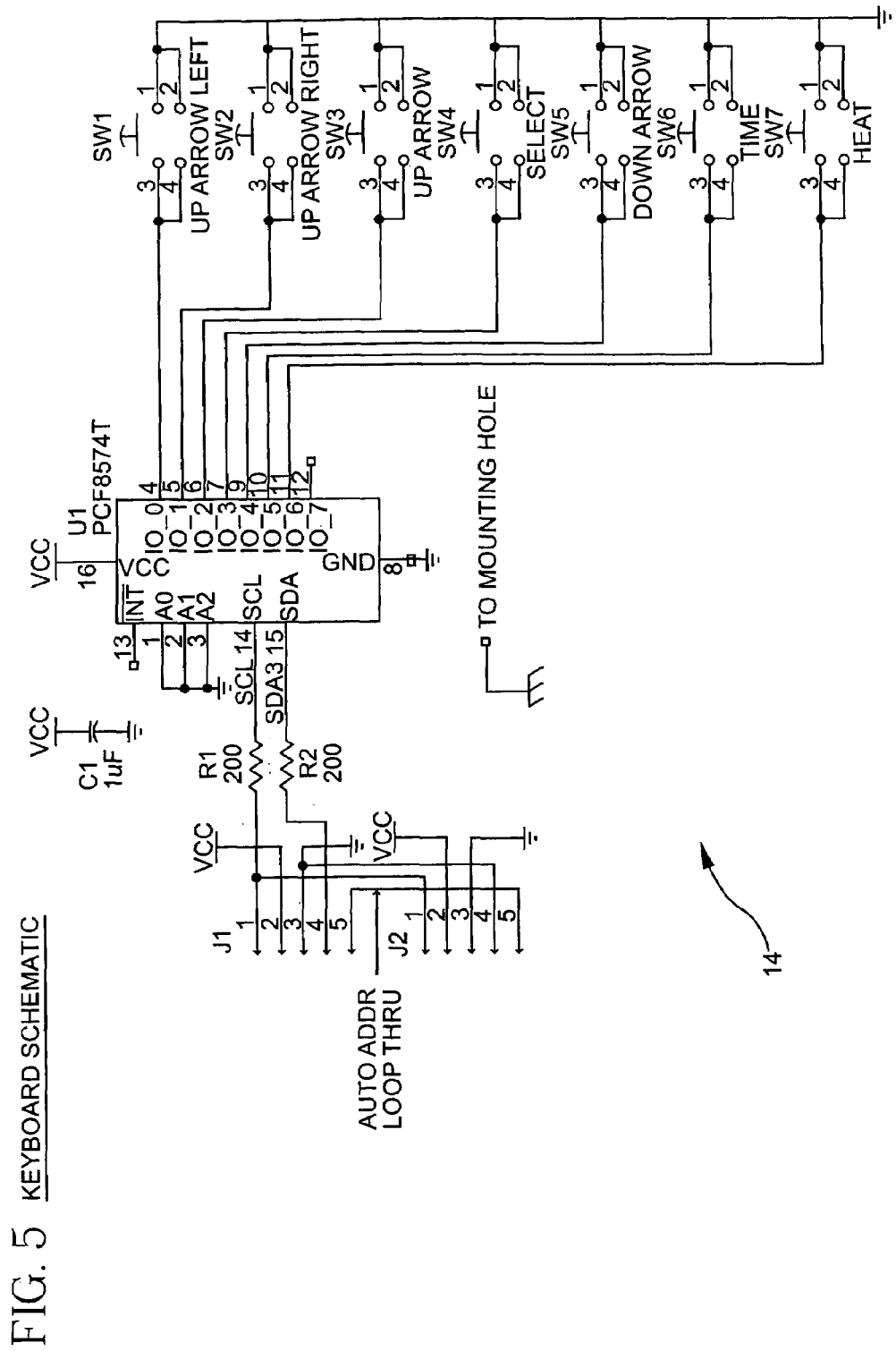
FIG. 5  KEYBOARD SCHEMATIC

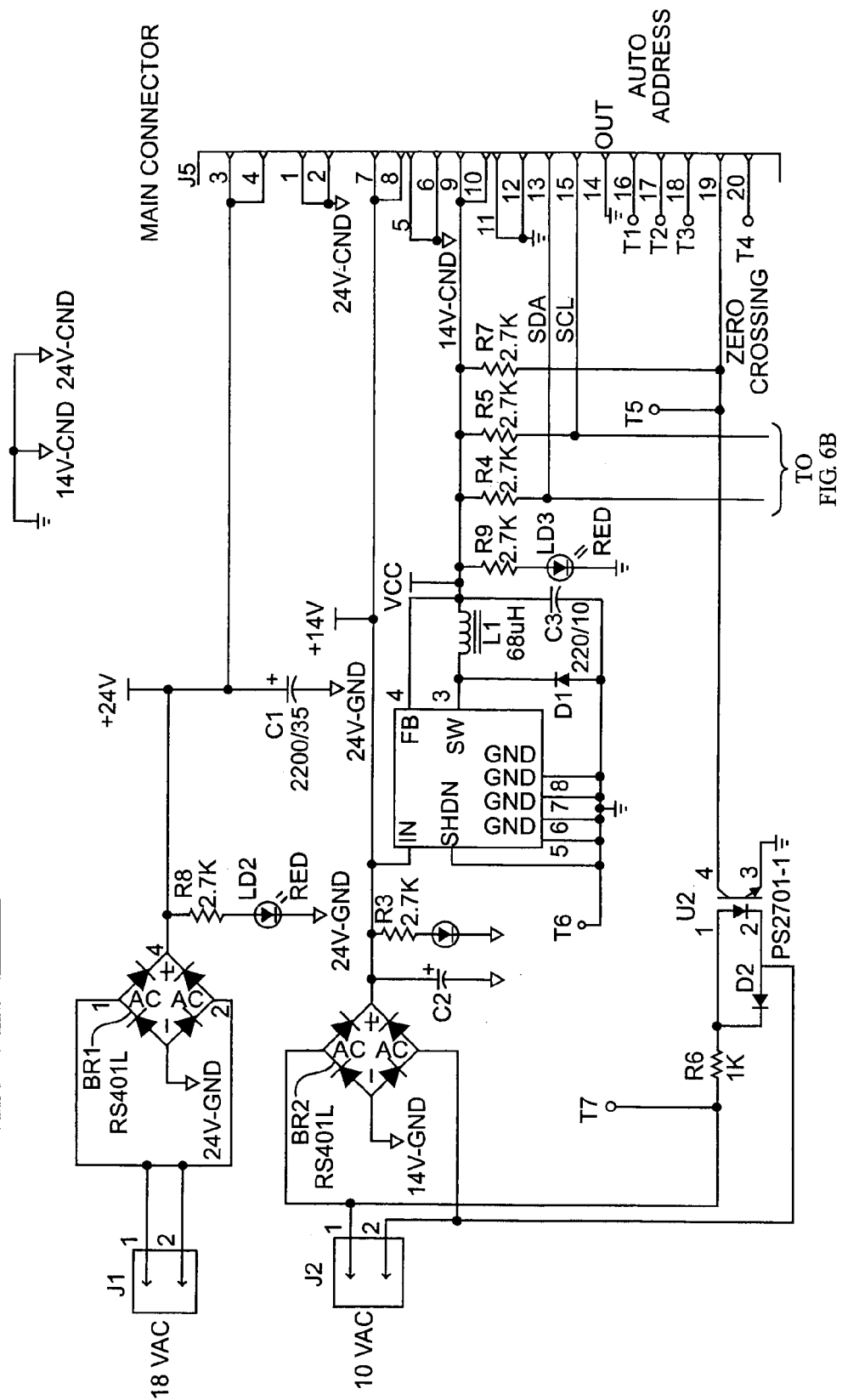
FIG. 6A  POWER SUPPLY SCHEMATIC

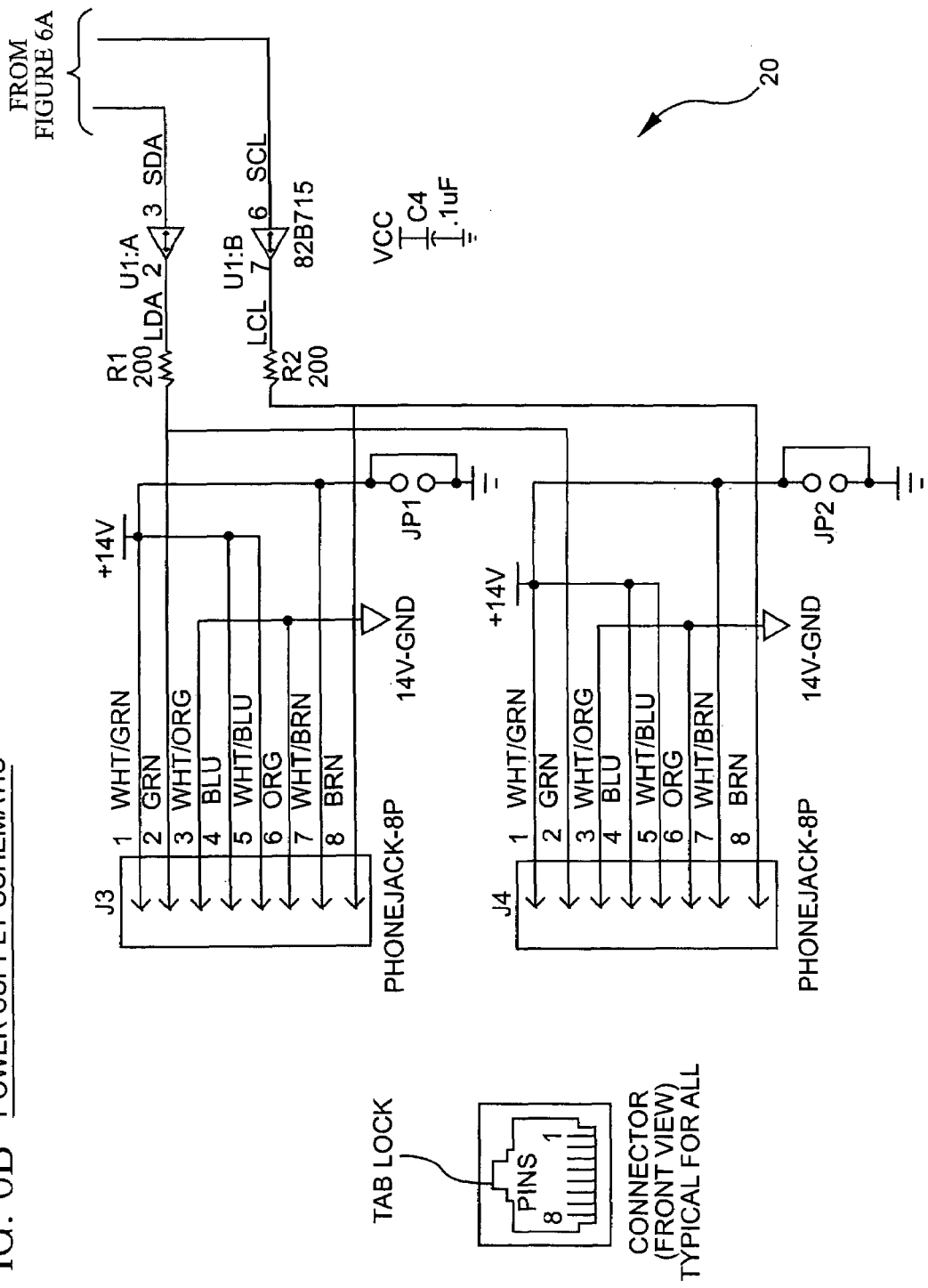
FIG. 6B  POWER SUPPLY SCHEMATIC

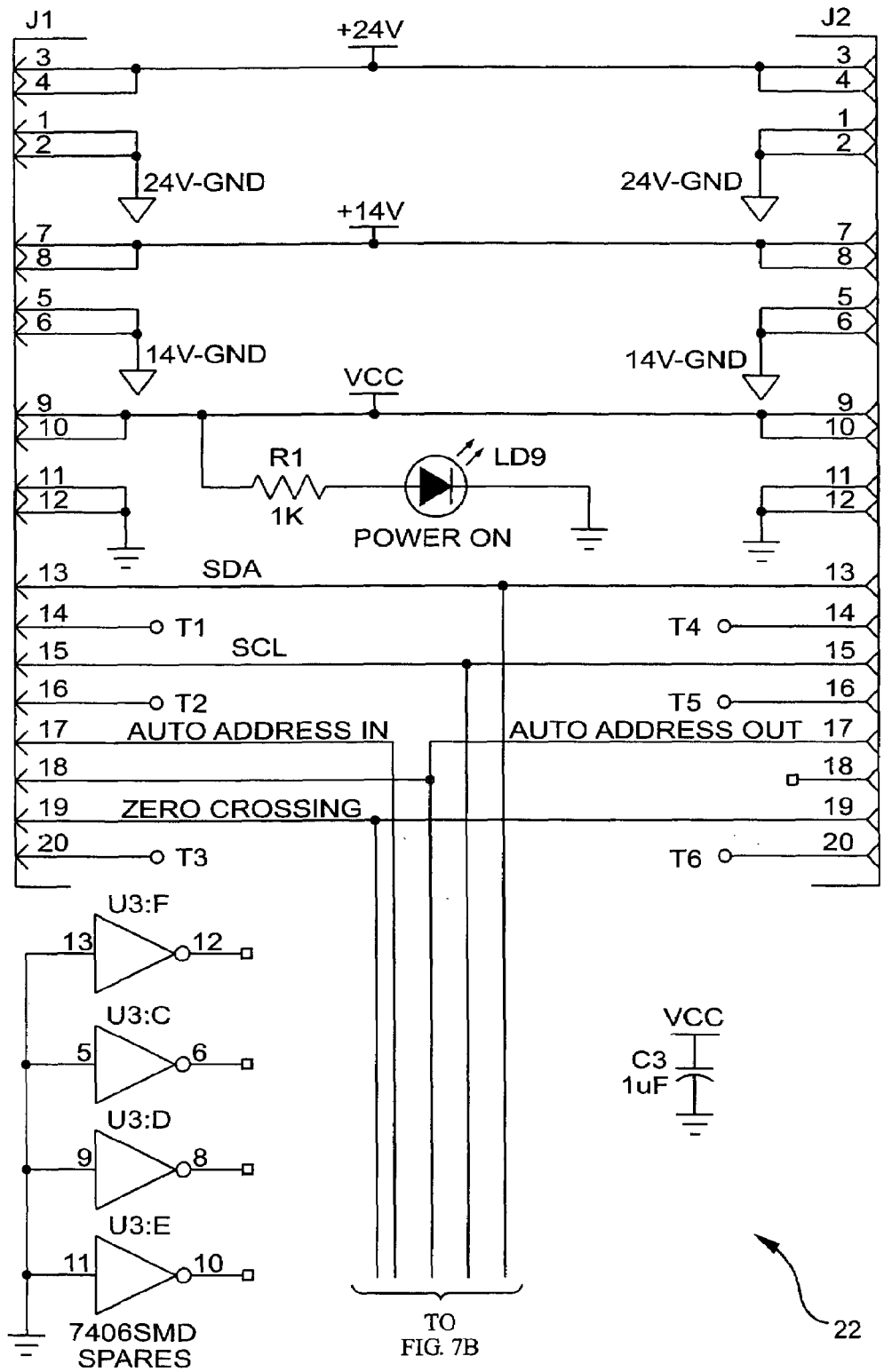
FIG. 7A DIGITAL I/O MODULE SCHEMATIC

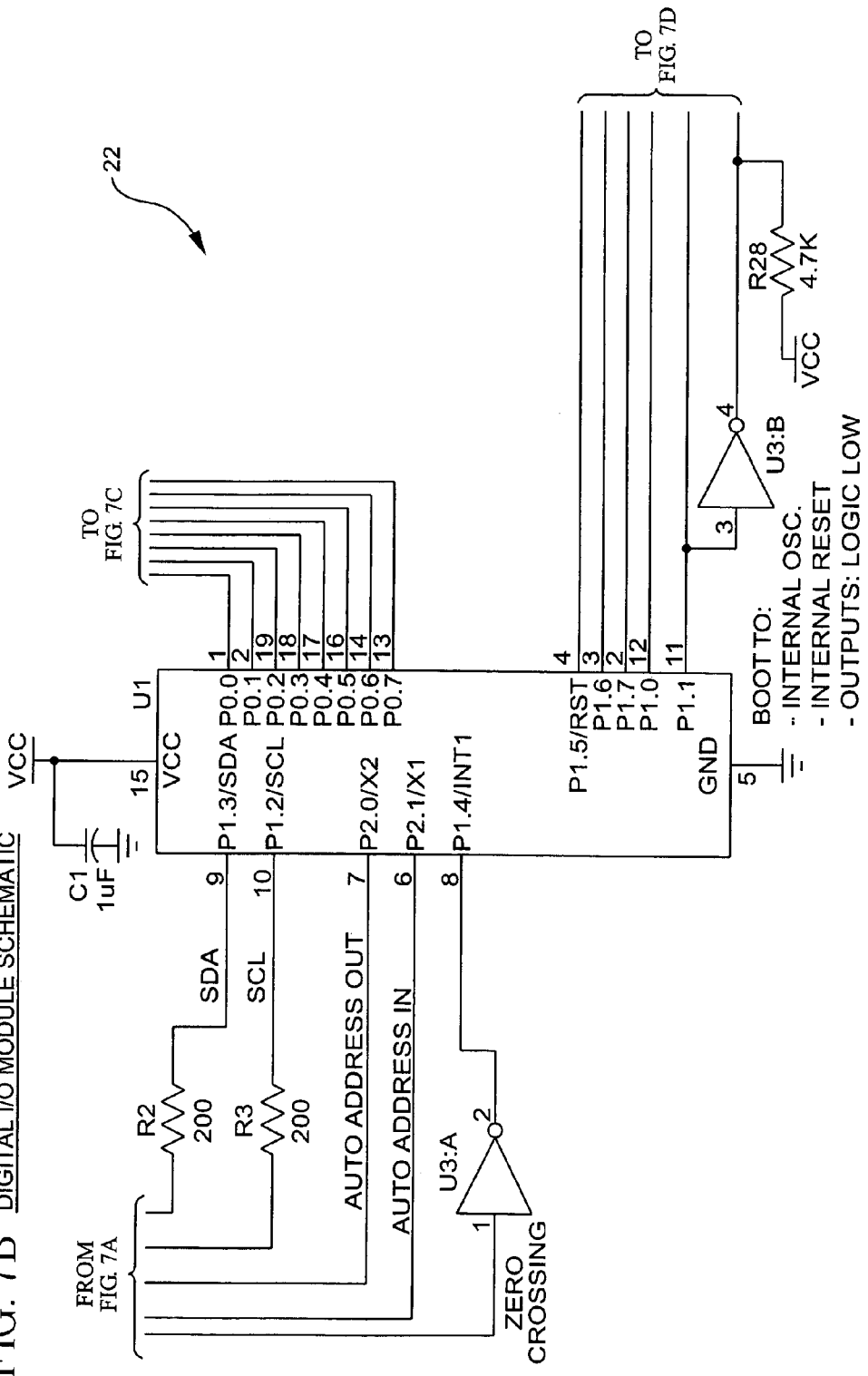
FIG. 7B  DIGITAL I/O MODULE SCHEMATIC

FIG. 7C  DIGITAL I/O MODULE SCHEMATIC
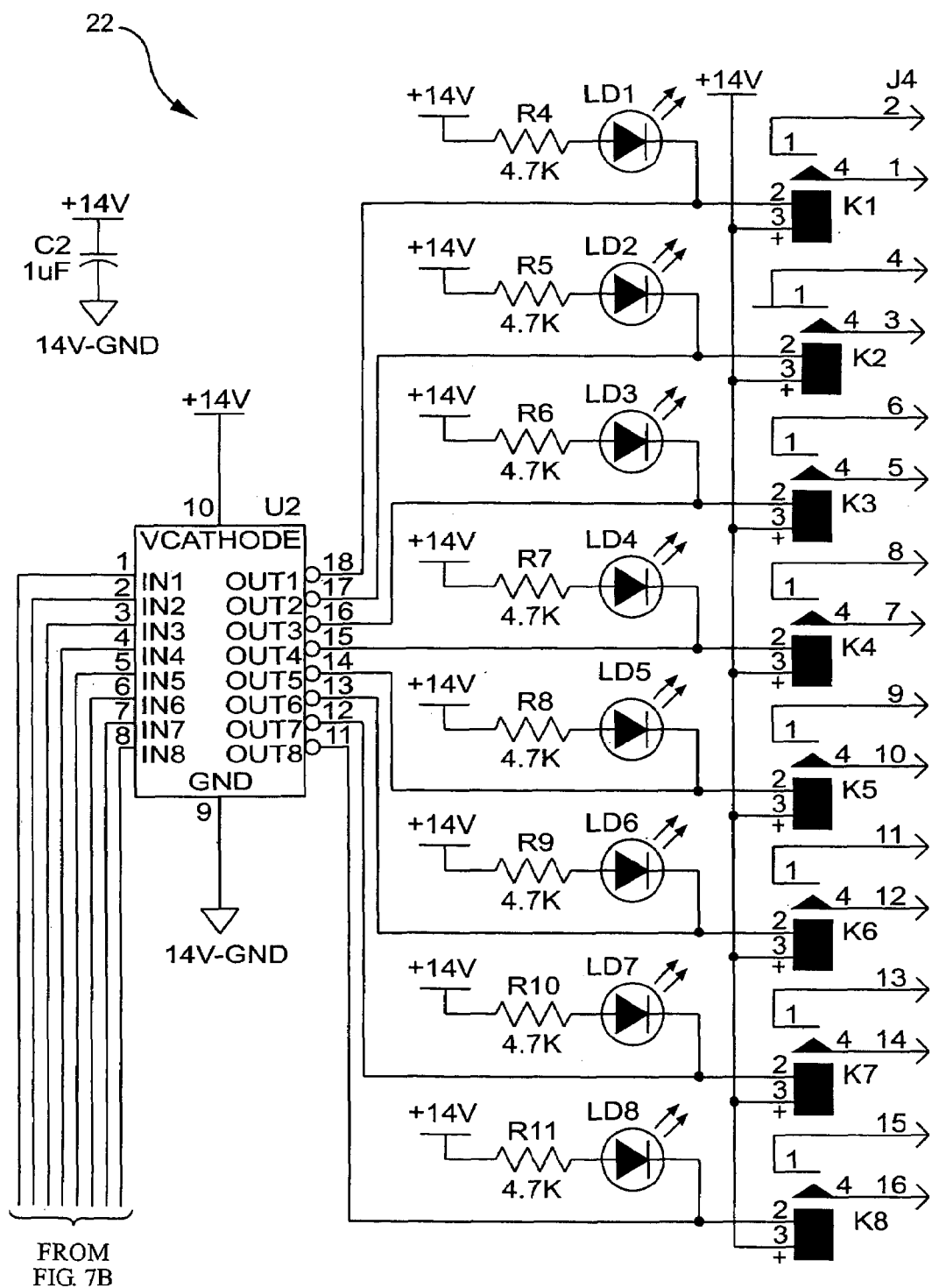

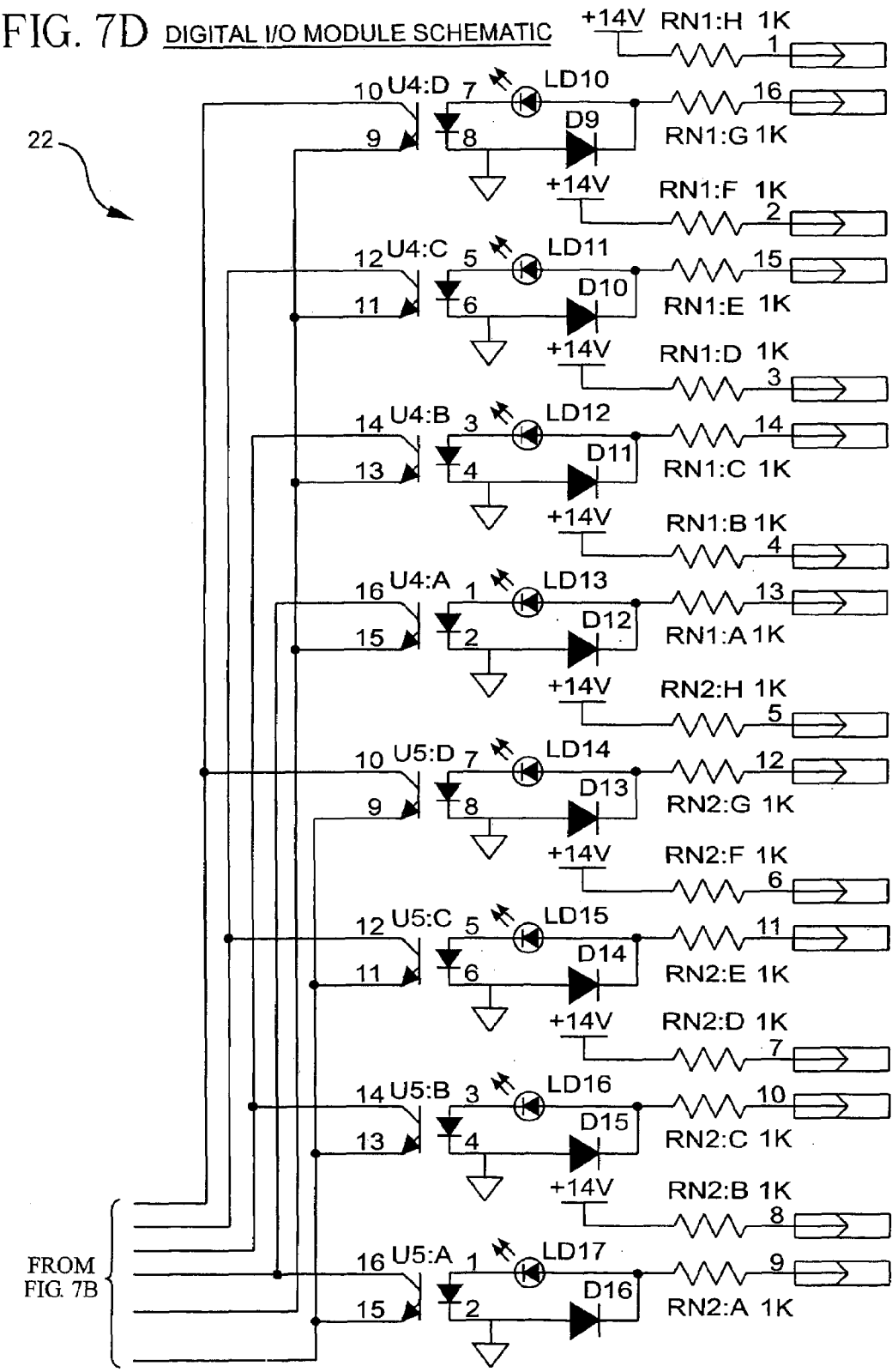
FIG. 7D DIGITAL I/O MODULE SCHEMATIC

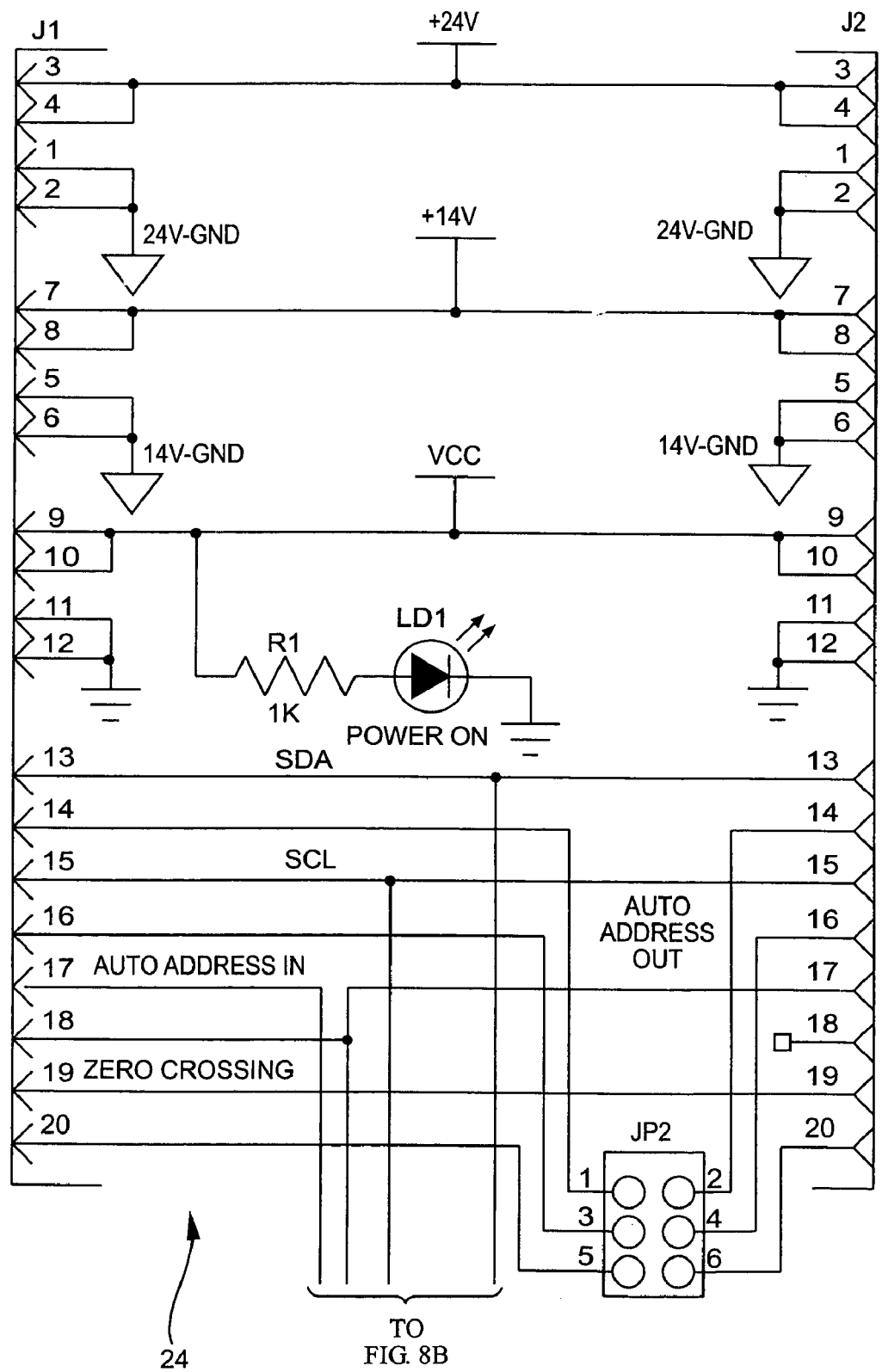
FIG. 8A  TEMPERATURE SENSOR MODULE SCHEMATIC

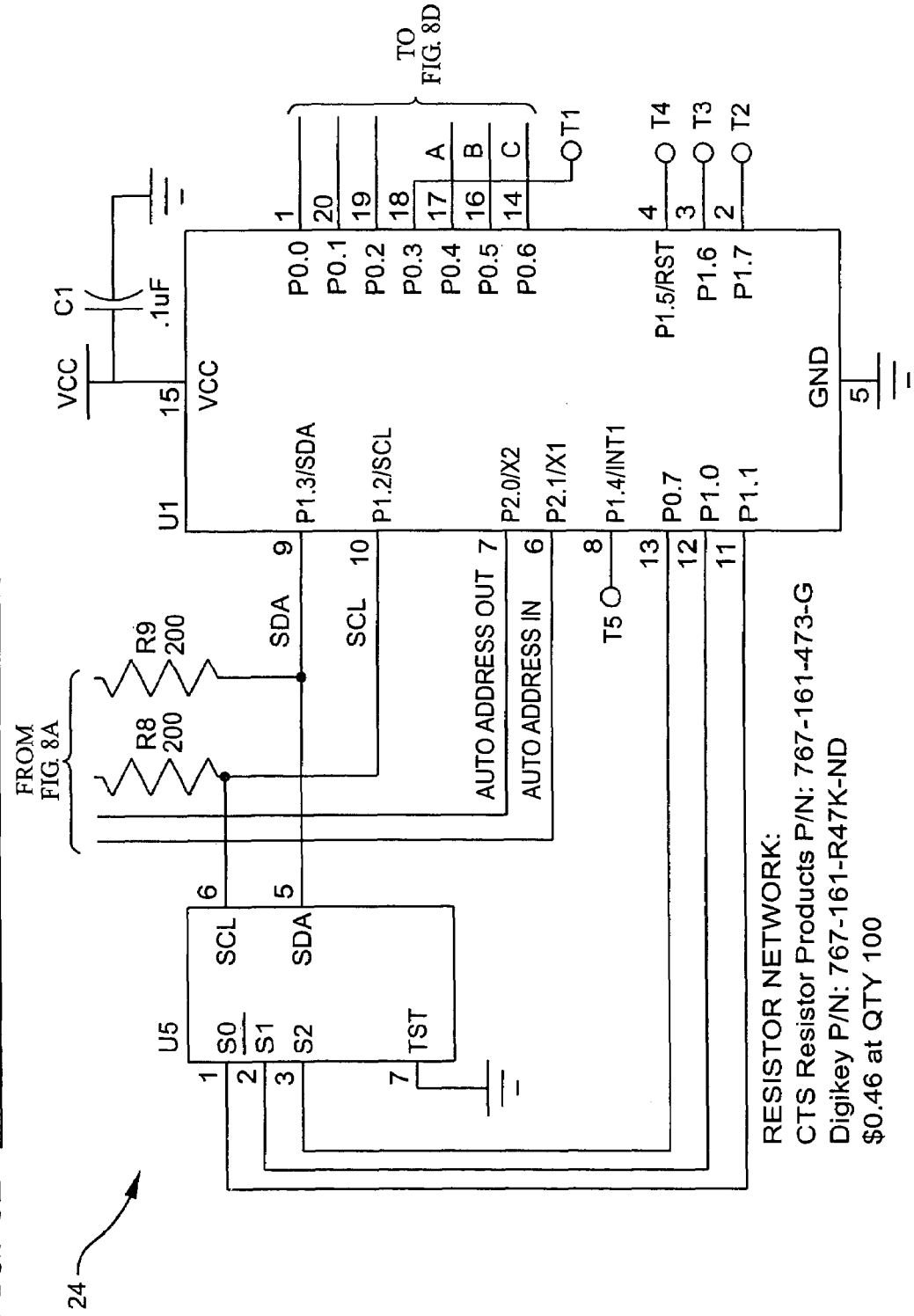
FIG. 8B TEMPERATURE SENSOR MODULE SCHEMATIC

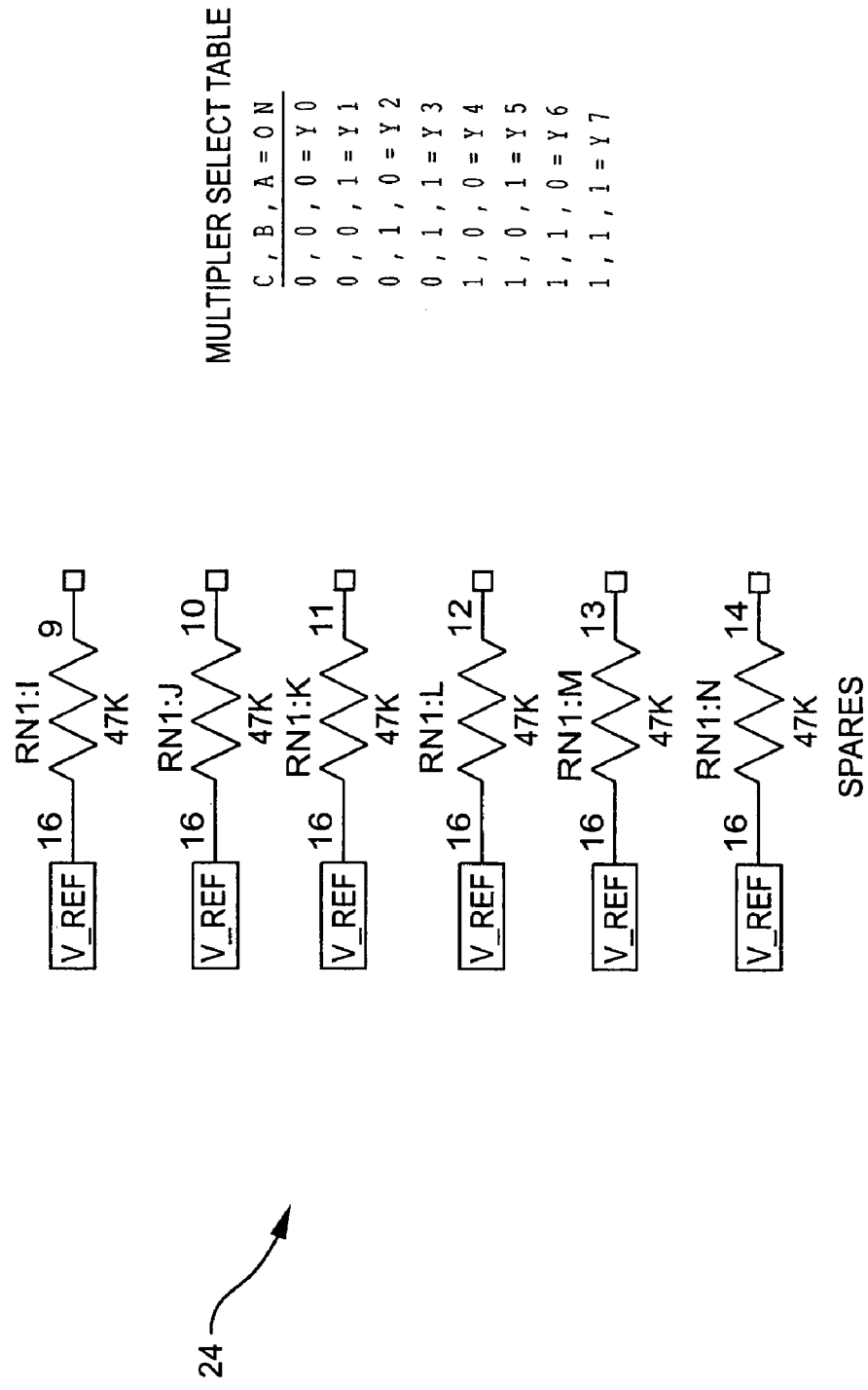
FIG. 8C  TEMPERATURE SENSOR MODULE SCHEMATIC

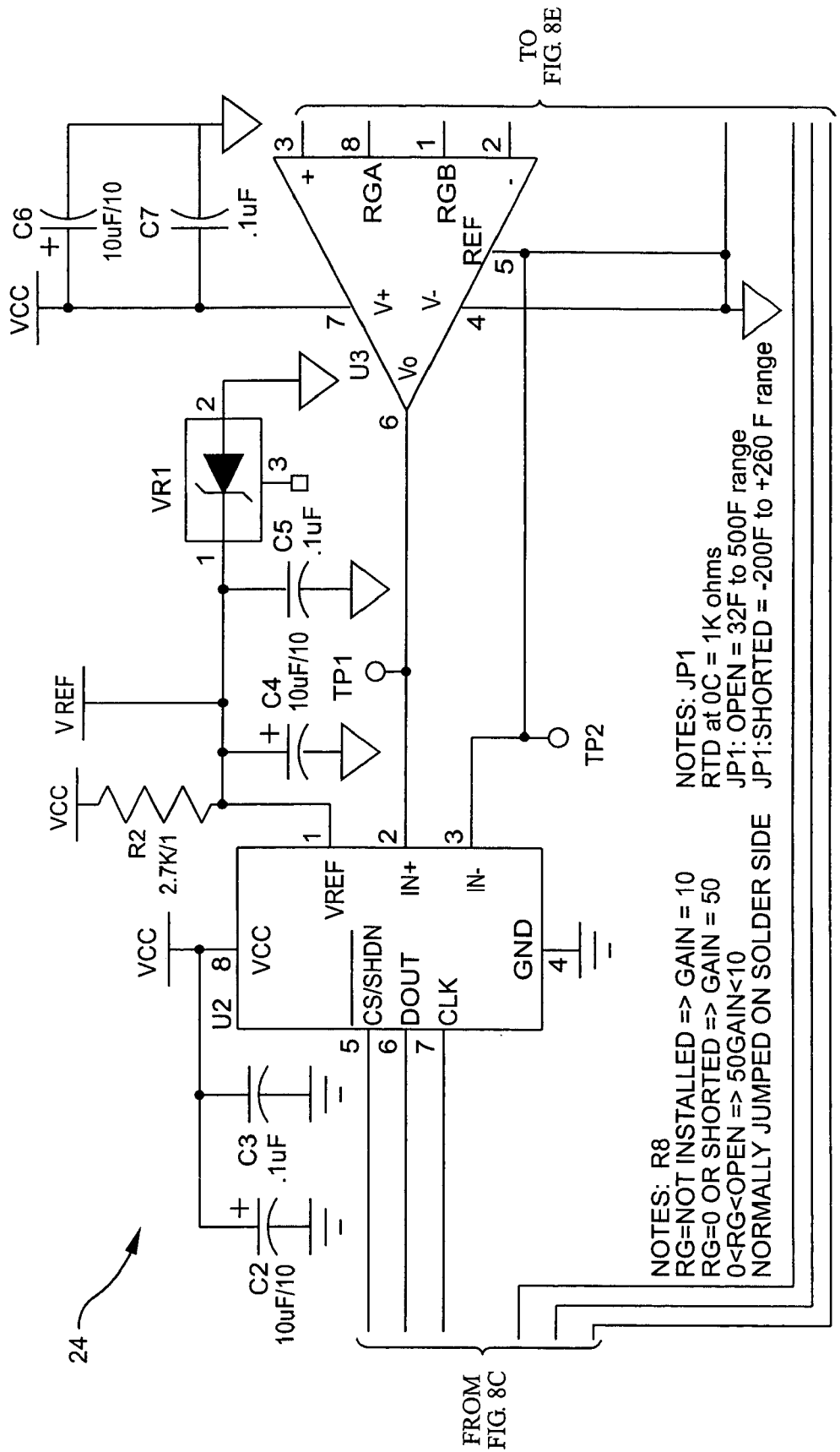
FIG. 8D  TEMPERATURE SENSOR MODULE SCHEMATIC

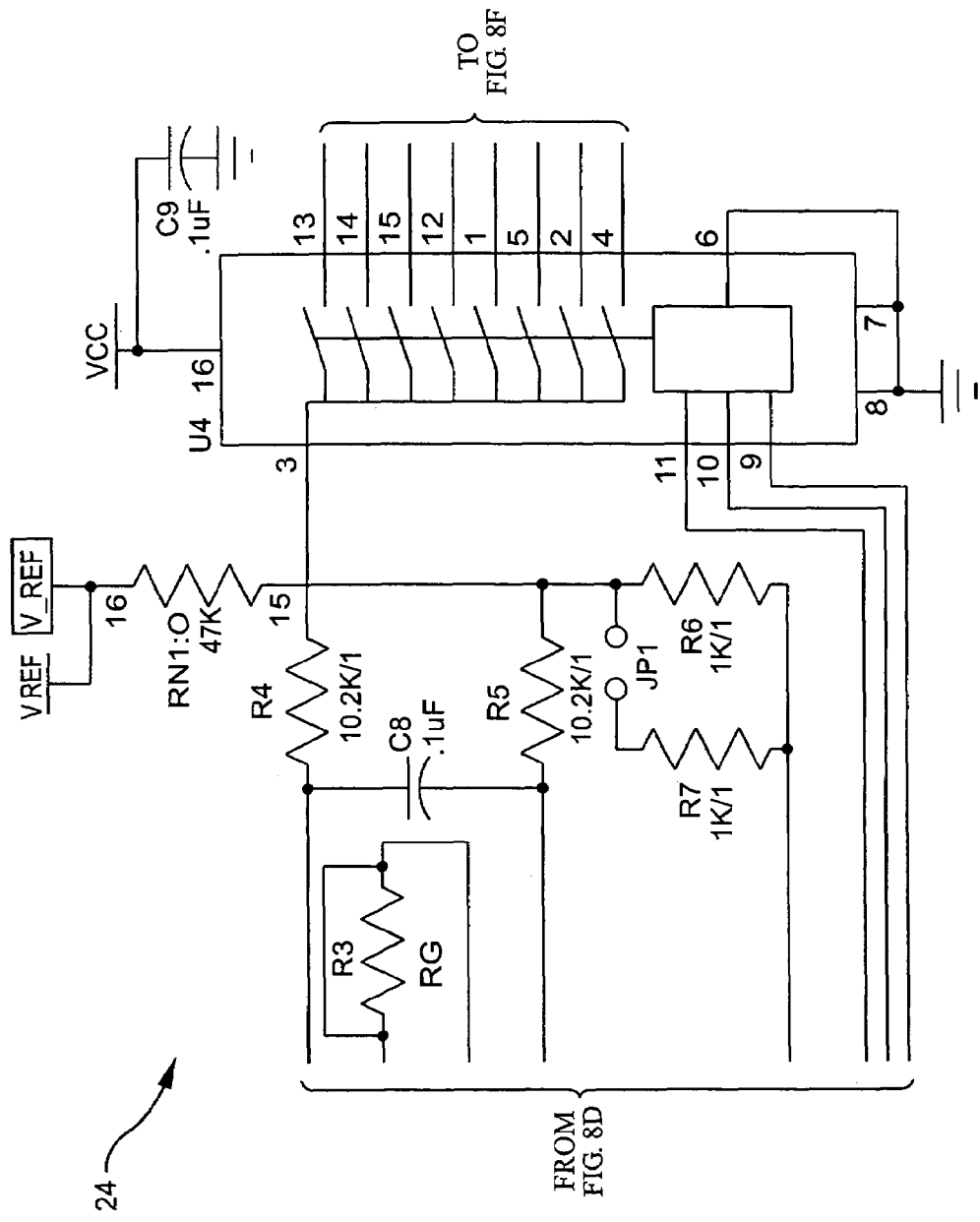
FIG. 8E  TEMPERATURE SENSOR MODULE SCHEMATIC

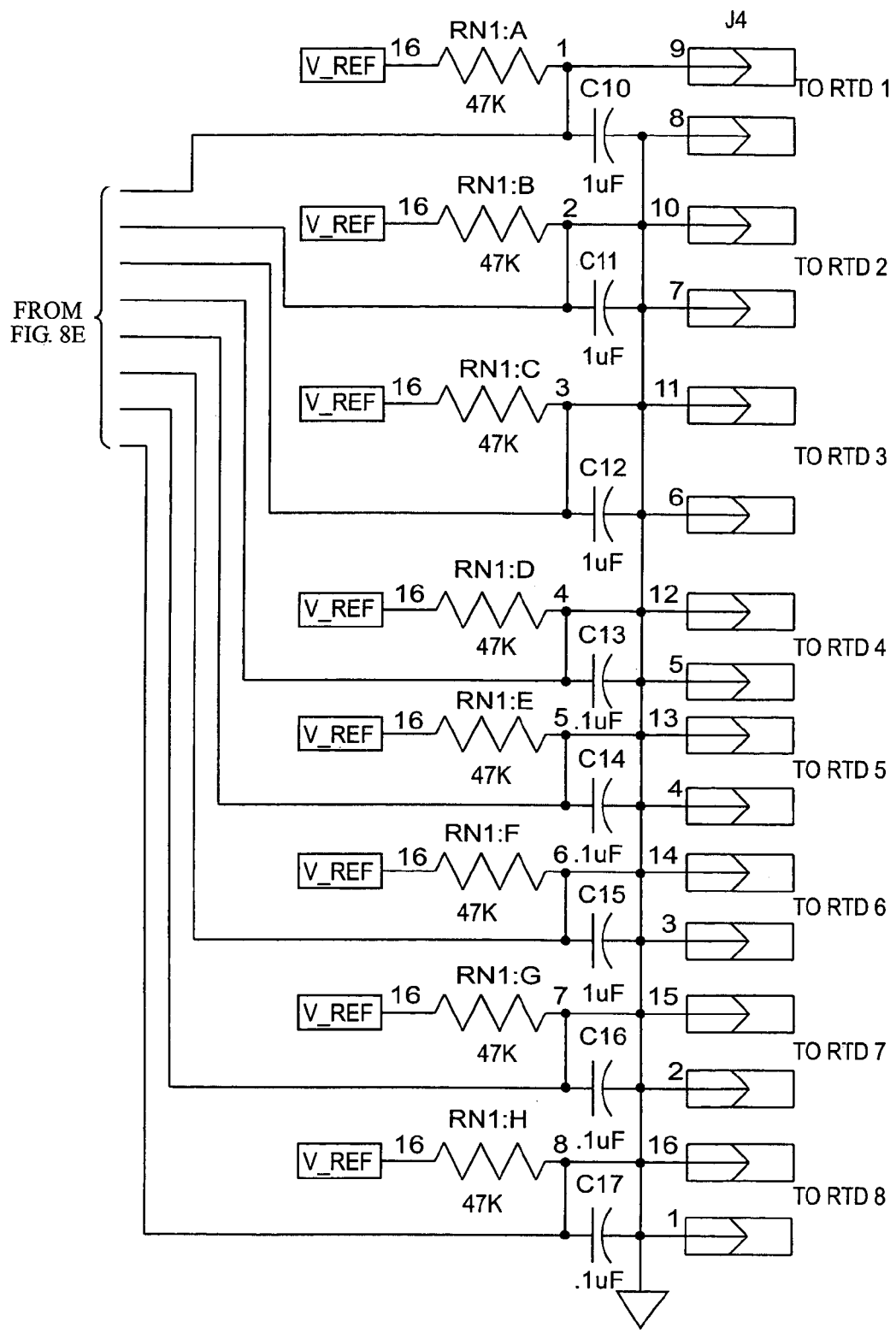
FIG. 8F TEMPERATURE SENSOR MODULE SCHEMATIC

FIG. 9A PRESSURE MODULE SCHEMATIC
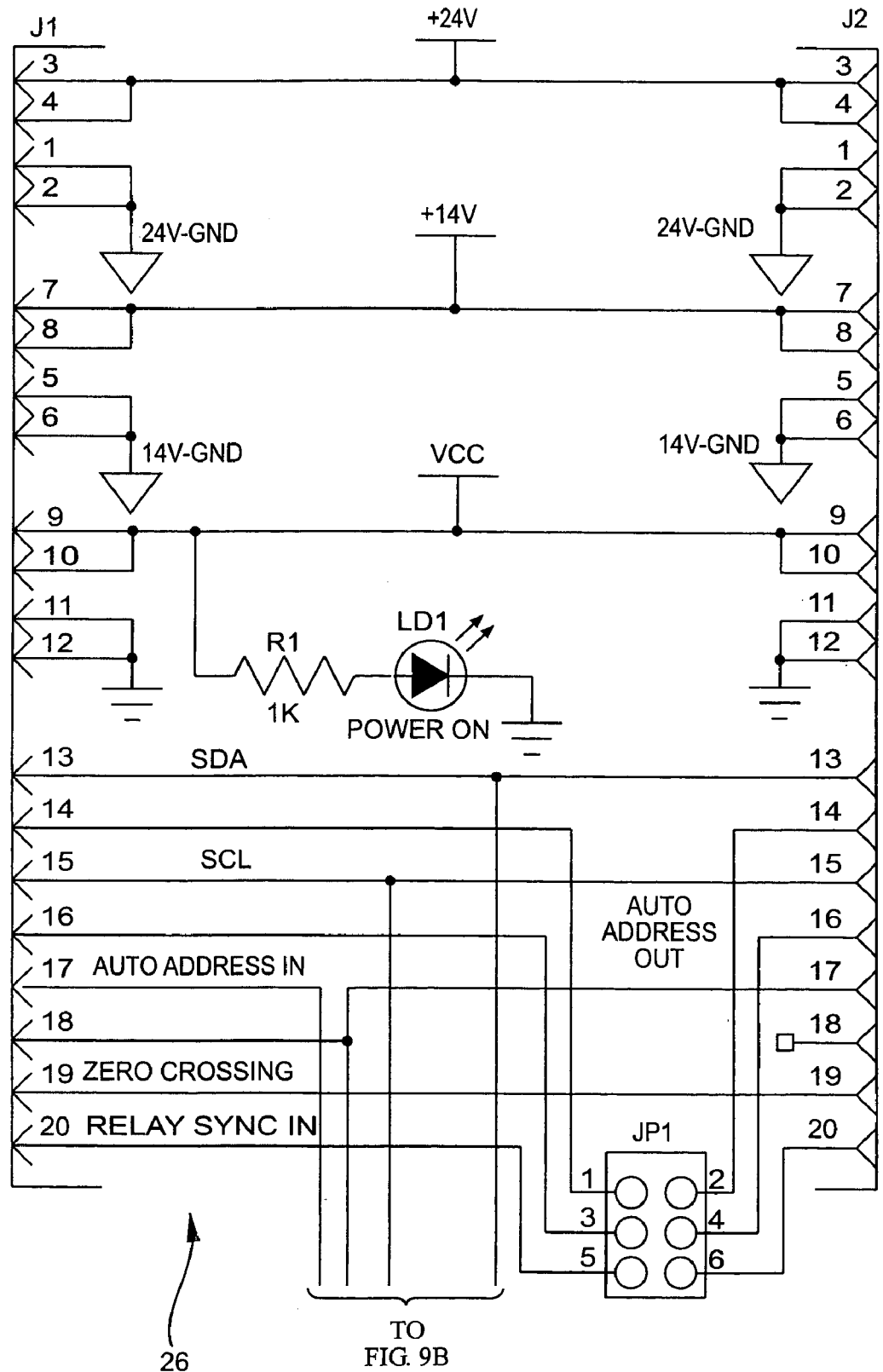

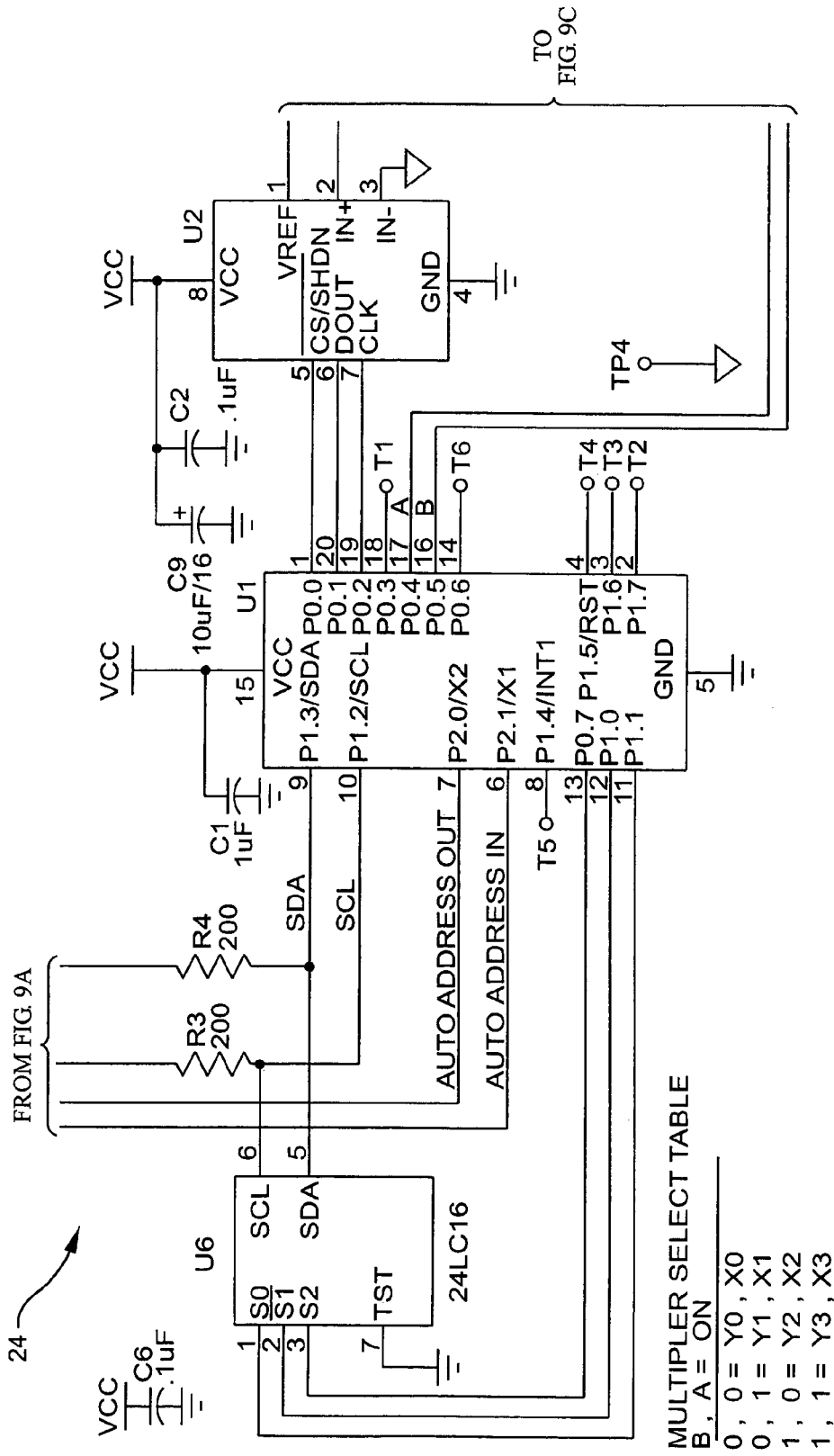
FIG. 9B  PRESSURE MODULE SCHEMATIC

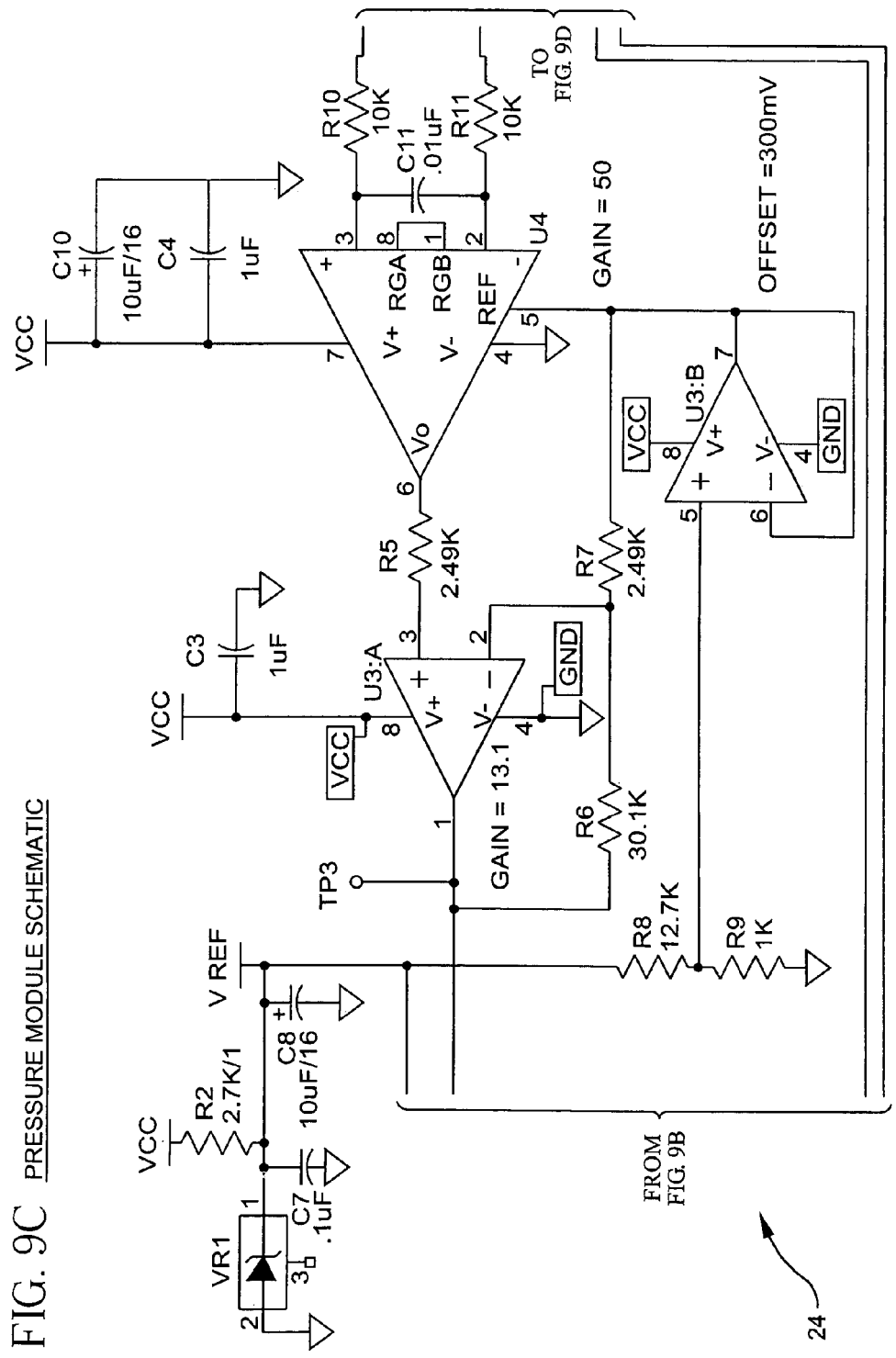
FIG. 9C  PRESSURE MODULE SCHEMATIC

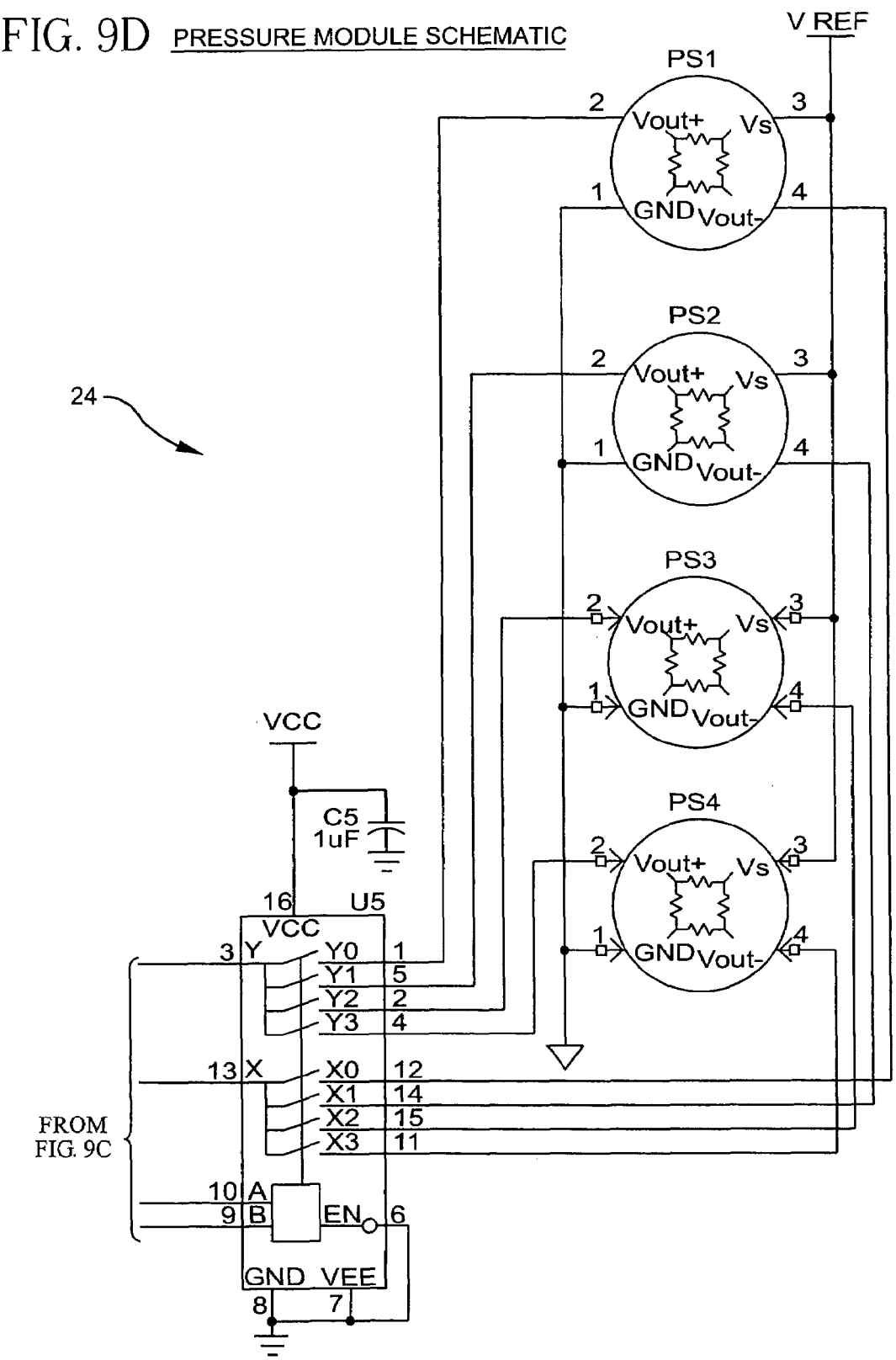
FIG. 9D PRESSURE MODULE SCHEMATIC

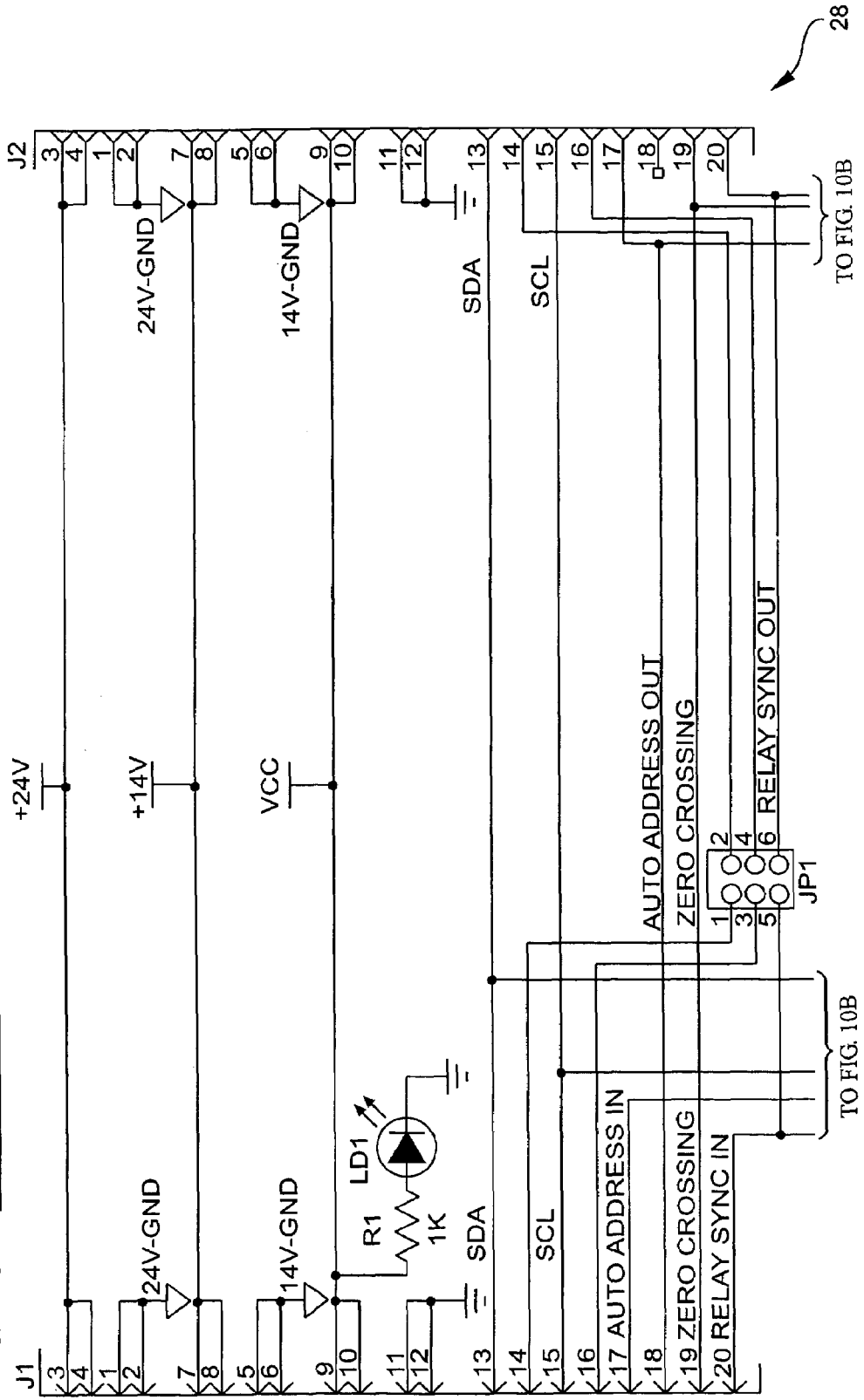
FIG. 10A  MOTOR CONTROL SCHEMATIC

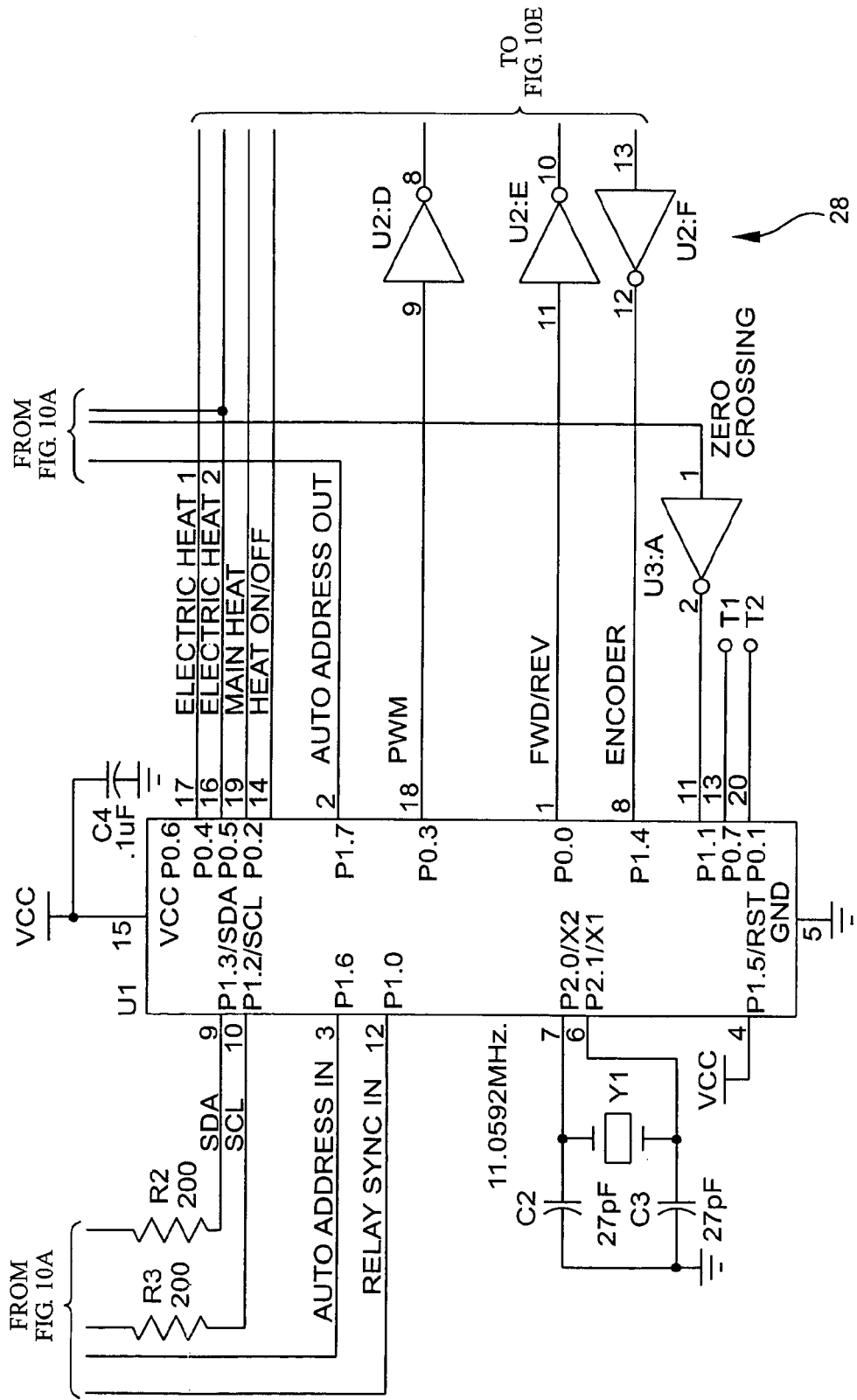
FIG. 10B  MOTOR CONTROL SCHEMATIC

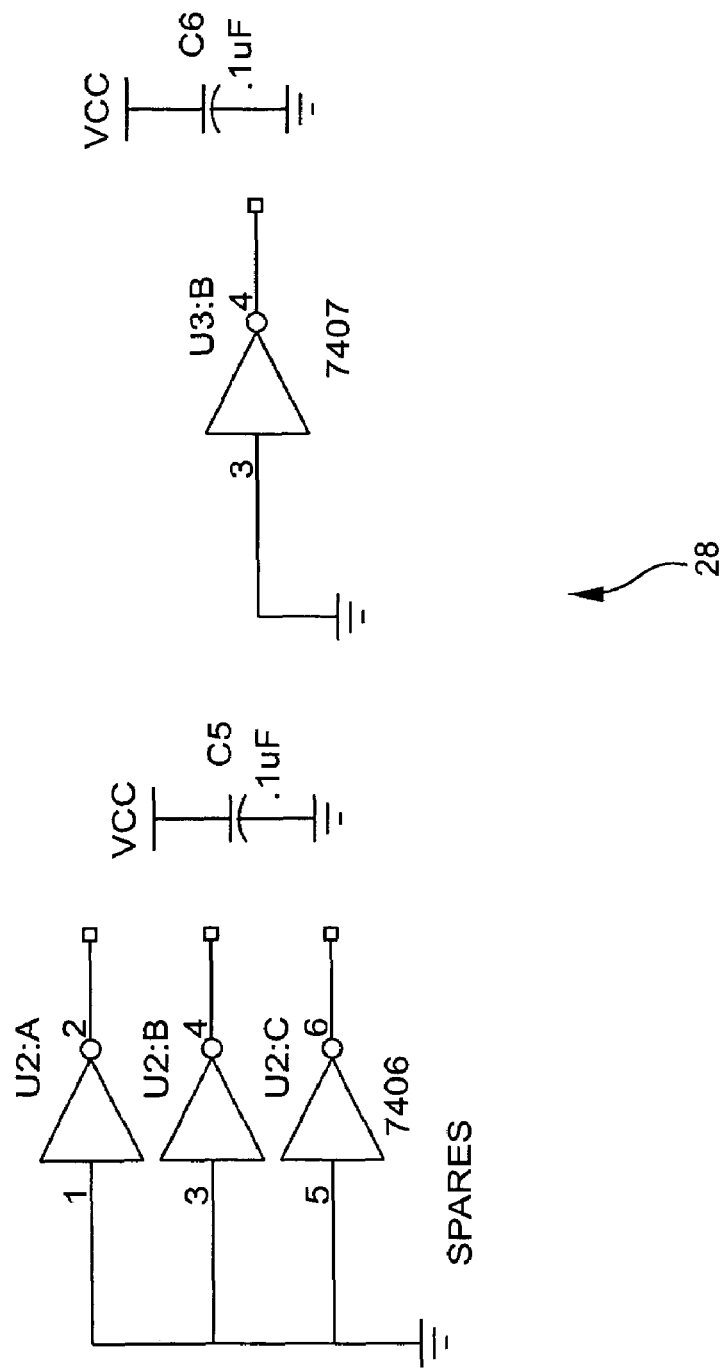
FIG. 10C  MOTOR CONTROL SCHEMATIC

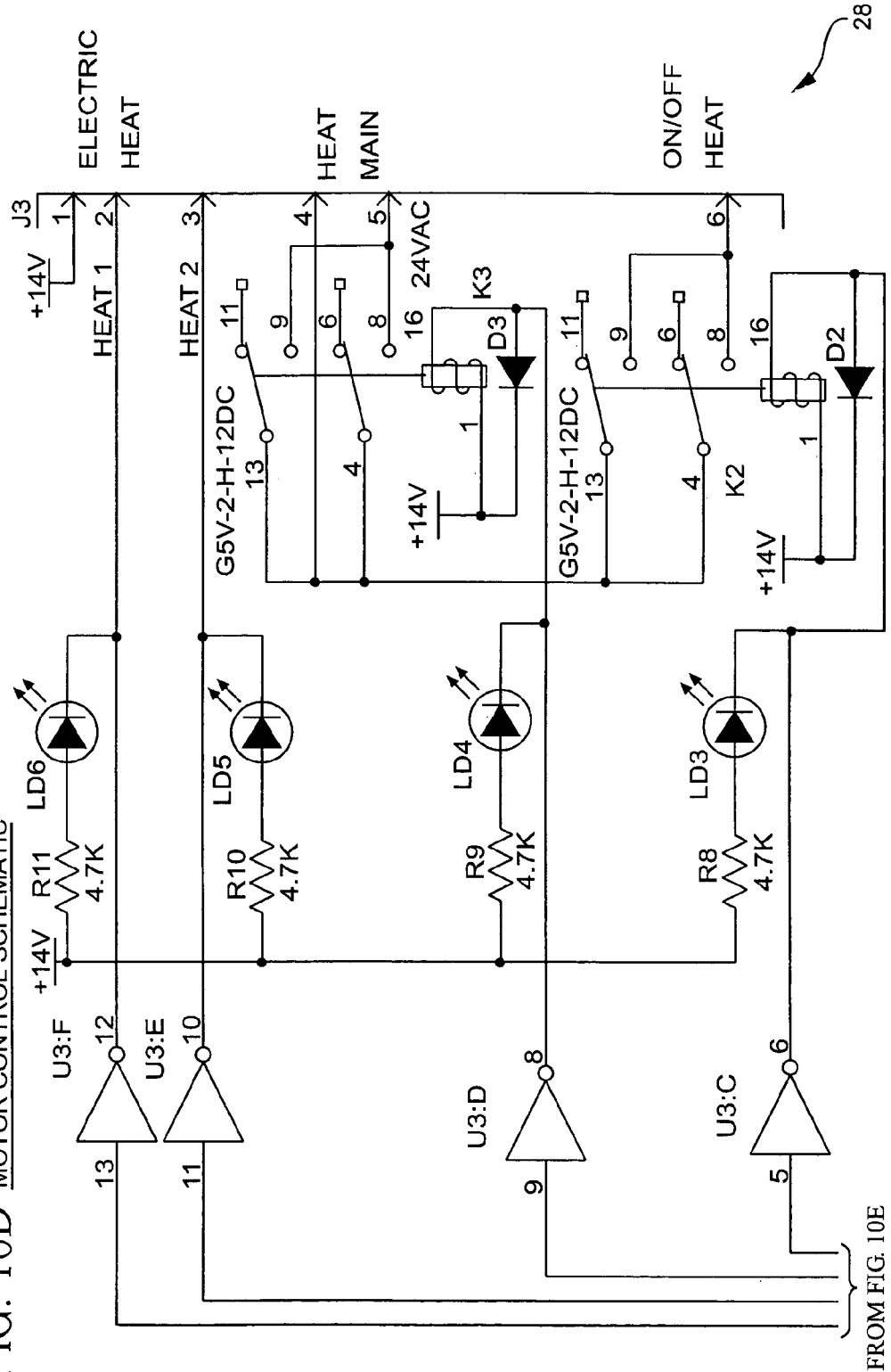
FIG. 10D  MOTOR CONTROL SCHEMATIC

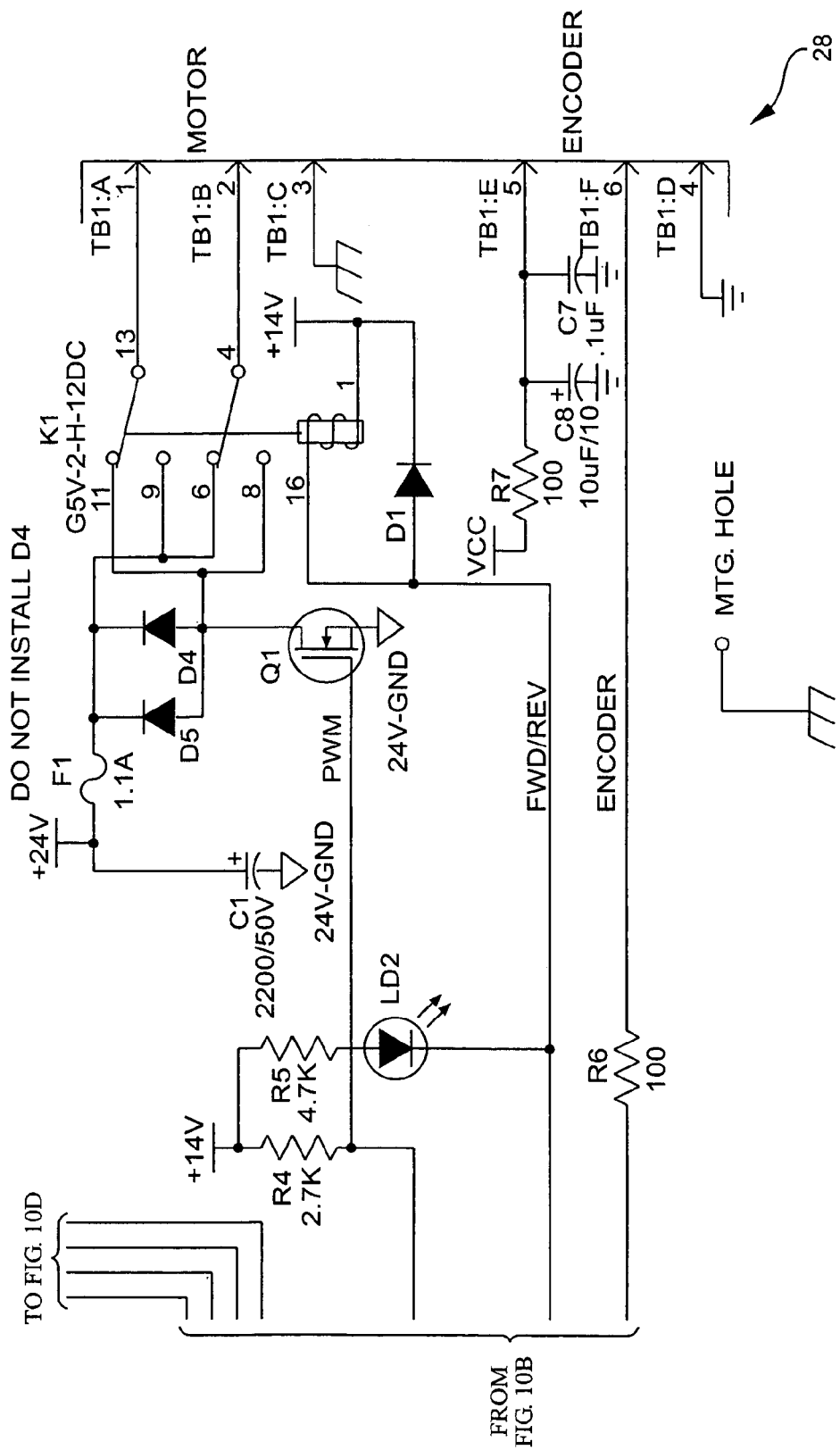
FIG. 10E  MOTOR CONTROL SCHEMATIC

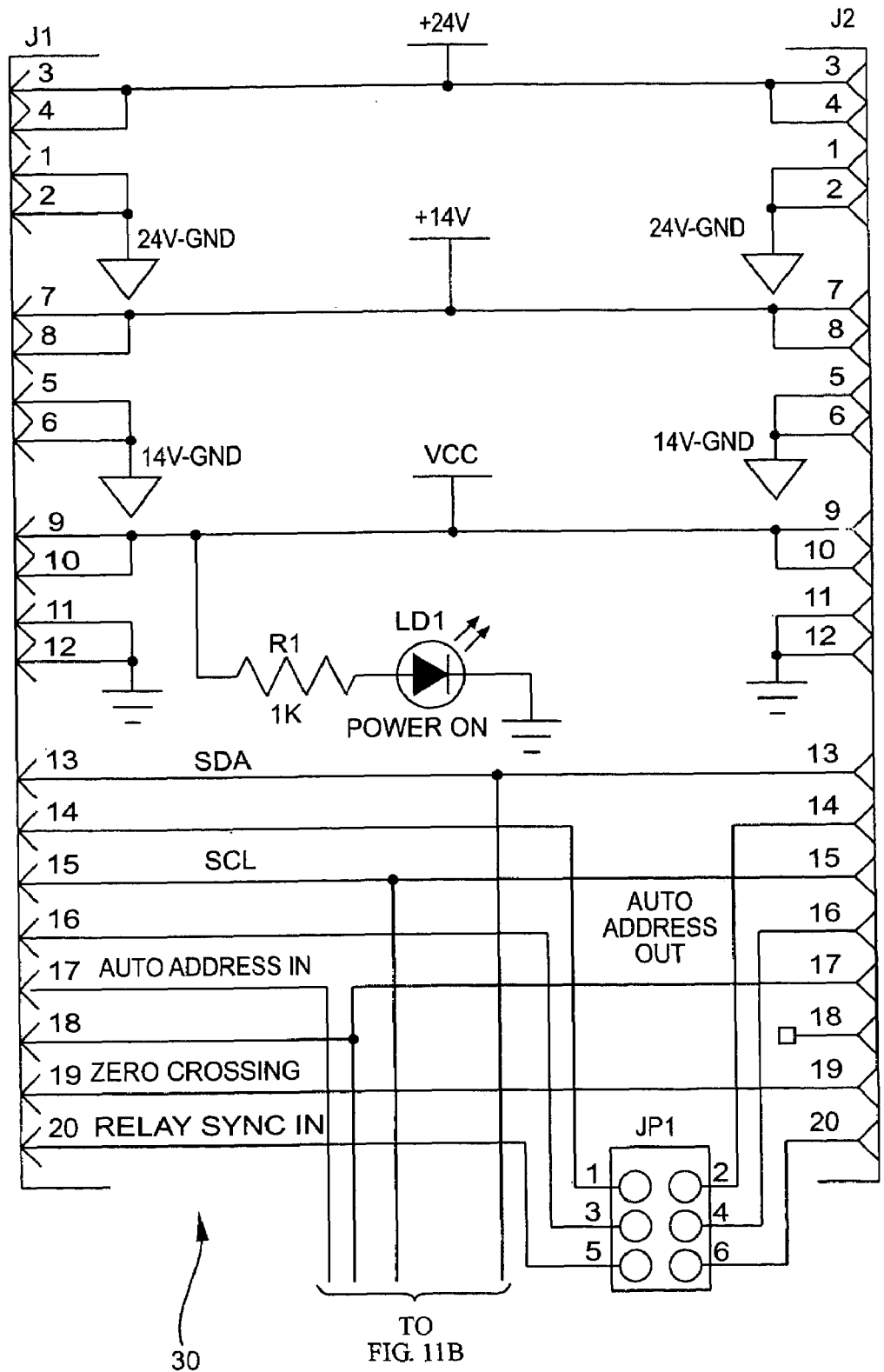
FIG. 11A  RS232 EXPANSION MODULE

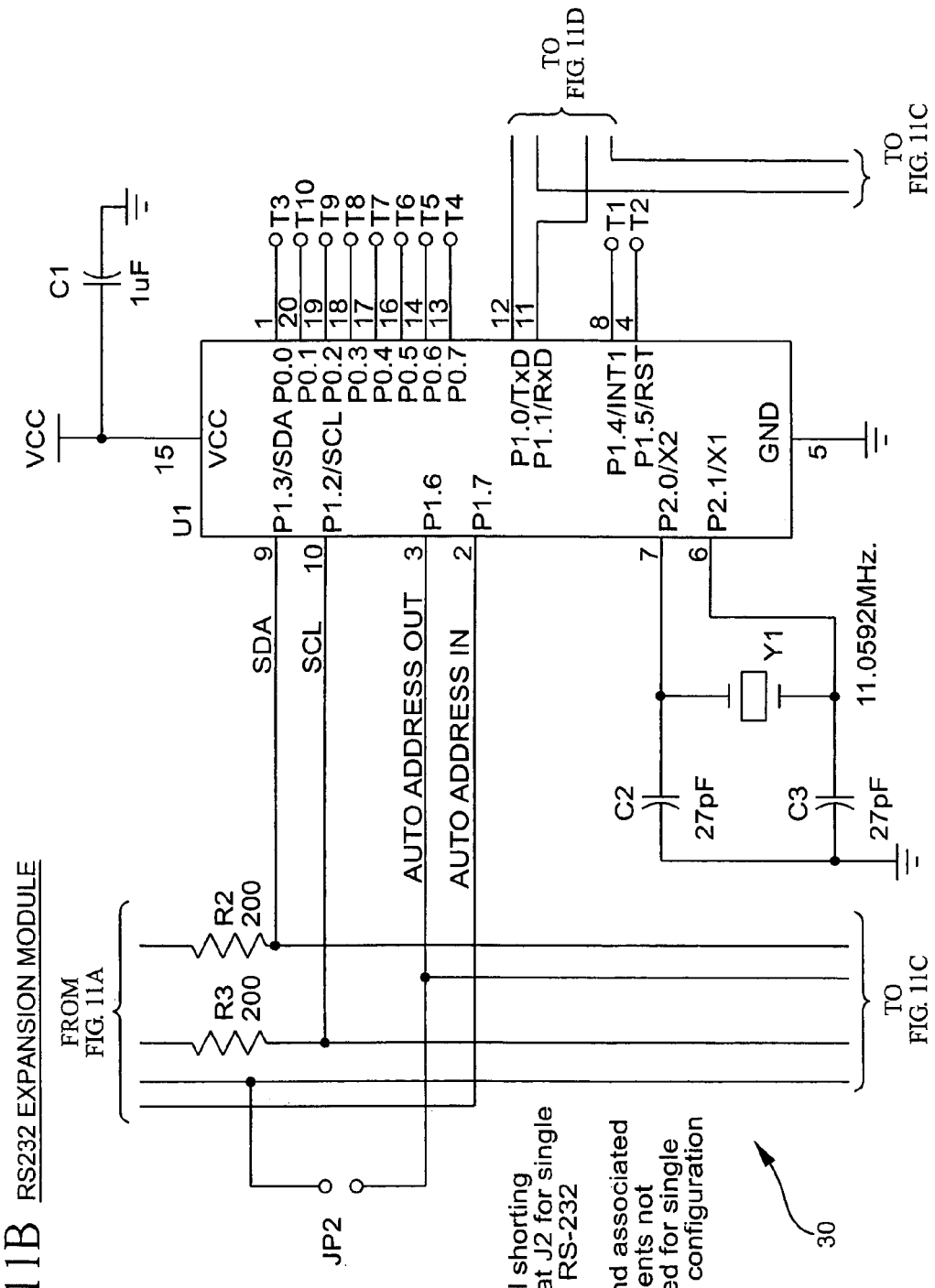
FIG. 11B RS232 EXPANSION MODULE

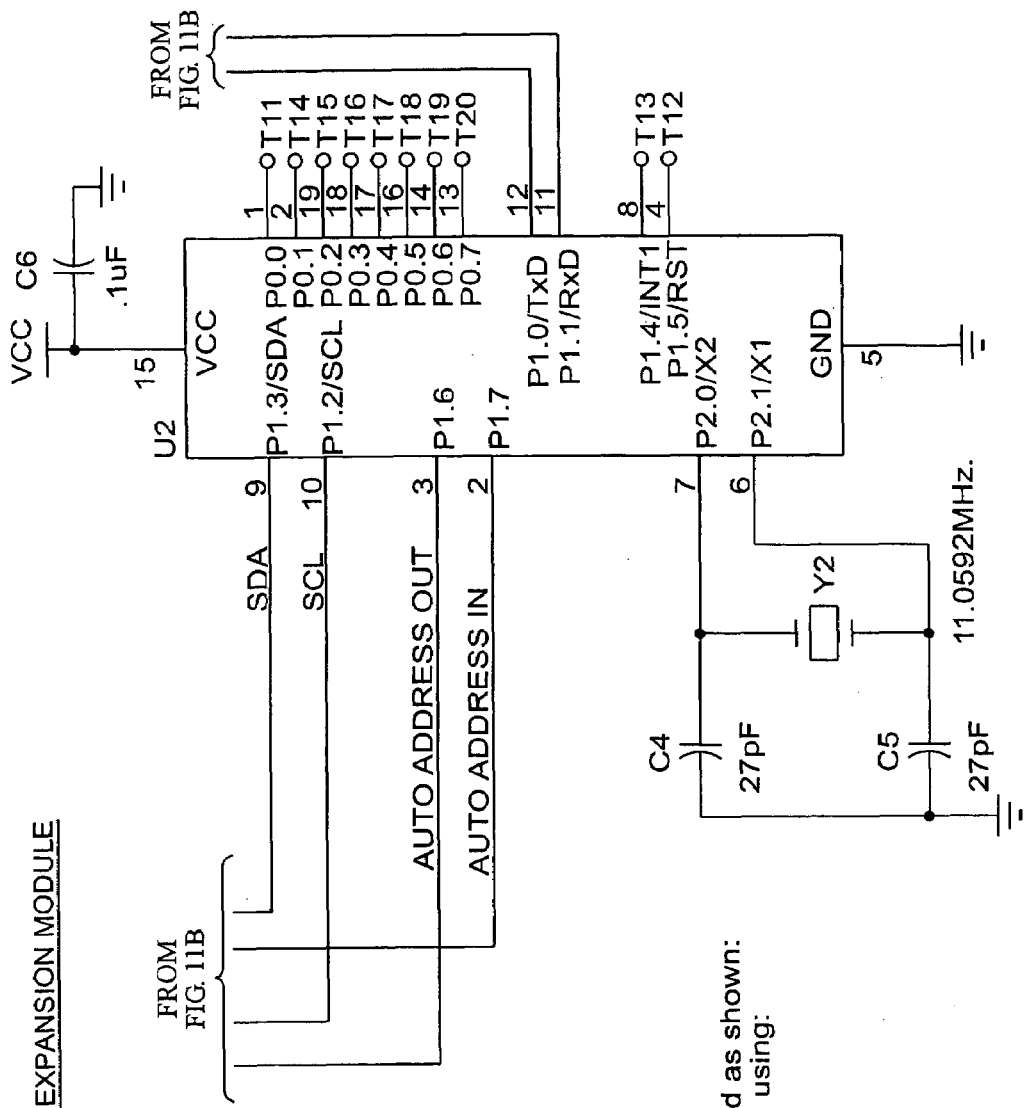
FIG. 11C  RS232 EXPANSION MODULE
Notes:
1. Up to 115.2Kbaud as shown:
2. Up to 38.4Kbaud using:
   3.6864MHz crystal
   (2) 18pF caps

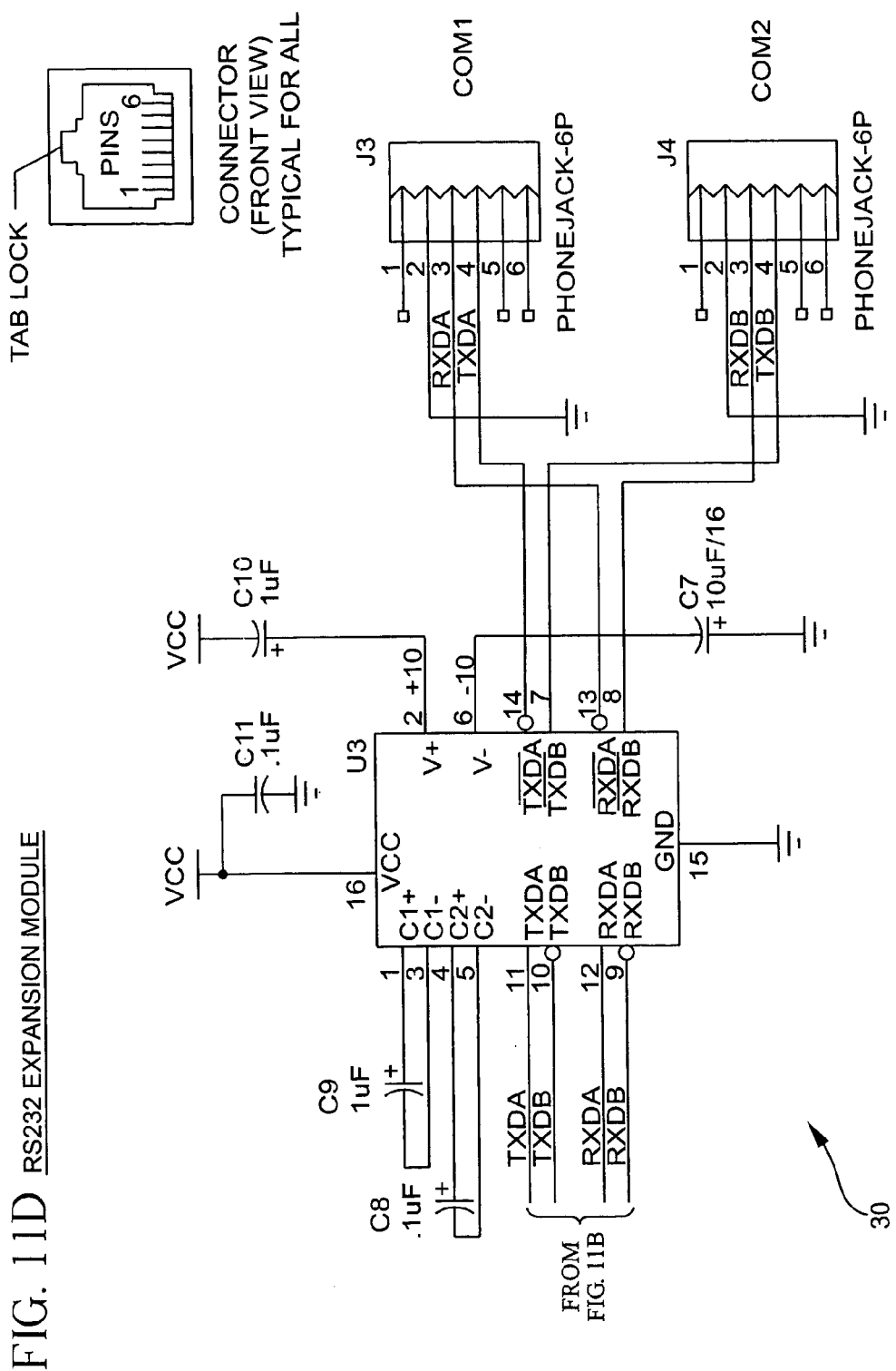
FIG. 11D  RS232 EXPANSION MODULE

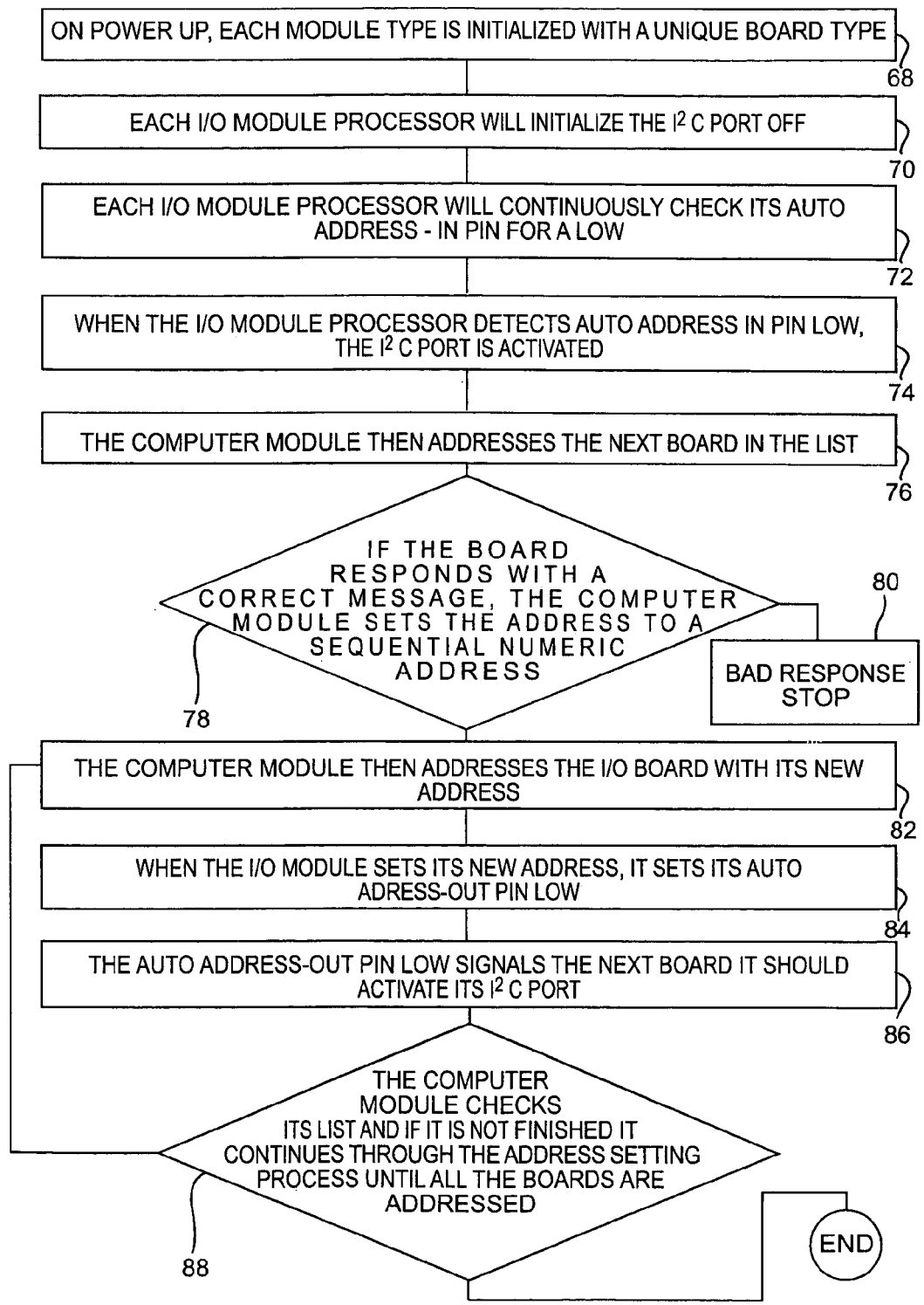

FIG. 13  BIT MAP PICTURE CHARACTERS @ THROUGH O
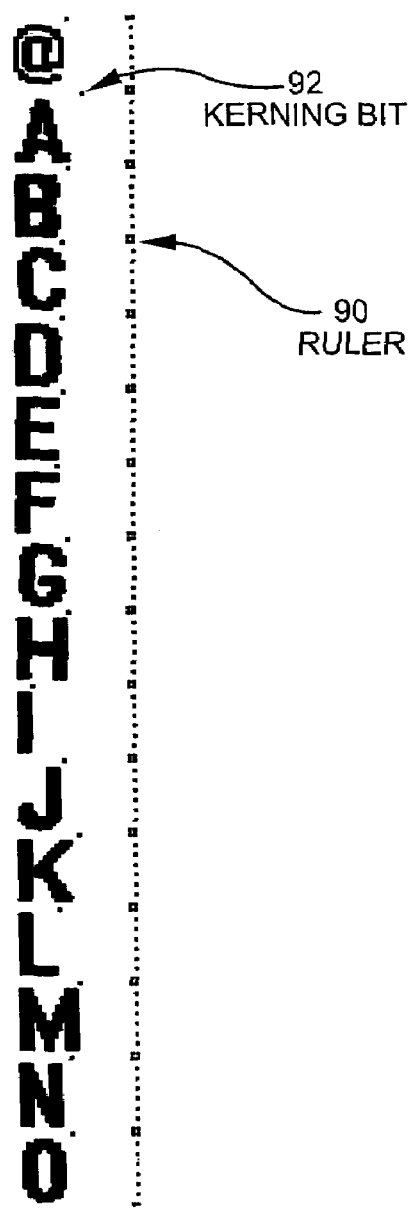

FIG. 14  BIT MAP PICTURE CHARACTERS @ THROUGH O

94 code unsigned char ARIAL_BLACK_10P_FONT[ 1656] =
{
0x08, 0x0C,      // Ascii @
0x00, 0x3C, 0x42, 0x9D, 0xAD, 0xA9, 0xAA, 0xBC, 0x43, 0x3C, 0x00, 0x00,
0x09, 0x0C,      // Ascii A
0x00, 0x00, 0x3E, 0x00, 0x3E, 0x00, 0x7F, 0x00, 0x77, 0x00, 0x77, 0x00, 0x77,
0x00, 0x7F, 0x00, 0xFF, 0x80, 0xE3, 0x80, 0xE3, 0x80, 0x00, 0x00,
0x08, 0x0C,      // Ascii B
0x00, 0xFE, 0xFF, 0xE7, 0xE7, 0xFE, 0xFE, 0xE7, 0xE7, 0xFF, 0xFE, 0x00,
0x08, 0x0C       // Ascii C
0x00, 0x3C, 0x7E, 0xE7, 0xE0, 0xE0, 0xE0, 0xE6, 0xE7, 0x7E, 0x3C, 0x00,
0x08, 0x0C,      // Ascii D
0x00, 0xFC, 0xFE, 0xE7, 0xE7, 0xE7, 0xE7, 0xE7, 0xE7, 0xFE, 0xFC, 0x00,
0x07, 0x0C,      // Ascii E
0x00, 0xFE, 0xFE, 0xE0, 0xE0, 0xFE, 0xFE, 0xE0, 0xE0, 0xFE, 0xFE, 0x00,
0x07, 0x0C,      // Ascii F
0x00, 0xFE, 0xFE, 0xE0, 0xE0, 0xFC, 0xFC, 0xE0, 0xE0, 0xE0, 0xE0, 0x00,
0x09, 0x0C,      // Ascii G
0x00, 0x00, 0x3F, 0x00, 0x7F, 0x80, 0xF3, 0x80, 0xE0, 0x00, 0xE7, 0x80, 0xE7,
0x80, 0xE3, 0x80, 0xF3, 0x80, 0x7F, 0x80, 0x3E, 0x00, 0x00, 0x00,
0x09, 0x0C,      // Ascii H
0x00, 0x00, 0xE3, 0x80, 0xE3, 0x80, 0xE3, 0x80, 0xE3, 0x80, 0xFF, 0x80, 0xFF,
0x80, 0xE3, 0x80, 0xE3, 0x80, 0xE3, 0x80, 0xE3, 0x80, 0x00, 0x00,
0x03, 0x0C,      // Ascii I
0x00, 0xE0, 0xE0, 0xE0, 0xE0, 0xE0, 0xE0, 0xE0, 0xE0, 0xE0, 0xE0, 0x00,
0x08, 0x0C,      // Ascii J
0x00, 0x07, 0x07, 0x07, 0x07, 0x07, 0x07, 0xE7, 0xE7, 0x7E, 0x3C, 0x00,
0x09, 0x0C,      // Ascii K
0x00, 0x00, 0xE3, 0x80, 0xE7, 0x00, 0xEE, 0x00, 0xFC, 0x00, 0xFE, 0x00, 0xF7,
0x00, 0xE7, 0x00, 0xE3, 0x80, 0xE3, 0x80, 0xE1, 0xC0, 0x00, 0x00,
0x06, 0x0C,      // Ascii L
0x00, 0xE0, 0xE0, 0xE0, 0xE0, 0xE0, 0xE0, 0xE0, 0xE0, 0xFE, 0xFE, 0x00,
0x0A, 0x0C,      // Ascii M
0x00, 0x00, 0xE1, 0xC0, 0xE1, 0xC0, 0xF3, 0xC0, 0xF3, 0xC0, 0xD2, 0xC0, 0xDE,
0xC0, 0xDE, 0xC0, 0xCC, 0xC0, 0xCC, 0xC0, 0xCC, 0xC0, 0x00, 0x00,
0x09, 0x0C,      // Ascii N
0x00, 0x00, 0xC1, 0x80, 0xE1, 0x80, 0xF1, 0x80, 0xF9, 0x80, 0xDD, 0x80, 0xDD,
0x80, 0xCF, 0x80, 0xC7, 0x80, 0xC3, 0x80, 0xC1, 0x80, 0x00, 0x00,
0x09, 0x0C,      // Ascii O
0x00, 0x00, 0x3E, 0x00, 0x7F, 0x00, 0xF7, 0x80, 0xE3, 0x80, 0xE3, 0x80, 0xE3,
0x80, 0xE3, 0x80, 0xF7, 0x80, 0x7F, 0x00, 0x3E, 0x00, 0x00, 0x00,
};  ←——96
code unsigned int ARIAL_BLACK_10P_INDEX [96]={
0 , 14 , 28 , 42 , 68 , 82 , 108 , 134 , 148 , 162 , 176 , 190 , 204 , 218 ,
232 , 246 , 260 ,
};

METHOD AND APPARATUS FOR MODULAR EMBEDDED CONTROL SYSTEM

CROSS-REFERENCE TO RELATED APPLICATION

This application claims the benefit of U.S. Provisional Patent Application No. 60/296,597 filed Jun. 7, 2001, the disclosure of which is incorporated herein by reference.

BACKGROUND OF THE INVENTION

1. Field of the Invention

This invention relates generally to embedded controllers with integrated operator display, control, and electromechanical input/output connections and more specifically relates to electronic modules that are plugged together with an operating system and device drivers to quickly develop and produce control systems.

2. Description of the Prior Art

In much of the equipment today, small microcomputers called embedded controllers are used to perform various functions, such as operator input/output display, control of functions, and input/output connections to electromechanical devices. Currently, many of these devices are custom designed for each application. However, this method is time consuming and expensive. Therefore, it would be advantageous to assemble and stock pre-made modules that plug together such as operator input/output display modules, computer control modules, and input/output modules.

In much of the equipment today, small microcomputers called embedded controllers are used to control equipment. The embedded controllers have other devices attached, such as displays, keyboards, memory, analog-to-digital converters, and other I/O devices. These embedded controllers and external devices are time consuming to program. Therefore, it would be advantageous to have a system that contains an operating system and drivers to run the external devices, which would greatly reduce the time to implement a control application.

In much of the equipment today, small microcomputers called embedded controllers are used to perform various functions. Currently, many of these devices are custom designed from scratch for each application. This method is time consuming and expensive. Therefore, it would be advantageous to have an application template that would provide many of the basic functions common to all applications.

In some equipment today, programmable logic controllers (PLC) are used to control equipment. Expensive operator interfaces and keyboards may be attached, which enable the operator to input commands and display data. Therefore, it would be advantageous to have the operator interface and keyboard along with the drivers incorporated into the main embedded control.

In some equipment today, single board computers are used to control equipment. These computers do not contain all the components to control the equipment, such as displays, keyboards, or high-level electromechanical drivers. Therefore, it would be advantageous to have the operator interface, keyboard, along with the device drivers and electromechanical drivers, included in the embedded control system.

In some equipment today, personal computers are used to control equipment. These computers contain all the necessary hardware to implement a control. They have plug-in cards and different display options. These systems do not handle real-time applications very well and are expensive and require extensive programming. Therefore, it would be advantageous to have a low-cost embedded system that includes plug in-modules.

In some equipment today, timers and temperature and relay closure sequences are formed into recipes. These recipes are sometimes broken down into steps. Often, many steps make-up a recipe. These steps are usually set at the keyboard of the equipment. Therefore, it would be advantageous if the modular embedded control system included an infrared transceiver that allows recipe data to be transmitted to and received from standard handheld computers. This would allow a user to program the recipe of the equipment on the handheld computer off-site then, when on-site, send the data to the equipment via an infrared port or serial port. The user would then go to multiple sites and send the recipe data to other devices, which would save a considerable amount of time.

In personal computers today, bit maps are used to represent standard pictures. These bit maps are drawings that are formed by small square blocks. There are many standard bit map programs that are currently available. These bit map programs may be used to draw letters of the alphabet that are bolder and easier to read on a screen. Therefore, it would be advantageous to be able to draw characters of the alphabet in such a manner as to make them bold and/or different sizes and to have a program that can convert the bit map bold letters into an array that an embedded system can read and display.

OBJECTS AND SUMMARY OF THE INVENTION

It is an object of the present invention to provide an embedded modular control system that is designed into modules.

It is another object of the present invention to provide a computer board module that includes computer and communication ports to connect additional modules.

It is yet another object of the present invention to provide a real-time operating system and device drivers in the form of software resident on the computer board.

It is a further object of the present invention to provide an application template that contains all the basic functions required to start an application.

It is an object of the present invention to provide the ability to connect standard graphics modules of various sizes to the system.

It is another object of the present invention to provide a method of converting and displaying bit maps of fonts, pictures, and icons to the graphics modules.

It is yet another object of the present invention to provide programming of the computer with flash memory via a serial port or infrared port.

It is a farther object of the present invention to provide for saving and recalling of recipe data via a serial port or infrared port with a handheld computer and saving the data in non-volatile memory.

It is an object of the present invention to provide a mirror to reflect the infrared light to and from the computer board.

It is another object of the present invention to provide automatic detection of types of modules and module configurations on the bus.

It is yet another object of the present invention to provide input/output modules that connect together in a bus fashion.

It is a further object of the present invention to provide a modular embedded control system that allows an equipment designer to quickly prototype and produce a control system by plugging in pre-made control modules that are required for a particular application. The system is preferably programmed using the provided operating system, drivers, and template application. This significantly decreases technical manpower requirements, time-to-market, and cost due to quick development time, and increases control reliability, which is required to implement a control in a piece of equipment.

In accordance with the present invention, a modular embedded control system is provided that includes a computer and graphics display module, which contains, as the main components, a central microcomputer, graphics display module, and an external inter-integrated circuit ($I^2C$) bus. The microcomputer preferably includes an operating system and a software driver in flash memory of the microcomputer. Several sizes of industry standard graphics modules may be selected for the application and plugged into the computer module. A keyboard module is preferably plugged into a keyboard connector. The complete system preferably includes the computer, display and keyboard assembly.

The computer module preferably includes an infrared port for transferring data from the computer module to external handheld computers. The infrared transceiver is preferably mounted on the computer printed circuit board and a mirror reflects the infrared light out the front panel. This allows the device to be mounted by a machine on the circuit board, which saves the expense of alternative mounting methods.

The modular embedded control system preferably includes an infrared transceiver that allows recipe data to be transmitted and received from standard handheld computers. This allows a user to program the recipe of the equipment on the handheld computer off-site then, when on site, send the data to the equipment via the infrared port. The user may then go to multiple sites and send the recipe data to the other devices. This saves time in programming steps into each piece of the equipment since it is preferably done once and transmitted to the other equipment via the infrared port.

The modular embedded control system preferably includes an application template, which includes the operating system drivers and main control loops necessary to start an application to control a piece of equipment.

The modular embedded control system preferably includes a method for drawing and converting bit mapped fonts from standard binary bmp format to ANSI C statements, and a software driver that displays the fonts on a graphics screen.

The modular embedded control system preferably includes a power supply module, to which alternating current (ac) power is connected. The power supply module also preferably includes connectors for coupling to the computer display module. Other modules may also be attached to the power supply board creating a communication and power supply bus.

The modular embedded control system preferably includes a digital I/O module that preferably includes a microcontroller that reads instructions from the main control via the $I^2C$ bus. The system further contains an input connector that plugs into the power supply bus connector or other modules and an output bus connector, to which additional modules may be connected. The output relays preferably drive 220VAC 8 amp loads and the optocouplers read external equipment switches. The digital I/O module is preferably connected to equipment to perform the required functions.

The modular embedded control system preferably includes a temperature sensor module that preferably includes a microcontroller that reads the temperatures from an analog-to-digital converter and, using instructions from the main control via the $I^2C$ bus, transmits the data to the computer module. The system further includes an input connector that plugs into the power supply bus connector or other modules and an output bus connector, to which additional modules may be connected.

The modular embedded control system preferably includes a motor control board that preferably includes a microcontroller that reads the speed of a motor. Instructions from the computer module preferably set the motor speed via the $I^2C$ bus. Circuitry on the board directly drives the motor using pulse width modulation. The system further contains an input connector that plugs into the power supply bus connector or other modules and an output bus connector, to which additional modules may be connected.

The modular embedded control system preferably includes a pressure sensor board that preferably includes a microcontroller that reads pressures using an amplifier and an analog-to-digital converter. The data is preferably transmitted using instructions from the computer module via the $I^2C$ bus to the main display and control module. The system further includes an input connector that plugs into the power supply bus connector or other modules and an output bus connector, to which additional modules may be connected.

The modular embedded control system preferably includes a custom keyboard that preferably includes a microcontroller that reads the keys and may drive light emitting diode (LED) displays using instructions from the computer module via the $I^2C$ bus.

These and other objects, features, and advantages of the present invention will be apparent from the following detailed description of illustrative embodiments thereof, which is to be read in connection with the accompanying drawings.

BRIEF DESCRIPTION OF THE DRAWINGS

FIG. 1 is a top-level block diagram for a modular embedded control system formed in accordance with the present invention.

FIG. 2 is a computer module block diagram formed in accordance with the present invention.

FIG. 4 is a keyboard overlay layout formed in accordance with the present invention.

FIG. 5 is a keyboard module circuit board schematic formed in accordance with the present invention.

FIGS. 6A and 6B are schematic diagrams of a power supply circuit board formed in accordance with the present invention.

FIGS. 7A-7D are schematic diagrams of a digital I/O module circuit board formed in accordance with the present invention.

FIGS. 8A-8F are schematic diagrams of a temperature sensor module circuit board formed in accordance with the present invention.

FIGS. 9A-9D are schematic diagrams of a pressure sensor module circuit board formed in accordance with the present invention.

FIGS. 10A-10E are schematic diagrams of a motor control module circuit board formed in accordance with the present invention.

FIGS. 11A-11D are schematic diagrams of an RS-232 expansion module circuit board formed in accordance with the present invention.

FIG. 12 is a flow chart for auto-addressing formed in accordance with the present invention.

FIG. 13 is a sample of a font conversion bit map formed in accordance with the present invention.

FIG. 14 is a hexadecimal output of the font conversion program formed in accordance with the present invention.

DETAILED DESCRIPTION OF THE PREFERRED EMBODIMENTS

Figure 3A:
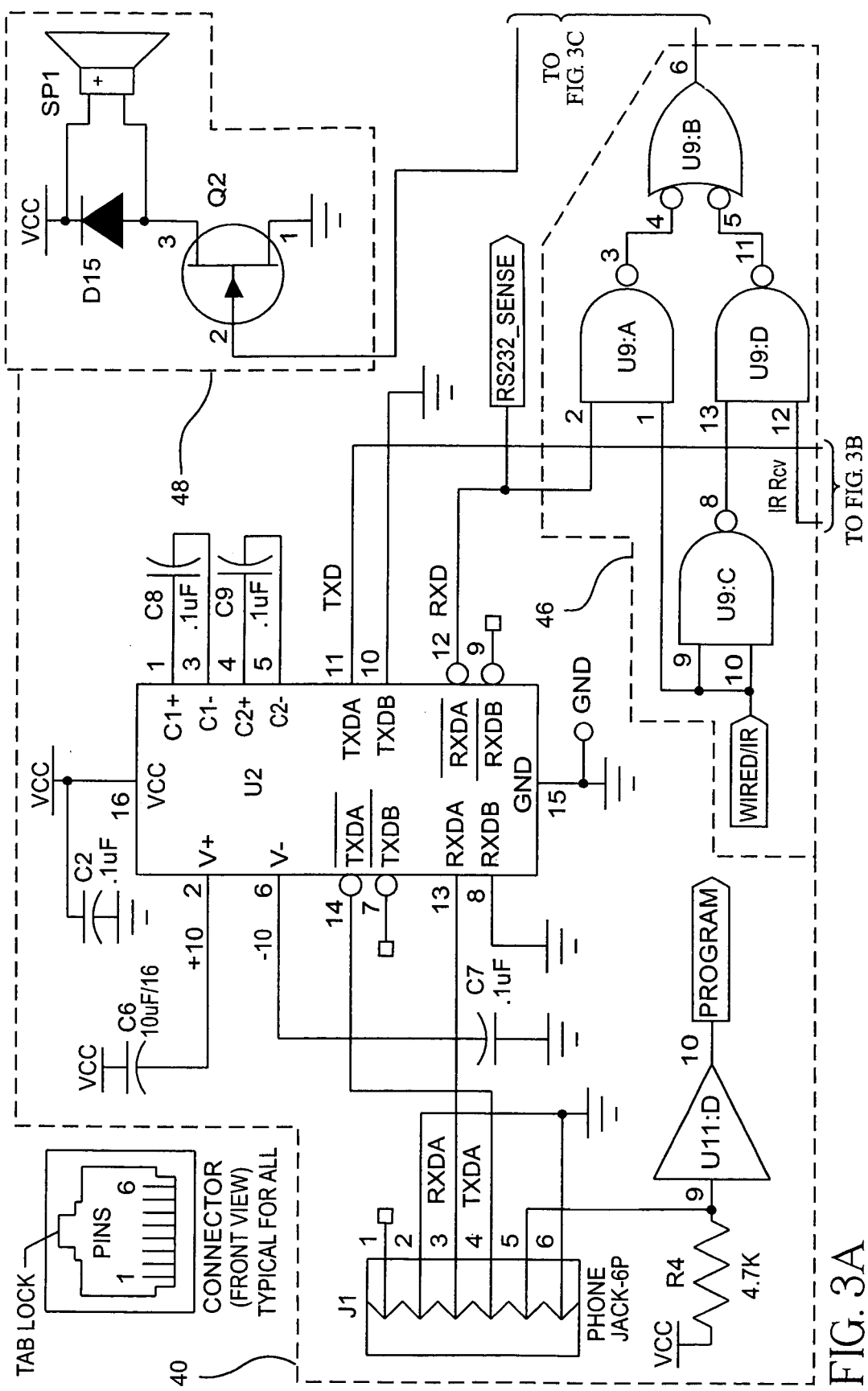
FIGS. 3A-3L are schematic diagrams of a computer module circuit board formed in accordance with the present invention.

Top Level Description of Modular Embedded Control System

FIG. 1 shows a top-level block diagram of a modular embedded control system formed in accordance with the present invention for use in controlling, for instance, an oven for preparing food. The apparatus includes electronic modules that connect together to form a control system. A computer module 10 is the heart of the system. A graphics module 12 is preferably an industry standard device that is connected to the computer module 10 via an 8-bit bus with power. A standard or custom keyboard module 14 is preferably connected to the computer module 10 via an I²C bus. External infrared and serial ports 16 are preferably used for communication to external computers. External I/O modules 20, 22, 24, 26, 28, 30 are preferably connected via a cable that includes an I²C bus and a +14 volt power supply signal.

External modules 20, 22, 24, 26, 28, 30 preferably include printed circuit boards that connect together and form a power supply and communication bus. Any module may be connected to the power supply and any number of modules may be further connected to each other.

Power supply module 20 preferably converts 10VAC into 14VDC. One RJ45 connector connects the computer to the main computer module. A multi-pin connector starts the external I/O power supply bus.

The digital I/O module 22 preferably includes eight relays and eight optocouplers. This module allows high voltage and high current electromechanical devices to be connected. The optocouplers allow sensor switches to be connected to the system.

The temperature sensor module 24 preferably measures external temperatures using a resistive thermal device (RTD). These temperatures are transmitted to the computer board.

The pressure module 26 preferably measures pressures generated from gas or fluid. The pressures are read by the main computer module 10 and may be processed and displayed on the graphics module. The pressures may be used to measure liquid levels in a tank.

The motor module 28 preferably drives 12-24 VDC motors directly. An optical encoder may be mounted on the shaft of the motor and used to directly control the speed of the motor. The encoder data is sent to the computer module 10, processed, and then motor speed data is transmitted to the motor module 28 using the I²C bus.

Additional modules my be designed and attached in the future such as Internet connections, ethernet connections, or high-speed digital input connections.

Top Level Summary of Operation

The computer module 10 preferably includes software to drive the entire system. The graphics display 12 and keyboard 14 permit the operator to program and set parameters, which allow the external equipment to perform its functions. The I/O modules 20-30 are selected and plugged in as necessary to perform equipment functions. The computer module 10 communicates with I/O modules 20-30 through the I²C bus. The specific operation of the system depends on the application software that is created for each piece of equipment.

Detailed Description of Computer Module Block Diagram

FIG. 2 shows a block diagram for the computer module 10 formed in accordance with the present invention. The computer module 10 shown in FIG. 1 is the heart of the system. A single-chip microcontroller 31 included in the computer module 10 preferably includes flash memory in which programs are stored. It is to be understood that the term "microcontroller" includes a microprocessor, microcomputer, processor, application integrated circuit (ASIC), and the like as alternatives.

The computer module 10 shown in FIG. 1 preferably includes the 8-bit bus for driving the standard graphics module 12. FIG. 2 shows an LCD display connection with a negative voltage supply.

The computer module 10 preferably includes memory 34, a temperature sensor module 36, and a real-time clock 38. These devices are preferably addressed using an I²C bus and software drivers included in the processor 31.

The computer module 10 preferably also includes electrically erasable program memory (EEPROM) 34 for storing user data. Typically, temperature set points, timers, and relays are sequenced into steps to perform a function. A group of steps to perform these functions is called a recipe. The recipe step data is preferably stored in the EEPROM. This data is transmitted from the infrared (IR) port in response to a user command on a handheld device, such as a Palm Pilot™. This data is then edited and transmitted back to the equipment. The user may also use this data to quickly program multiple pieces of the same equipment.

The temperate sensor 36 preferably senses over temperature conditions of the computer module 10.

The real-time clock 38 is used to display time and may be used in an application where events may be synchronized to a real-time clock, such as automatically turning the power on and off at specific times of the day. The real-time clock preferably continues to run when main power is removed. This can be used to determine power failures, recover, and continue operation after power failures.

The computer module 10 preferably includes a sounder 48 that is used to audibly alert the user to specific events. For instance, a very short beep occurs when any key is pressed, fast continuous beeps alert the user an error has occurred. Other sequences of beeps may be programmed to alert the user.

The computer module 10 preferably includes a port switch 46. The processor contains a built-in universal asynchronous receiver transmitter (UART). The UART preferably converts data into a standard 10-bit serial stream. The port switch 46 selects between RS-232 wired and infrared wireless ports.

The computer module 10 preferably includes an RS-232 line driver 40 and flash programming sensor circuit 42. This port is used to program the flash memory of the processor and receive and transmit application data. An external program sends a serial string to the processor. Application code running in the processor then detects the string and the processor switches to programming mode. An external program sends the program data to the processor, which stores it in the flash memory. If there is no application code running in the processor, the processor may be forced into programming mode by grounding the external sensor line.

The computer module 10 preferably includes an infrared port 44. The processor selects the infrared port 44 with port switch 46 and then transmits serial data from the processor's serial port. The data is then sent to the infrared port 44.

An external device, such as a handheld computer, receives data and may transmit modulated infrared data. An infrared detector receives the modulated light and sends the data to an encoder/decoder device. The Endec converts the modulated pulses of light to serial digital data. The data is sent to the port switch 46, and when selected, passed through to the processor.

The computer module 10 preferably includes a +5 volt power supply and I²C bus 1 50 and I²C bus 2 52. These two bus connections are used to connect the I/O modules and keyboard module to the processor. I²C is an industry standard method of transmitting and receiving high-speed serial data.

Detailed Description of Computer Module Circuit Board Schematic

FIGS. 3A-3L show a preferred computer module circuit board schematic formed in accordance with the present invention. A single-chip microcomputer 89C51 U1 which is available from Intel Corporation, Santa Clara, Calif. 95052, is shown with a crystal clock including oscillator Y1 and capacitors C10, C11, and a reset circuit, including a reset circuit DS1833-10 D1 and a capacitor C24. The single-chip microcomputer U1 preferably contains 64 k of flash program memory, 1 k of ram, and a UART. This device may be substituted for a device with larger memory as such devices become available.

The LCD circuitry 12 preferably includes a connector J7 that allows two types of standard graphics modules to plug in directly with or without cabling. Potentiometer R1 is used for contrast adjustment. Regulators VR3 and VR2 along with the connected capacitors C19, C20, C28 generate negative 8 volts required for the LCD display LCO 1. The EPROM 24LC16 U3 and U4 are preferably used to store recipe data.

A temperature sensor LM75 U8 preferably monitors and records the peak temperature of the computer module 10. If the temperature reaches an abnormally high temperature, a message is preferably displayed on the LCD graphics display.

Power supply circuitry 54 preferably includes a regulator VR1, a diode D1, an inductor L1, and a capacitor C15, which make up the +5 volt switching regulator. I²C bus 1 50 and bus 2 52 are shown in FIG. 3c and bus 50 includes +14 volt unregulated supply voltage for the computer display keyboard module. An RJ45 connector is used to connect the power supply and I²C bus from the I/O modules and the computer module. Schmitt triggers U7, resistors R5, R6, R7, R8, and diodes D3-D6 are provided for noise isolation and line driving.

The RS-232 circuitry includes an RS-232 transceiver MAX 232 U2, capacitors C6, C7, C8, C9, C10, and non-inverting buffers U1, which buffer the flash program sensor signal from the processor.

Figure 3B:
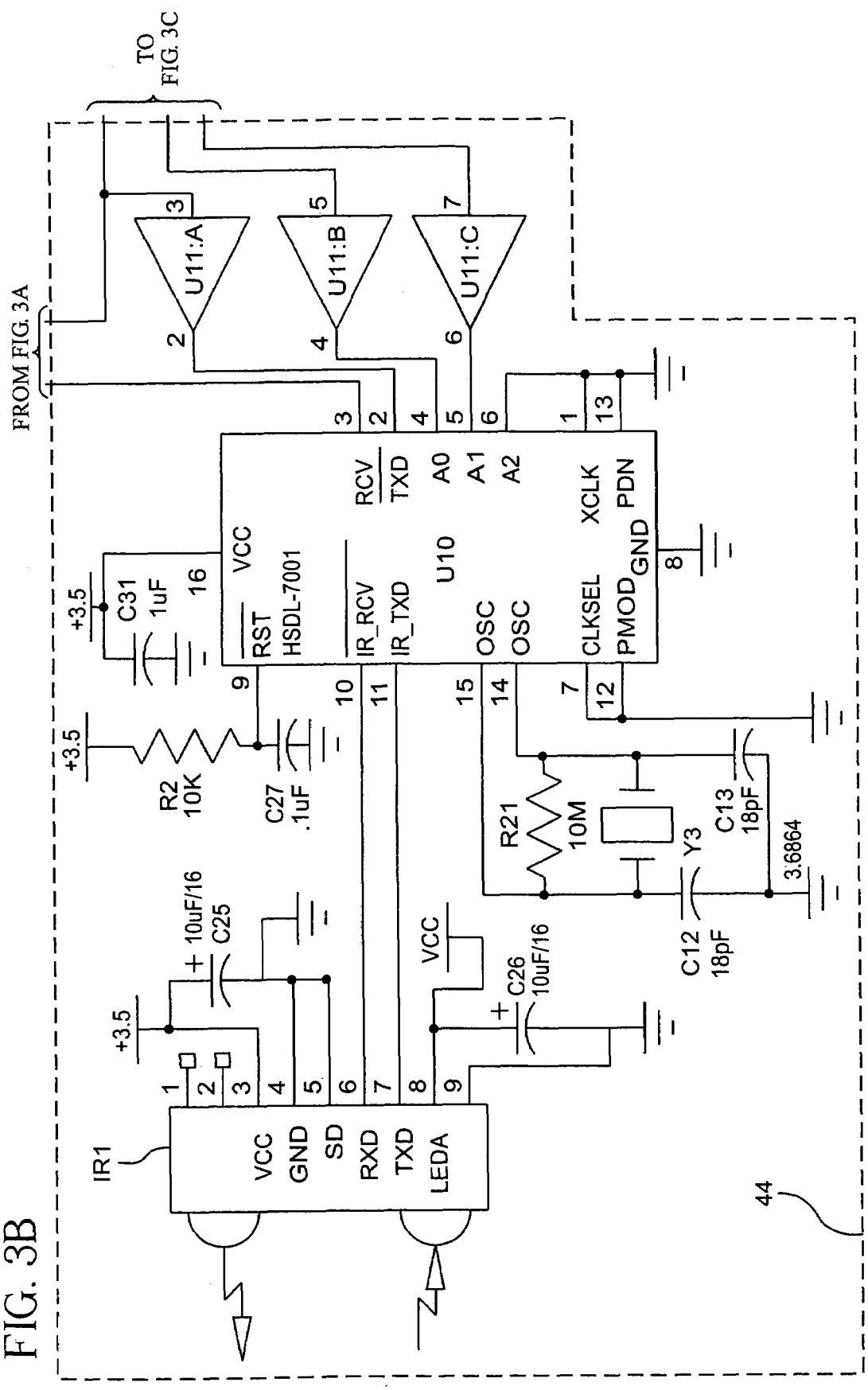
Figure 3C:
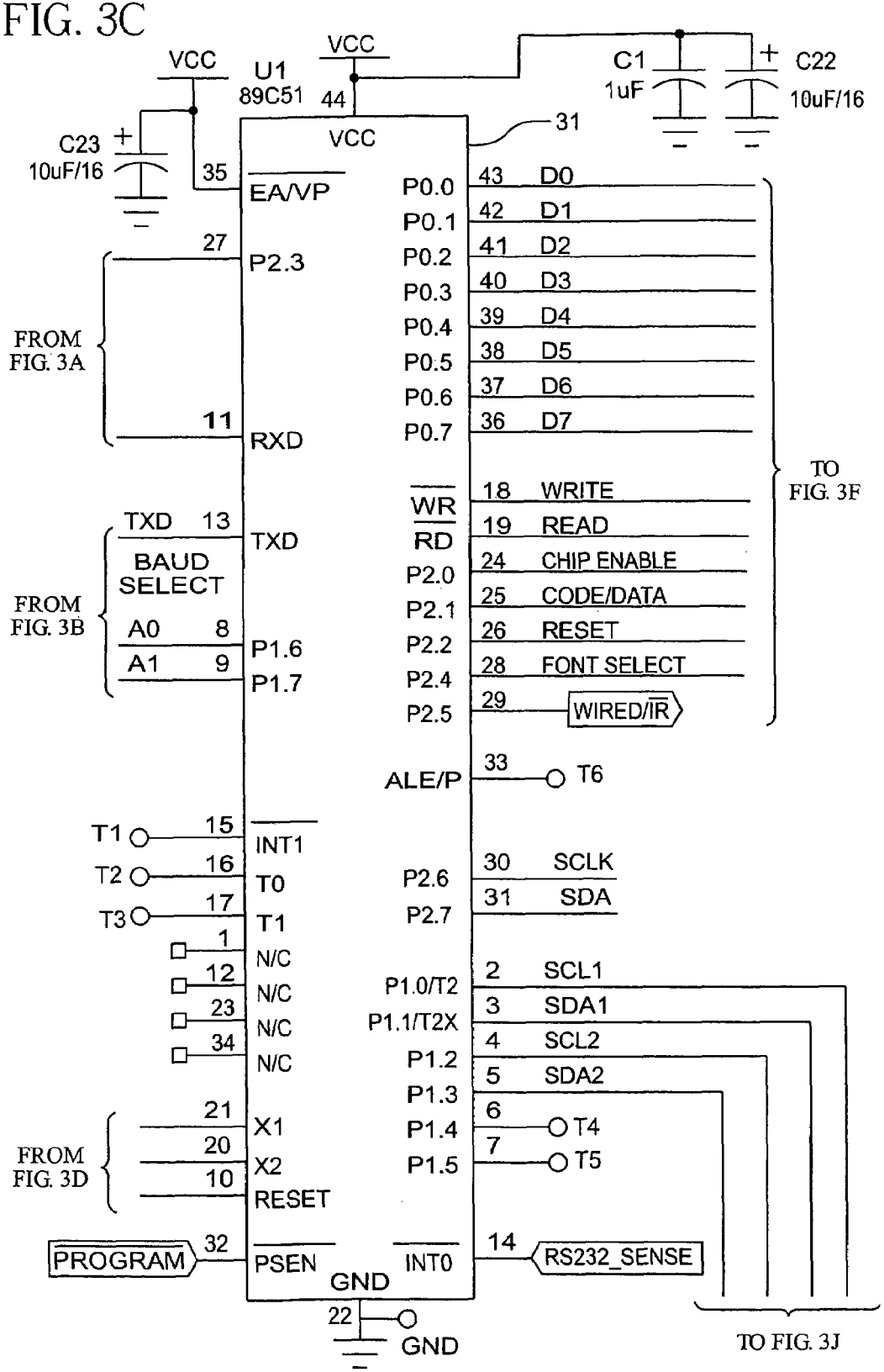
Figure 3D:
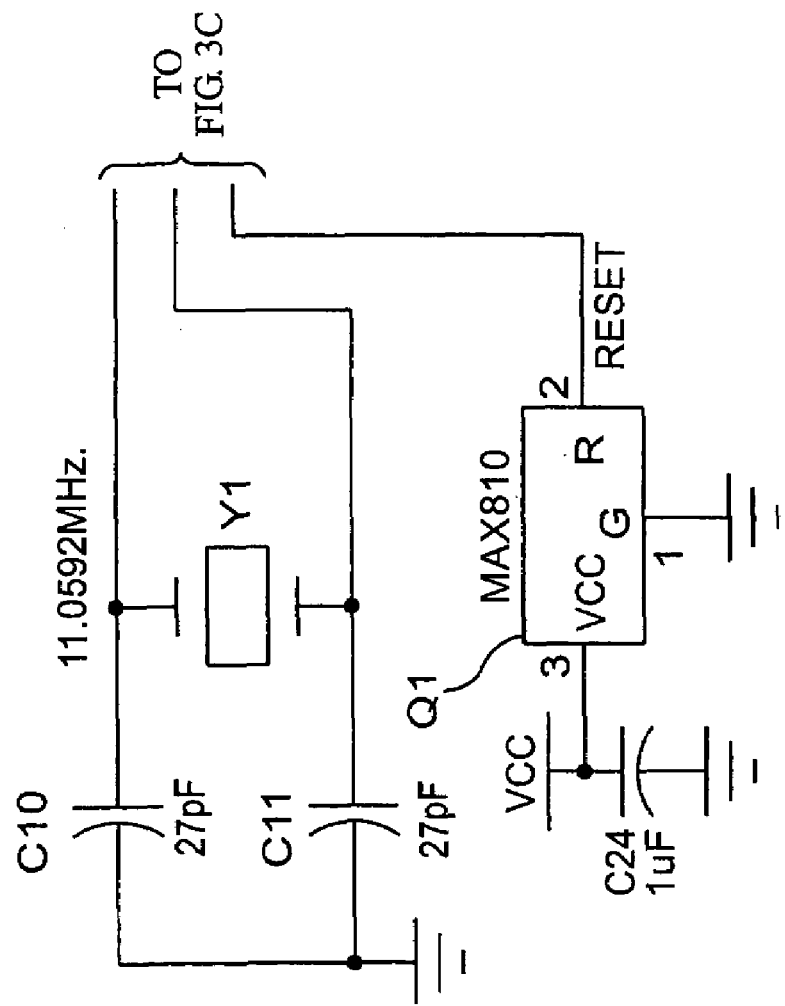
Figure 3E:
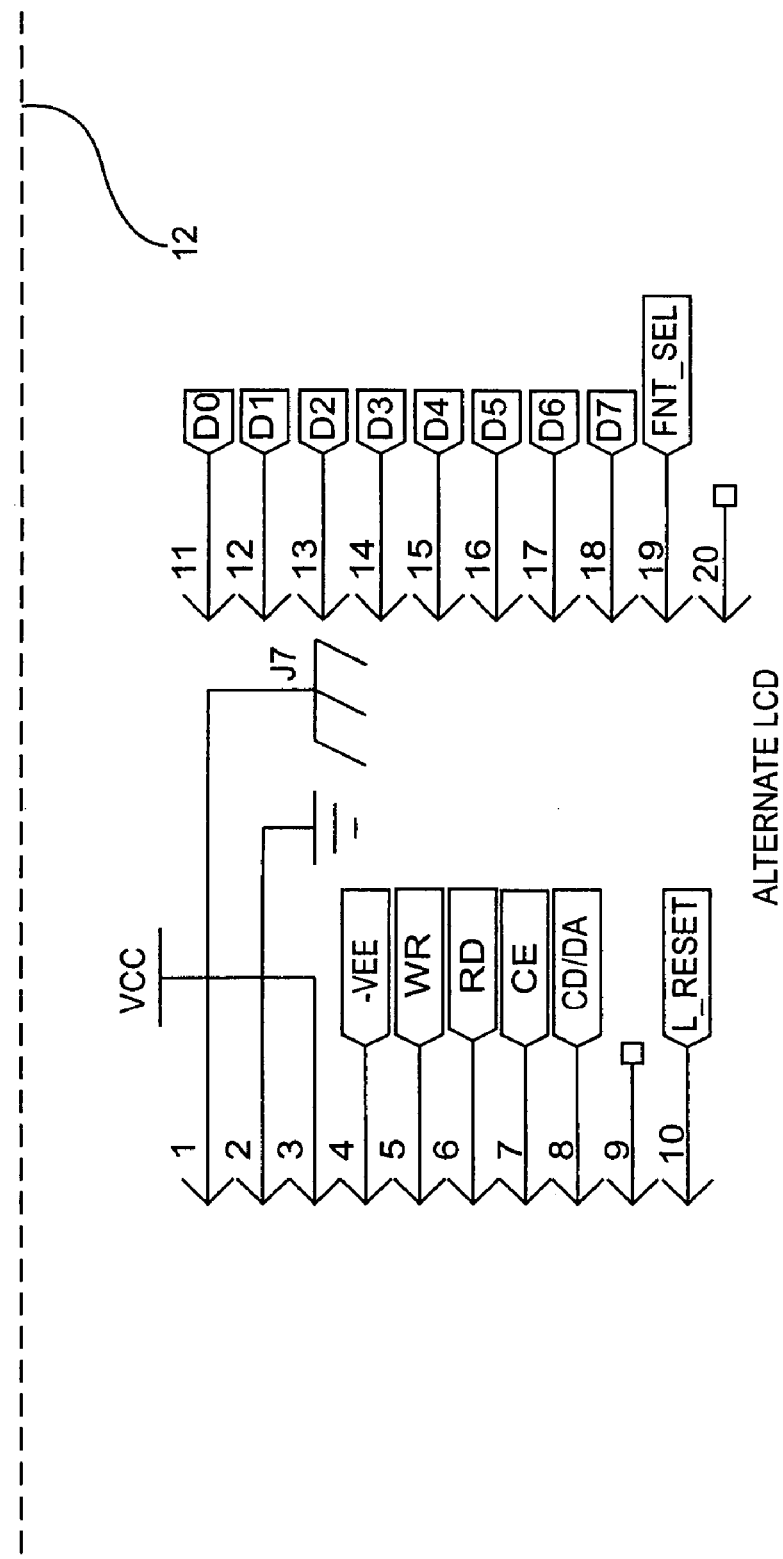
Figure 3F:
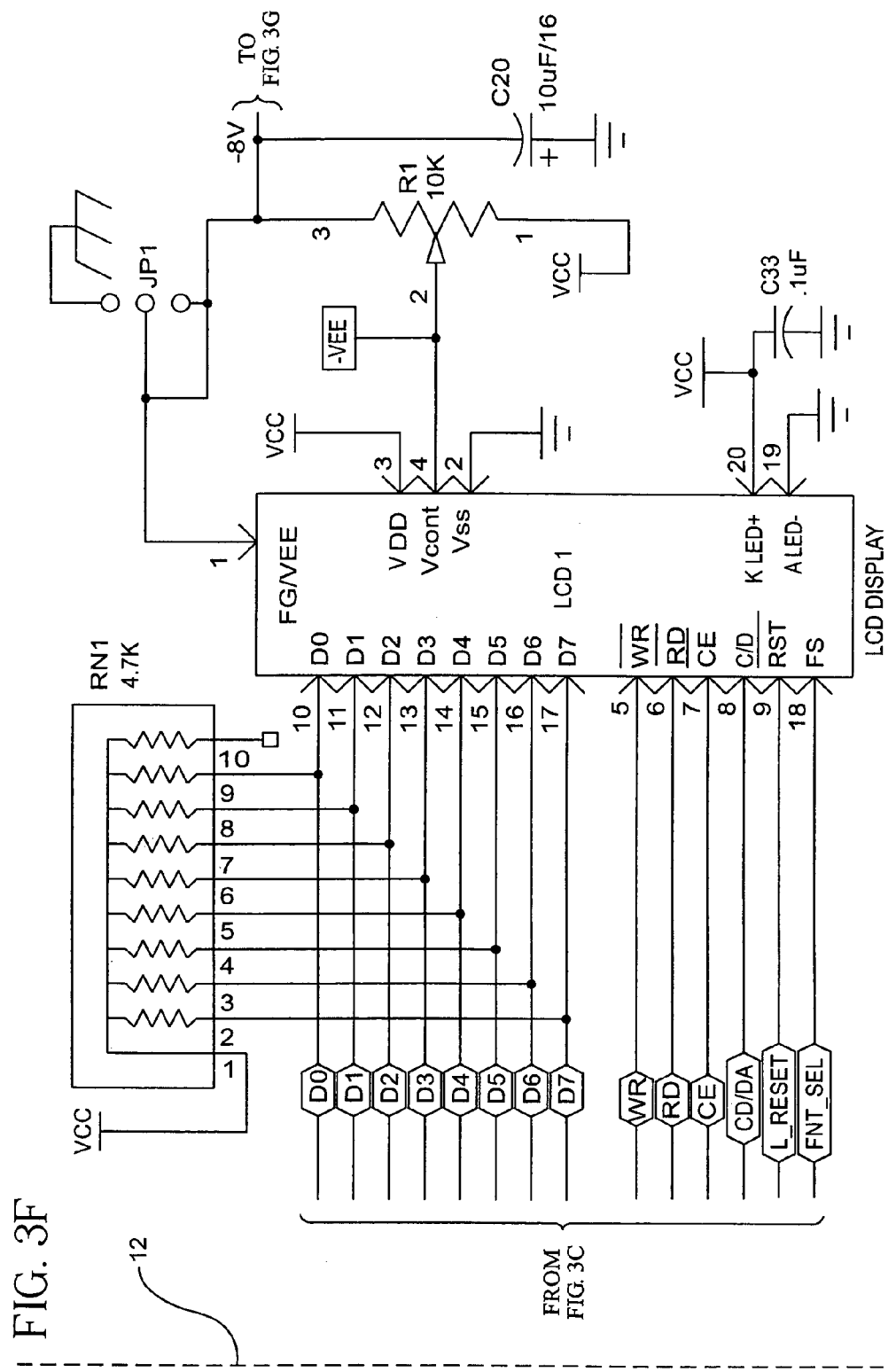
Figure 3G:
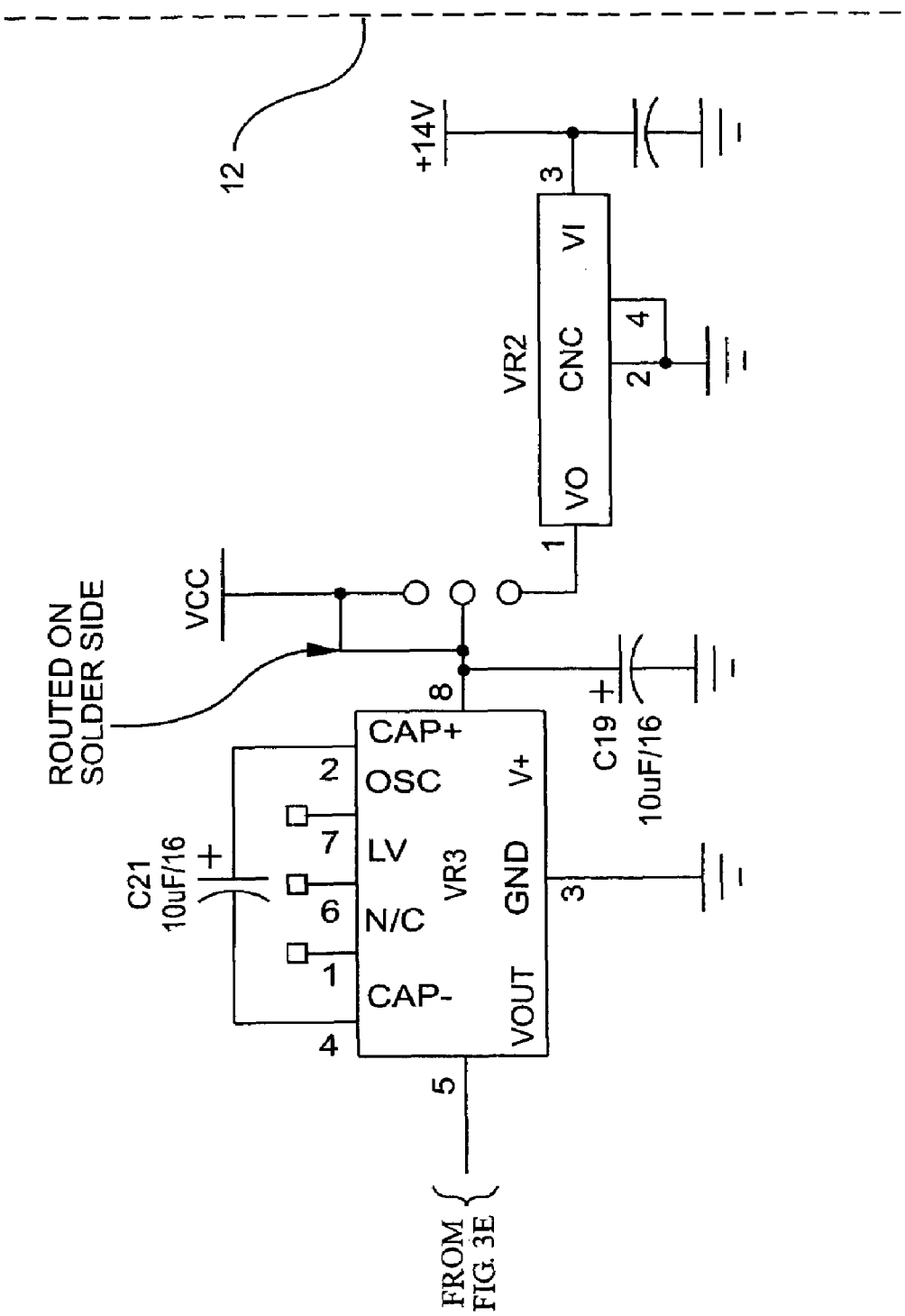
Figure 3H:
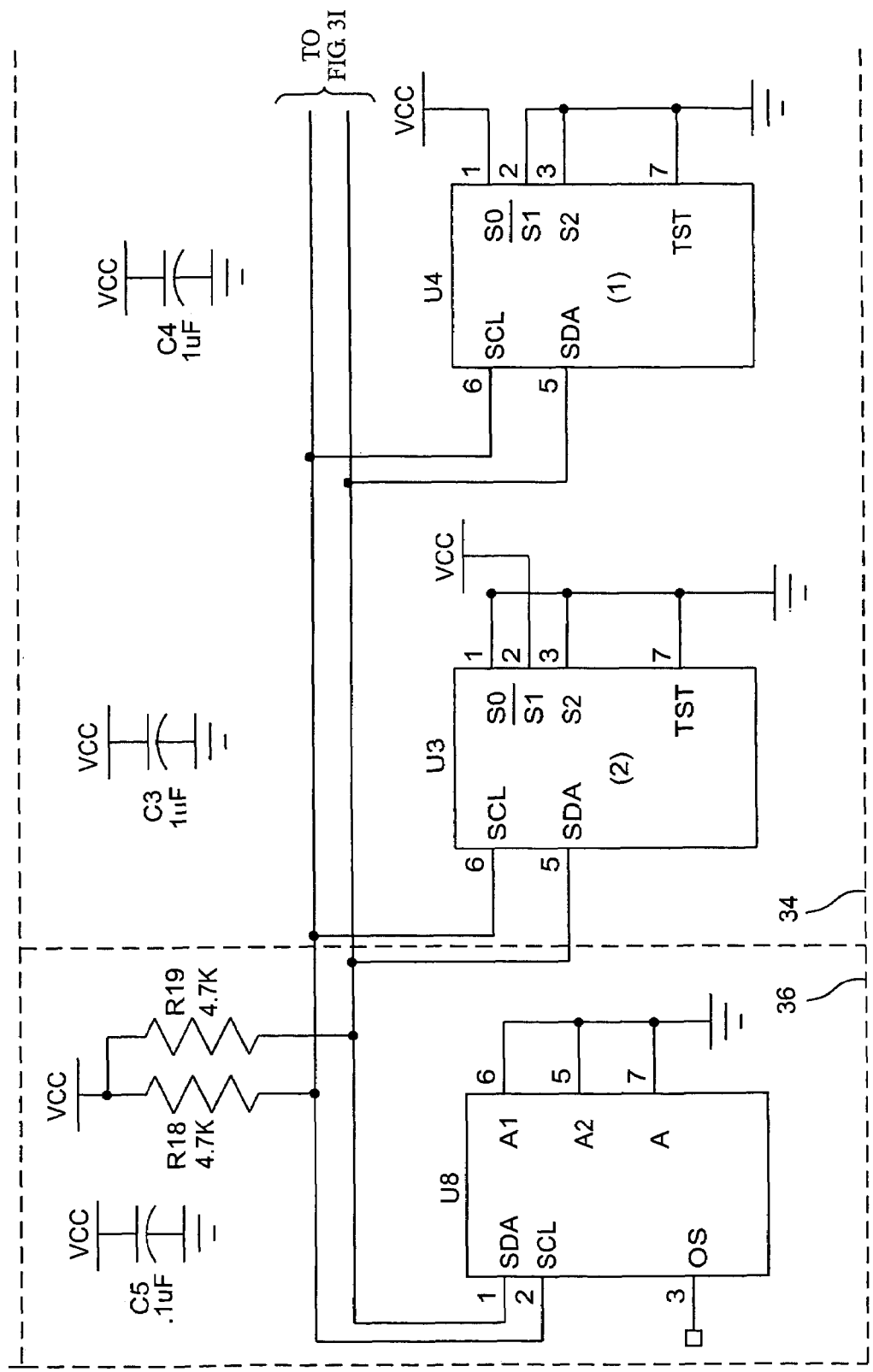
Figure 3I:
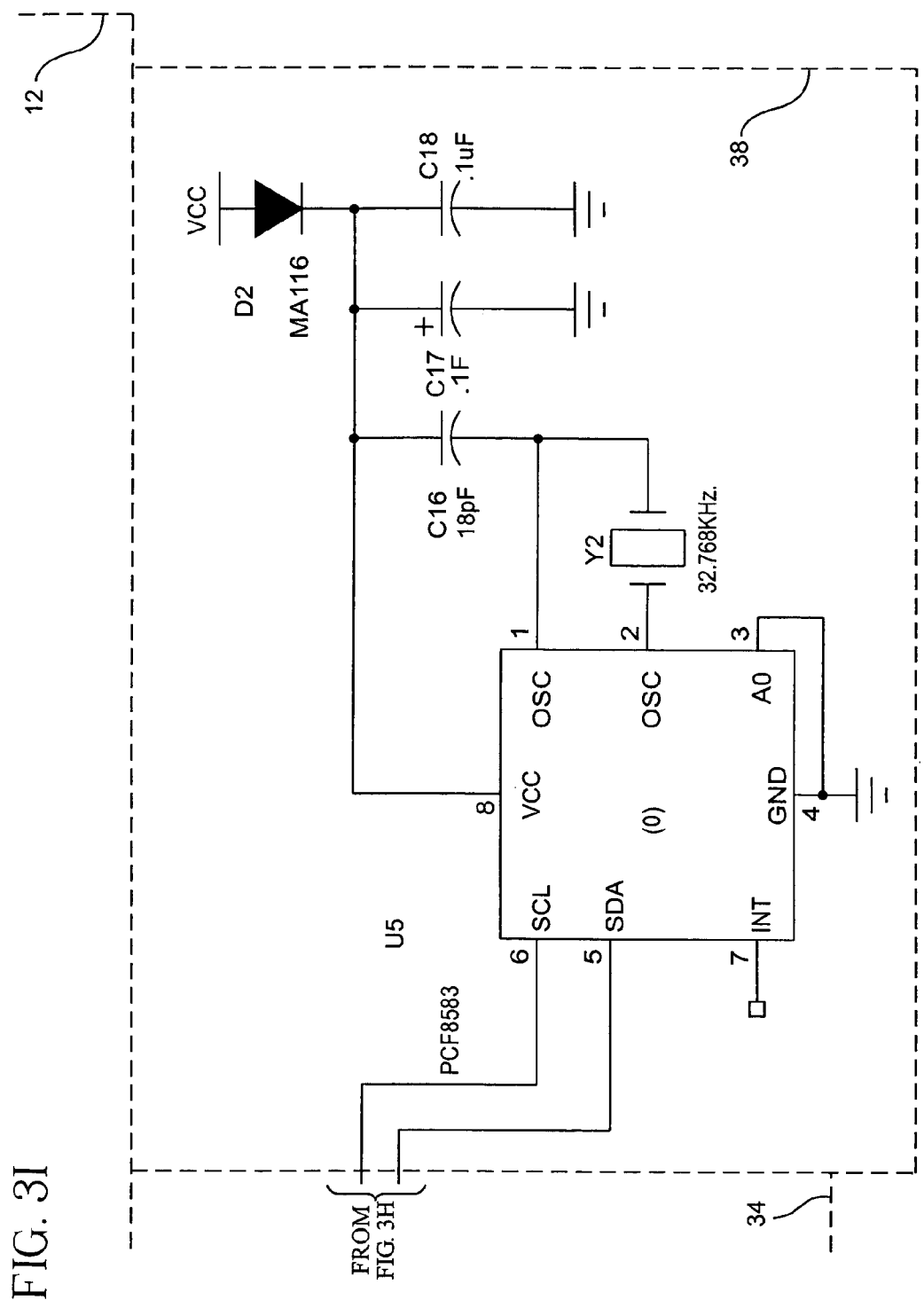
Figure 3J:
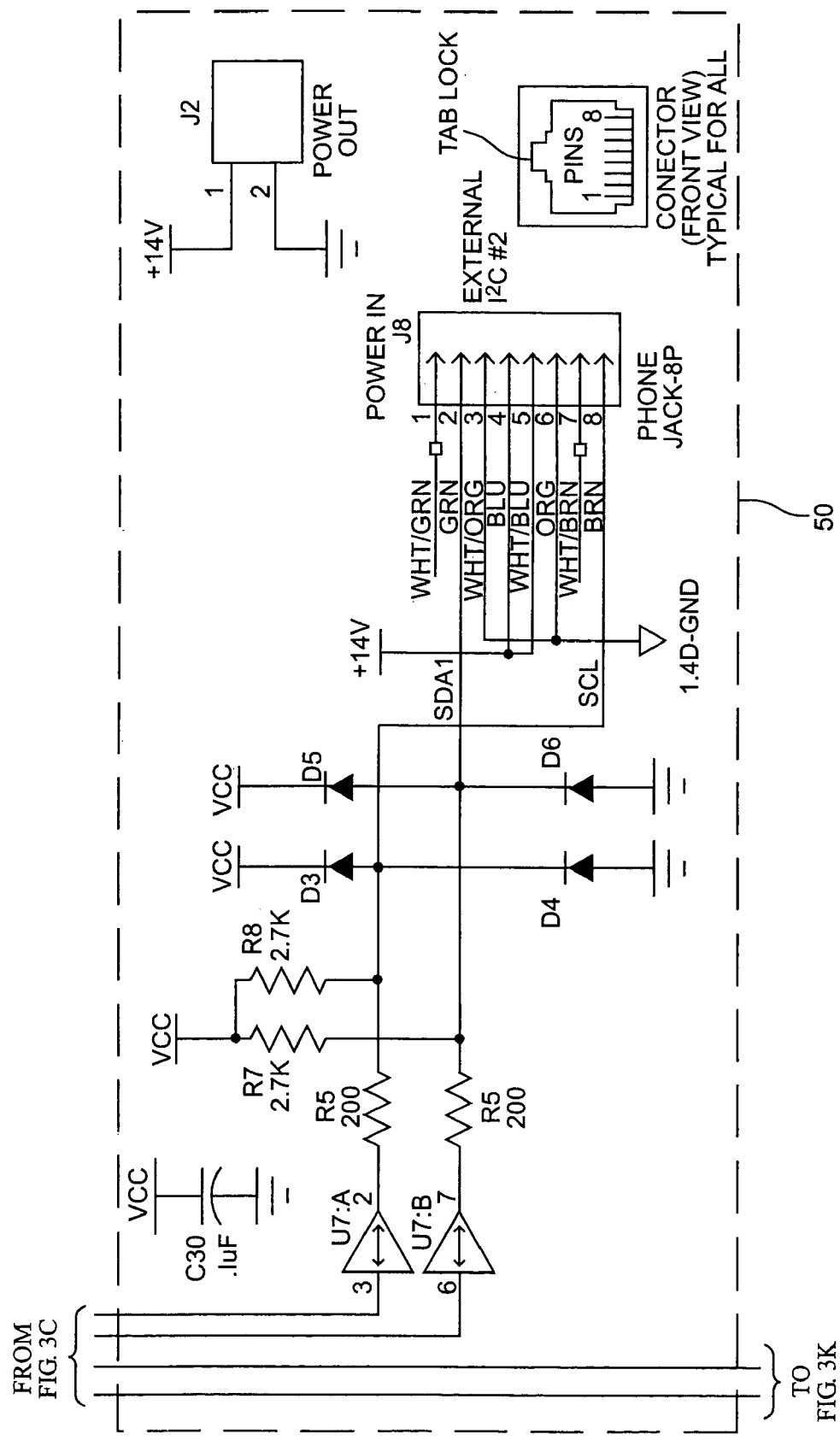
Figure 3K:
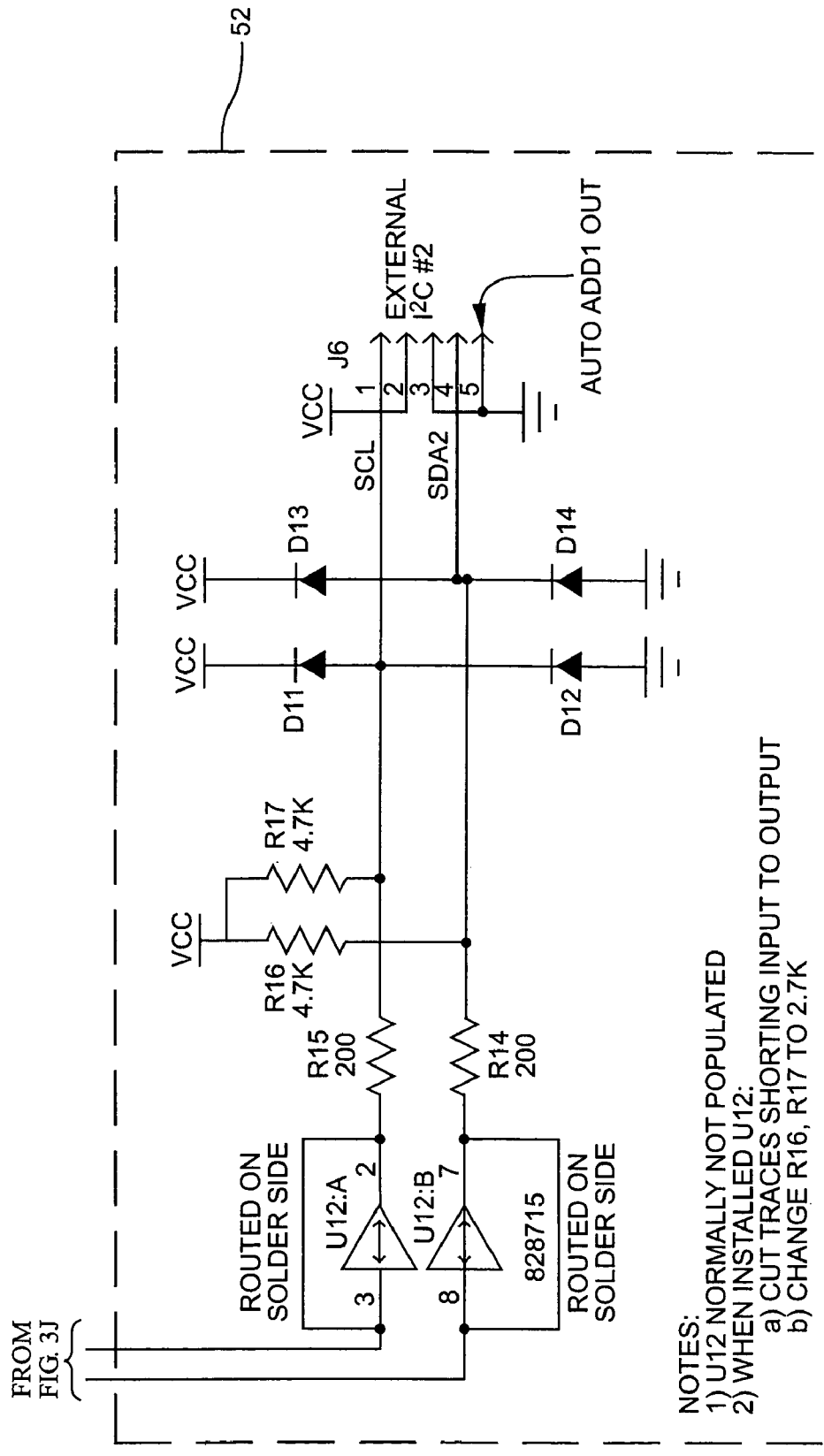
Figure 3L:
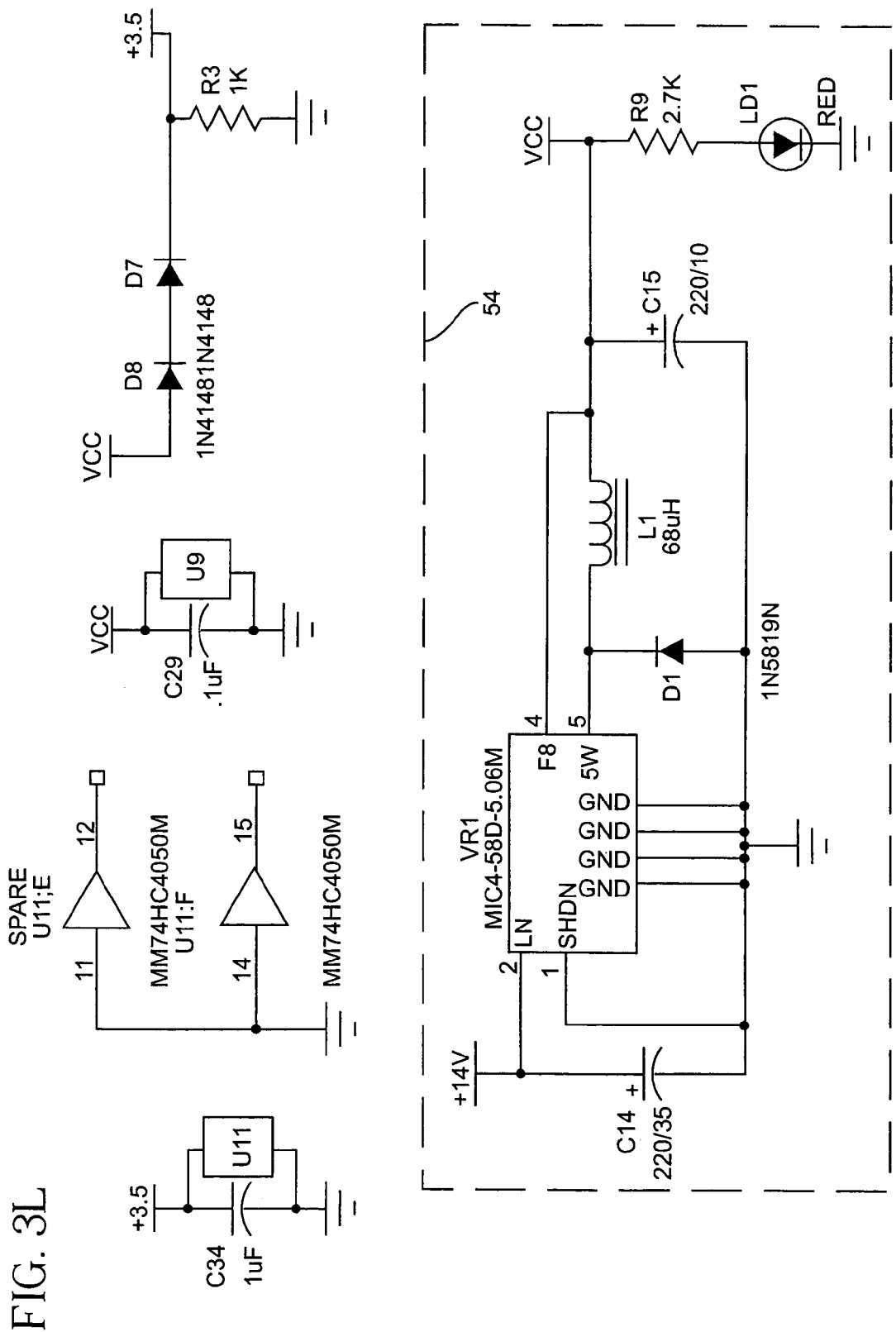

The computer module schematic shown in FIG. 3B includes infrared port circuitry 44. Level shifters U11 lower the voltage to 3.5V for the infrared circuitry 44. The data is then modulated by an encoder decoder chip U10, oscillator Y3, capacitors C12, C13, and resistor R10. The modulated data is then sent to the infrared emitter-detector IR1.

The real-time clock circuitry U5 includes a real-time clock device PCF8583 U5, an oscillator Y2, capacitors C16, C17, C18, and a diode D2. The sounder circuit 48 preferably includes a transistor Q2, a diode D15, and a speaker SP1.

The port switch circuitry 46 preferably includes nand gates U9 A-D. Table 1 is a preferred parts list for the computer module 10, as described above with respect to FIGS. 3A-3L.

TABLE 1

Parts List for the Computer Module

| Qnty | Part # | Title | Description | Reference |
|---|---|---|---|---|
| 1 | 820100 | LCD Assy. | LCD Graphic Module, 128x64 LED Back Light (United Radiant Tech.) | LCD1 |
| 1 | 640000 | Sounder | Sounder, Audio X-Ducer 6 V(4-12 v) (Audio X-Ducer) | SP1 |
| 1 | 634-1-ST-20 | Header, .100 | Header, 20 Pos Straight .100 (Crane) | J7 (SOLDER TO LCD DISPLAY FIRST) |
| 1 | 634-1-RA-05 | Header .100 | Header 5 Pos Right Angle .100 (Crane) | J6 |
| 1 | 634-1-RA-02 | Header, .100 | Header, 2 Pos Right Angle .100 (Crane) | J2 |
| 1 | 633-1-8X8-T | Modular Jack | Modular Jack, Top Entry, 8x8 (Amp) | J8 |
| 1 | 633-1-6X6-T | Connector | Phone Jack, 6x6 Top Entry Without Stops (Amp) | J1 |
| 1 | 561000 | Crystal | Crystal, Surface Mount, 11.0592 MHZ, Quartz (Citizen) | Y1 |
| 1 | 551-2N7002 | Transistor | Transistor, Surface Mount, FET 2N7002 (Philips Semiconductor) | Q2 |
| 1 | 540-RS-MAX232 | IC, Surface Mount | IC RS-232 Transmitter and Receiver, MAX232CSE (SGS Thompson) | U2 |
| 1 | 540-MM74HC4050 | IC, Surface Mount | IC, Hex Logic Level DownConverter MM74HC4050M (Philips Semiconductor) | U11 |
| 1 | 540-MC-89C51RD2 | IC | IC Microcontroller 64K Flash Eprom 89C51RD2, SMD (Philips Semiconductor) | U1 |
| 1 | 540-DTS-LM75 | IC | IC, Surface Mount, Digital Temp. Sensor, SMD (National) | U8 |
| 1 | 540-DS1833 | IC | IC, Microprocessor Reset, SOT-23, DS1833Z-10 (Dallas) | Q1 |
| 1 | 540-82B715 | IC, Surface Mount | I square C, Bus Expander 82B715TD (Philips Semiconductor) | U7 |

TABLE 1-continued

Parts List for the Computer Module

| Qnty | Part # | Title | Description | Reference |
|---|---|---|---|---|
| 1 | 540-74HC00 | IC | IC, Surface Mount 2 Input, Nand Gate, SMD (Fairchild) | U9 |
| 1 | 540-246C64 | IC, Surface Mount | IC, Surface Mount, SERIAL EEPROM 8Kx8 (Micro Chip) | U4 |
| 1 | 531001 | Voltage Regulator | Voltage Regulator MIC4680-5.0BM, SMD (Micrel) | VR1 |
| 1 | 513002 | Diode | Diode, 1N5819MCT, Surface Mount (Diodes Inc.) | D1 |
| 9 | 513001 | Diode | Diode, 1N4148, Surface Mount (Micro-Semi) | D3, D4, D5, D6, D11, D12, D13, D14, D15 |
| 1 | 511000 | IC, Surface Mount | IC, Surface Mount, LED, Red (Lite-On) | LD1 |
| 1 | 400300 | PCB, InTeMod Processor Board | PCB, InTeMod Processor Board (National Tech) | |
| 1 | 315-3-220UF-35V | Surface Mount Electrolytic Cap. | Cap. 220 uF, 35 V, +/−20%, Surface Mount (Panasonic) | C14 |
| 1 | 314-3-220UF-10V | Surface Mount Tantalum Electrolytic Chip Cap. | Cap 220 uF, 10 V, +/−20%, Low ESR (Aux) | C15 |
| 2 | 314-2-10UF-16V | Surface Mount Tantalum Electrolytic Chip Cap. | Cap 10 uF, 16 V, +/−20% (Panasonic) | C22, C23, |
| 2 | 313-2-27PF-50V | Surface Mount Multilayer Ceramic Chip Cap. | Cap 27 pF, 50 V, +/−5% (Panasonic) | C10, C11 |
| 13 | 313-0-.1UF-50V | Surface Mount Multilayer Ceramic Chip Cap. | Cap .1 uF, 50 V, +/−10% (Panasonic) | C1, C2, C4, C5, C6, C7, C8, C9, C24, C29, C30, C33, C34 |
| 1 | 191000 | Inductor | 68 uH Coil, Surface Mount, UP2B-680 Tape and Reel (Coiltronics) | L1 |
| 1 | 151472 | SIP Resistor | SIP, 9 Res 4.7K 10 Pin Bussed (Bourns) | RN1 |
| 1 | 144103 | Potentiometer | Pot, 10K 3 mm, Top Adjust, Surface Mount (Bourns) | R1 |
| 8 | 08-3-004.7K | Surface Mount Thick Film Chip Resistor | Resistor, 4.7K, ⅛ W, 5% (1206 5000 mag) (Panasonic) | R4, R9, R11, R13, R16, R17 R18, R19(DO |
| 2 | 08-3-002.7K | Surface Mount Thick Film Chip Resistor | Resistor, 2.7K, ⅛ W, 5% (1206) (Panasonic) | R7, R8 |
| 4 | 08-0-200 | Surface Mount Thick Film Chip Resistor | Resistor, 200, ⅛ W, 5%, 1206 (Panasonic) | R5, R6, R15, R14 |
| 1 | 07-3-002.7K | Surface Mount Thick Film Chip Resistor | Resistor, 2.7K, ⅛ W, 1% (1206) (Panasonic) | R9 |
| 4 | 011408 | Hardware | Nylon Spacer #4 × .250 × .25 OD | LCD1 |
| 4 | 002201 | Hardware | Nut, #2-56 SS | LCD1 |
| 4 | 001216 | Hardware | Screw, 2-56x½ Pan Head SS Screw | LCD1 |

Table 2 is a preferred net list for the computer module 10. The net list provides a listing of connectivity between components located on the circuit board according to the reference designations corresponding to the components and pin numbers of the components shown in FIGS. 3A-3L.

TABLE 2

Net List for Computer Module
Net list for PCB 400300

Net WR, U1-18, J7-5, J5-5;
Net D7, U1-36, RN1-2, J7-17, J5-18;
Net D6, U1-37, RN1-3, J7-16, J5-17;
Net D5, U1-38, RN1-4, J7-15, J5-16;
Net D4, U1-39, RN1-5, J7-14, J5-15;
Net D3, U1-40, RN1-6, J7-13, J5-14;
Net D2, U1-41, RN1-7, J7-12, J5-13;
Net D1, U1-42, RN1-8, J7-11, J5-12;
Net GND, C14-2, VR1-1, VR1-5, VR1-6, VR1-7, VR1-8, U11-14, C34-B, U11-11,
R3-A, C26-2, IR1-4, IR1-5, IR1-9, C12-B, U10-7, U10-12, U10-8, U10-6, U10-1,
U10-13, C10-B, C11-B, C13-B, C24-B, C29-B, U1-22, C30-B, U8-5, U8-6, U8-7,
Q1-1, Q1-4, D1-A, C15-2, LD1-1, C27-B, C25-2, J1-6, J1-2, C7-1, U2-10, U2-8, U2-15,
C31-B, C2-B, Q2-1, C1-B, C23-2, C22-2, C5-B, C3-B, J7-2, C20-1, VR3-3, J7-19,
C33-B, C4-B, J5-2, C19-2, C18-B, C17-2, C28-B, VR2-4, VR2-2, D12-2, D14-2,
J6-3, J6-5, D6-2, D4-2, U3-1, U3-3, U3-7, U5-3, U5-4, U4-2, U4-3, U4-7, J8-3, J8-6,
J2-2, U11-8, U3-4, U9-7, U4-4, U7-4, U8-4, U12-4;
Net NET00012, R5-B, U7-2;

TABLE 2-continued

Net List for Computer Module
Net list for PCB 400300

Net NET00058, U9-3, U9-4;
Net NET00092, VR1-3, D1-K, L1-1;
Net NET00041, C18-A, C16-A, C17-1, D2-2, U5-8;
Net VCC, VR1-4, D8-2, C26-1, IR1-8, C24-A, C29-A, U1-35, U1-44, C30-A, Q1-3,
C15-1, L1-2, R9-B, R4-B, U2-16, C6-2, C2-A, D15-1, SP1-1, C1-A, C23-1, RN1-1,
C22-1, C5-A, R18-B, R19-B, C3-A, J7-3, J7-20, VR3-8, R1-1, C33-A, C4-A, J5-3,
C19-1, D2-1, JP2-2, JP2-1, D13-1, D11-1, R16-B, R17-B, J6-2, R8-B, R7-B, D3-1,
D5-1, U3-2, U4-1, U3-8, U9-14, U4-8, U7-8, U8-8, U12-8,
Net D0, U1-43, RN1-9, J7-10, J5-11;
Net NET00028, VR3-4, C21-2;
Net NET00029, VR3-2, C21-1;
Net CE, U1-24, J7-7, J5-7;
Net CD/DA, U1-25, J7-8, J5-8;
Net L_RESET, U1-26, J7-9, J5-10;
Net FNT_SEL, U1-28, J7-18, J5-19;
Net RD, U1-19, J7-6, J5-6;
Net NET00081, R9-A, LD1-2;
Net NET00004, D15-2, Q2-3, SP1-2;
Net NET00082, U1-6, T4-1;
Net NET00018, U1-10, Q1-2;
Net NET00021, U1-30, U8-2, R18-A, U3-6, U5-6, U4-6;
Net NET00022, U1-31, U8-1, R19-A, U3-5, U5-5, U4-5;
Net NET00019, C11-A, U1-20, Y1-2;
Net NET00020, C10-A, U1-21, Y1-1;
Net NET00043, C16-B, U5-1, Y2-2;
Net NET00017, U5-2, Y2-1;
Net NET00083, U1-7, T5-1;
Net NET00008, U1-27, Q2-2;
Net NET00000, U1-33, T6-1;
Net NET00032, R21-B, Y3-1, C12-A, U10-15;
Net Net00075, J1-4, U2-14;
Net NET00001, U1-11, U9-6,
Net NET00060, U1-4, R15-B, U12-2, U12-3;
Net NET00006, U10-3, U9-12;
Net NET00016, R6-B, U7-7;
Net NET00009, C20-2, J7-1, VR3-5, JP1-2, JP1-3, R1-3;
Net NET00062, R14-A, D14-1, D13-2, R16-A, J6-4;
Net NET00077, R15-A, D12-1, D11-2, R17-A, J6-1;
Net NET00040, U7-3, U1-2;
Net NET00044, U7-6, U1-3;
Net NET00002, D8-1, D7-2;
Net NET00053, U1-13, U2-11, U11-3;
Net WIRED/²IR, U1-29, U9-1, U9-9, U9-10;
Net +14 V, C14-1, VR1-2, C28-A, VR2-3, J8-4, J8-5, J2-1;
Net NET00057, U11-6, U10-5;
Net NET00138, U2-1, C8-1;
Net NET00054, U10-2, U11-2;
Net NET00013, U1-17, T3-1;
Net −VEE, J7-4, R1-2, J5-4;
Net NET00034, R21-A, Y3-2, U10-14, C13-A;
Net NET00143, U2-2, C6-1;
Net NET00069, U2-5, C9-2;
Net NET00073, C7-2, U2-6;
Net NET00074, U2-3, C8-2;
Net NET00076, U2-4, C9-1;
Net NET00052, J1-3, U2-13;
Net NET00048, IR1-6, U10-10;
Net NET00080, U1-5, R14-B, U12-7, U12-6;
Net NET00055, U1-8, U11-5;
Net NET00005, U10-4, U11-4;
Net NET00056, U11-7, U1-9;
Net NET00015, U1-16, T2-1;
Net NET00007, IR1-7, U10-11;
Net NET00059, U9-11, U9-5;
Net NET00064, U9-13, U9-8;
Net +3.5, C34-A, R3-B, D7-1, IR1-3, U10-16, R2-B, C25-1, C31-A, U11-1;
Net EARTH, JP1-1, J5-1;
Net Net00023, U1-15, T1-1;
Net NET00014, U10-9, C27-A, R2-A;
Net NET00031, R6-A, D6-1, R7-A, D5-2, J8-2;
Net NET00049, R5-A, D4-1, R8-A, D3-2, J8-8;
Net RS-232_SENSE, U1-14, U2-12, U9-2;
Net NET00066, JP2-3, VR2-1;
Net NET00067, J1-5, R4-A, U11-9;
Net ²PROGRAM, U1-32, U11-10.

Detailed Description of LCD Graphics Display Module

The LCD graphics display modules are industry standard modules. The preferred device includes a Toshiba T6963 driver. These drivers are implemented in display dot pitch sizes ranging from 128×64 to 240×128. They are backlit using LED and cold cathode florescent displays. The display is chosen in accordance with the particular requirements of the application according to the application such as size, back light requirements, and cost. The LCD standard graphic display modules preferably include two styles of connectors, a single row 20 pin and a dual row 20 pin, both of which are included in the computer module.

The software drivers are preferably written so that the display size parameters are adjustable. This allows the LCD size to be entered and the software recompiled.

Detailed Description of the Keyboard Module

FIG. 1 shows the keyboard module 14 in the top-level block diagram. The keyboard module 14 is used to enter data into the computer module 10. The keyboard module 14 is preferably connected to the computer module 10 via an I²C bus.

FIG. 4 is a preferred keyboard overlay 56 layout formed in accordance with the present invention. Two soft keys 58 that are located below an LCD display 60 at the far ends of the display and text on the display 60 labels the keys 58 depending on the state of the machine. Other keyboards may be laid out in similar configurations while remaining within the scope of the present invention.

Three keys 62 in the center of the layout are preferably used to scroll through selections and data for entry. The center select key 62 is used to select the mode or enter data.

Two function keys 64 near the bottom of the overlay are preferably used to jump to specific modes or states. Preferably, they are used to jump to a certain edit mode. An example would be the key labeled Time. When pressed, control preferably jumps to an edit time state. These two keys may be expanded to encompass all states that need to be readily accessed.

The LCD graphics module is preferably viewed through a clear window over the display 60. An infrared window 66 is preferably located in the upper right-hand corner of the overlay.

FIG. 5 is a preferred keyboard module circuit board schematic formed in accordance with the present invention. The keys are read by an I²C port expander chip PCF8574T U1. The processor preferably reacts to the keys as required to perform the selected equipment function.

Table 3 is a preferred parts list for the keyboard module 14 as shown in FIG. 5.

This keyboard is the preferred generic keyboard, but other keyboards for specific applications may be designed so as to more closely match the equipment functional requirements.

Multiple modules may be plugged into the system. The modules are addressed using auto address-in signal J1-17 and auto address-out signal J2-17. The auto-addressing scheme is described below.

Table 3 is a preferred parts list for the keyboard module 14 shown in FIG. 5.

TABLE 3

Parts List for Keyboard Module

| Item No | Qnty | Part no | Title | Detail | Reference |
|---|---|---|---|---|---|
| 1 | 1 | 635-1-5-2.0 | Flex Cable | Flex Cable .1SP., 5 Pos 2" (Amp) | J2 (SOLDER ON SOLDER SIDE) |
| 2 | 1 | 634-1-RA-05 | Header .100 | Header 5 Pos Right Angle .100 (Crane) | J2 (SOLDER ON SOLDER SIDE) |
| 3 | 7 | 600032 | Switch | Switch, Momentary Tactile Surface mount On Reel (Schurter) | SW1-SW7 |
| 4 | 1 | 540-8574 | IC, Surface Mount | 8-Bit I/O Expander (Signetics) | U1 |
| 5 | 1 | 400320 | PCB, INTEMOD Keypad Board | PCB, INTEMOD Keypad Board (Jet Technology) | |
| 6 | 1 | 313-0-.1UF-50V | Surface Mount Multilayer Ceramic Chip Cap. | Cap .1 uF, 50 V, +/−10% (Panasonic) | C1 |
| 7 | 2 | 08-0-200 | Surface Mount Thick Film Chip Resistor | Resistor, 200, ⅛ W, 5%, 1206 (Panasonic) | R1, R2 |

Table 4 is a preferred net list for the keyboard module 14. The net list provide a listing of connectivity between components located on the circuit board according to the reference designations corresponding to the components and pin numbers for the components shown in FIG. 5.

TABLE 4

Net List for Keyboard Module
NET List For PCB 400320 Keyboard module

Net name VCC, U1-16J1-2J2-2C1-A;
Net name 00054, U1-4SW1-3SW1-4;
Net name 00008, U1-5SW2-3SW2-4;
Net name EARTH;
Net name 00000, J1-5-J2-5;
Net name 00001, R2-BJ1-4J2-4;
Net name GND, U1-3U1-2U1-1J1-3J2-3C1-BSW1-1SW1-2SW2-1SW2-2SW3-1SW3-2SW4-1SW4-2SW5-1SW5-2SW6, 1SW6-2SW7-1SW7-2;
Net name 00049, U1-6SW3-3SW3-4;
Net name 00050, U1-7SW4-3SW4-4;
Net name 00051, U1-9SW5-3SW5-4;
Net name 00052, U1-10SW6-3SW6-4;
Net name 00053, U1-11SW7-3SW7-4;
Net name 00063, R1-AU1-14;
Net name 00064, R2-AU1-15;
Net name 00065, R1-BJ1-1J2-1.

Detailed Description of the Power Supply Module

FIGS. 6A and 6B are schematic diagrams of a preferred power supply module circuit board formed in accordance with the present invention. 10VAC power is preferably applied to connector J2, rectified by bridge rectifier BR2, and filtered by capacitor C2. Resistor R3 and LED LD1 form a power-on indicator. Regulator VR1 and support components diode D1, inductor L1, and capacitor C3 form the +5 volt power supply for all connected I/O modules.

18VAC power connector J1 is preferably used for driving 12-24 VDC motors. Bridge rectifier BR1 and capacitor C1 rectify and filter the 18VAC power signal.

The computer module 10 preferably plugs into connector J3 with an RJ45 connector and Cat 5 cable. J4 is used for connection to an auxiliary bus. Buffer U1 is an I²C bi-directional line driver and is used to drive the I²C bus cable. Main connector J5 preferably defines the beginning of the I/O module power and communication bus.

A zero crossing detector is preferably provided so that the digital I/O module 22 will switch relay voltages at a zero crossing. This minimizes the electrical noise that the system will generate.

Table 5 is a preferred parts list for the power supply module 20 as shown in FIGS. 6A-6B.

TABLE 5

Parts List for Power Supply Module

| Item | Qnty | Part Num | Title | Description | Reference |
|---|---|---|---|---|---|
| 1 | 1 | 634-RA-20 | Socket, .100 | Socket, 20 Pos, Right Angle .100 (Samtec) | J5 |
| 2 | 2 | 634-3-ST-02 | Header, .156 | Header, 2 Pos, Straight Locking .156 (Samtec) | J1, J2 |
| 3 | 1 | 633-1-8X8-T | Modular Jack | Modular Jack, Top Entry, 8x8 (Amp) | J3, J4 |
| 4 | 1 | 540-OPTO-PS2701-1 | Optical | Opto Isolator Surface Mount, PS2701-1 (NEC) | U2 |
| 5 | 1 | 540-82B715 | IC, Surface Mount | I square C, Bus Expander 82B715TD (Philips Semiconductor) | U1 |
| 6 | 1 | 531001 | Voltage Regulator | Voltage Regulator MIC4680-5.0BM, SMD (Micrel) | VR1 |
| 7 | 1 | 513002 | Diode | Diode, 1N5819MCT, Surface Mount (Diodes Inc.) | D1 |
| 8 | 1 | 513001 | Diode | Diode, 1N4148, Surface Mount (Micro-Semi) | D2 |
| 9 | 3 | 511000 | IC, Surface Mount | IC, Surface Mount, LED, Red (Lite-On) | LD1, LD2, LD3 |
| 10 | 2 | 510000 | Diode | Diode, Bridge Rectifier 4A @ 50 V RS401L (Diodes Inc.) | BR1, BR2 |
| 11 | 1 | 400340 | PCB, Intemod Power Supply Board | PCB, Intemod Power Supply, Rev. A (National Tech.) | |
| 12 | 1 | 314-3-220UF-10V | Surface Mount Tantalum Electrolytic Chip Cap. | Cap 220 uF, 10 V, +/−20%, Low ESR (Panasonic) | C3 |
| 13 | 1 | 313-0-.1UF-50V | Surface Mount Multilayer Ceramic Chip Cap. | Cap .1 uF, 50 V, +/−10% (Panasonic) | C4 |
| 14 | 1 | 306-4-3300UF-35V | Cap., Electrolytic, Radial | Cap, 3300 uF, 20%, 35 V (Panasonic) | C2 |
| 15 | 1 | 306-4-2200UF-50V | Cap., Electrolytic, Radial | Cap, 2200 uF, 20%, 50 V (Panasonic) | C1 |
| 16 | 1 | 191000 | Inductor | 68 uH Coil, Surface Mount, UP2B-680 Tape and Reel (Coiltronics) | L1 |
| 17 | 1 | 08-3-004.7K | Surface Mount Thick Film Chip Resistor | Resistor, 4.7K, ⅛ W, 5% (1206 5000 mag) (Panasonic) | R7 |
| 18 | 5 | 08-3-002.7K | Surface Mount Thick Film Chip Resistor | Resistor, 2.7K, ⅛ W, 5% (1206) (Panasonic) | R3, R4, R5, R8, R9 |
| 19 | 1 | 08-3-001.0K | Surface Mount Thick Film Chip Resistor | Resistor, 1K, ⅛ W, 5% (1206 5000 mag) (Panasonic) | R6 |
| 20 | 2 | 08-0-200 | Surface Mount Thick Film Chip Resistor | Resistor, 200, ⅛ W, 5%, 1206 (Panasonic) | R1, R2 |

Table 6 is the preferred net list for the power supply module 20. The net list provides a listing of connectivity between components located on the circuit board according to the reference designations corresponding to the components and pin numbers for the components shown in FIGS. 6A-6B.

TABLE 6

Net List for Power Supply Module
NET NAME LIST FOR PCB 400340

Net name 00000, J1-1, BR1-1;
Net name 00001, J1-2, BR1-2;
Net name 00002, U2-4, T5-1, R7-A, J5-19;
Net name GND, J4-1, J4-7, JP2-2, JP2-1, J3-1, J3-7, JP1-2, JP1-1, T6-1, U2-3, D1-A, C3-2, LD3-1, C4-B, C2-MINUS, BR2-3, LD1-1, C1-MINUS, VR1-1, VR1-5, VR1-6, VR1-7, VR1-8, BR1-3, LD2-1, J5-1, J5-2, J5-11, J5-12, J5-6, J5-5, J5-14, U1-4;
Net name 00003, T7-1, R6-A, BR2-1, J2-1;
Net name 00016, LD1-2, R3-A;
Net name +24 V, C1-PLUS, BR1-4, R8-B, J5-3, J5-4;
Net name 00061, D1-K, VR1-3, L1-1;
Net name VCC, C3-1, R9-B, C4-A, VR1-4, L1-2, J5-9, J5-10, R7-B, R5-B, R4-B, U1-8;
Net name +14 V, J4-4, J4-5, J3-4, J3-5, C2-PLUS, BR2-4, R3-B, VR1-2, J5-7, J5-8;
Net name 00004, R9-A, LD3-2;

TABLE 6-continued

Net List for Power Supply Module
NET NAME LIST FOR PCB 400340

Net name 00017, R8-A, LD2-2;
Net name 00010, U1-2, R1-A;
Net name 00011, U1-7, R2-A;
Net name 00008, U1-6, J5-15, R5-A;
Net name 00005, T1-1, J5-16;
Net name 00007, T2-1, J5-17;
Net name 00013, T3-1, J5-18;
Net name 00014, T4-1, J5-20;
Net name +14 V-BROIL, J4-3, J4-6, J3-3, J3-6;
Net name 00015, R6-B, U2-1, D2-1;
Net name 00033, J4-8, J3-8, R2-B;
Net name 00019, U2-2, D2-2, BR2-2, J2-2;
Net name 00030, J4-2, J3-2, R1-B;
Net name 00020, U1-3, J5-13, R4-A.

Detailed Description of the Digital I/O Module

FIG. 1 shows the digital I/O module 22 connected to the system. Multiple digital I/O modules 22 may be added to the same system. The quantity of modules is only preferably limited by the power supply and I²C line drivers.

FIGS. 7A-7D show a preferred digital I/O module circuit board schematic formed in accordance with the present invention. The digital I/O module 22 is used to connect to external devices such as motors, motor contactors, and fans using relays K1 through K8. A relay driver ULN2803A U2 is used to provide the current necessary to drive the relays. Inverter U3 gate A transmits a zero crossing signal, which switches the relays at a zero crossing point. This minimizes the noise generated by large voltage spikes when the relay contact opens and closes.

The digital I/O module 22 also reads external switches using 8 optoisolators PS2801 U4 and U5.

Processor U1 preferably receives data from the computer module 10 and sets the relays, as required. Processor U1 also reads the optoisolators U4, U5 and holds the data for transmission back to the computer module 10.

Multiple modules may be plugged into the system. The modules are addressed using auto address in-signal J1-17 and auto address-out signal J2-17. The auto-addressing scheme is described below.

Table 7 is a preferred parts list for the digital I/O module 22 shown in FIGS. 7A-7D.

TABLE 7

Parts List for Digital I/O Module

| Item | Qty | Part Num | Title | Detail | Reference |
|---|---|---|---|---|---|
| 1 | 1 | 634-RA-20 | Socket, .100 | Socket, 20 Pos, Right Angle .100\ (Samtec) | J2 |
| 2 | 2 | 634-3-ST-08 | Header, .156 | Header, 8 Pos, Straight Locking .156 (Amp) | J4 |
| 3 | 1 | 634-2-RA-20 | Header Dual .100 | Header, 10 Pos Right Angle .100 Dual Row (Crane) | J1 |
| 4 | 1 | 6300-02-16 | Connector | Mod IV Hdr Shrded Dbl Row RT Ang 16 Pin (Amp) | J5 |
| 5 | 8 | 620207 | Relay | Relay Miniature 12 VDC 6A G6B-1174P-USDC12 (Omron) | K1-K8 |
| 6 | 1 | 540-ULN2803 | IC, Surface Mount | IC, 8 Channel Darlington Driver ULN2803A/LW (Allegro) | U2 |
| 7 | 2 | 540-OPTO-PS2801-4 | Optical | Opto Quad Isolator Surface Mount, PS2801-4 (NEC) | U4, U5 |
| 8 | 1 | 540-MC-87LPC762 | IC | IC Microcontroller P87LPC762BD SMD (Philips Semiconductor) | U1 |
| 9 | 1 | 540-7406 | IC, Surface Mount | IC, Surface Mount, HEX Inverter DM7406M (National) | U3 |
| 10 | 8 | 513001 | Diode | Diode, 1N4148, Surface Mount (Micro-Semi) | D9, D10, D11, D12, D13, D14, D15, D16 |
| 11 | 17 | 511000 | IC, Surface Mount | IC, Surface Mount, LED, Red (Lite-On) | LD1-LD17 |
| 12 | 1 | 400360 | PCB, Internod Relay and Input Board | PCB, Internod Relay and Input Board, Rev. A (National Tech.) | |
| 13 | 3 | 313-0-.1UF-50V | Surface Mount Multilayer Ceramic Chip Cap. | Cap .1 uF, 50 V, +/−10% (Panasonic) | C1, C2, C3 |
| 14 | 2 | 152102 | SIP Resistor, Surface Mount | SIP, Surface Mount, 8 Res. 1K, Isolated, SOP Pkg. (CTS) | RN1, RN2 |

TABLE 7-continued

Parts List for Digital I/O Module

| Item | Qty | Part Num | Title | Detail | Reference |
|---|---|---|---|---|---|
| 15 | 9 | 08-3-004.7K | Surface Mount Thick Film Chip Resistor | Resistor, 4.7K, ⅛ W, 5% (1206 5000 mag) (Panasonic) | R4, R5, R6, R7, R8, R9, R10, R11, R28 |
| 16 | 1 | 08-3-001.0K | Surface Mount Thick Film Chip Resistor | Resistor, 1K, ⅛ W, 5% (1206 5000 mag) (Panasonic) | R1 |
| 17 | 2 | 08-0-200 | Surface Mount Thick Film Chip Resistor | Resistor, 200, ⅛ W, 5%, 1206 (Panasonic) | R2, R3 |

Table 8 is a preferred net list for the digital I/O module. The net list provides a listing of connectivity between components located on the circuit board according to the reference designations corresponding to the components and pin numbers for the components shown in FIGS. 7A-7D.

TABLE 8

Net List for Digital I/O Module
NET NAME LIST FOR PCB Digital I/O Module Net name 00001, U1-9, R2-A;
Net name 00002, U1-10, R3-A;
Net name 00008, U4-7, LD10-1;
Net name GND, U1-5, U3-5, U3-13, U3-11, U3-9, C3-B, C1-B, LD9-1, J1-11, J1-12, J2-12, J2-11, U3-7;
Net name 00003, J5-16, RN1-7;
Net name 00004, J5-1, RN1-8;
Net name 00006, U1-7, J1-18, J2-17;
Net name 00010, LD1-1, U2-18, K1-2;
Net name VCC, U1-15, C3-A, C1-A, R28-B, R1-B, J1-10, J1-9, J2-10, J2-9, U3-14, R20-B;
Net name R10-B, R9-B, R11-B, J1-7, J1-8, J2-8, J2-7, R4-B, R6-B, R5-B, R8-B, R7-B, C2-A, U2-10, RN1-9, RN1-11, RN1-13, RN1-15, RN2-9, RN2-11, RN2-13, RN2-15, K2-3, K1-3, K3-3, K8-3, K7-3, K6-3, K5-3, K4-3;
Net name 00011, R4-A, LD1-2;
Net name 00072, J4-1, R12-A, C4-B, K1-4;
Net name BROIL, J1-5, J1-6, J2-6, J2-5, C2-B, U2-9, D10-2, D9-2, U4-8, U4-6, D11-2, D12-2, U4-2, U4-4, U5-2, D16-2, U5-6, U5-8, D13-2, D15-2, D14-2, U5-4,
Net name 00012, U2-17, LD2-1, K2-2;
Net name 00013, R5-A, LD2-2;
Net name 00007, J1-14, T1-1;
Net name 00085, K2-4, J4-3, R13-A, C5-B;
Net name 00017, K2-1, J4-4, R13-B, C5-A;
Net name 00019, U2-16, LD3-1, K3-2;
Net name 00020, R6-A, LD3-2;
Net name 00089, J4-5, K3-4, R14-A, C6-B;
Net name 00095, J4-7, K4-4, R15-A, C7-B;
Net name 00024, U1-16, U2-6;
Net name 00025, U2-15, LD4-1, K4-2;
Net name 00028, R7-A, LD4-2;
Net name 00014, U5-1, LD17-1;
Net name 00027, U1-17, U2-5;
Net name 00036, D9-1, LD10-2, RN1-10;
Net name 00030, J4-8, K4-1, R15-B, C7-A;
Net name 00031, U1-3, U4-12, U5-12;
Net name 00032, U2-14, LD5-1, K5-2;
Net name 00033, R8-A, LD5-2;
Net name 00034, J4-10, K5-4, R16-A, C8-B;
Net name 00035, K5-1, J4-9, R16-B, C8-A;
Net name 00038, D10-1, LD11-2, RN1-12;
Net name 00116, J4-2, R12-B, C4-A, K1-1;
Net name 00037, LD6-1, U2-13, K6-2;
Net name 00039, R9-A, LD6-2;
Net name 00040, J4-12, K6-4, R17-A, C9-B;
Net name 00041, K6-1, J4-11, R17-B, C9-A;
Net name 00042, D11-1, LD12-2, RN1-14;
Net name 00043, LD7-1, U2-12, K7-2;
Net name 00044, R10-A, LD7-2;
Net name 00045, J4-14, K7-4, R18-A, C10-B;
Net name 00046, K7-1, J4-13, R18-B, C10-A;
Net name 00047, D12-1, LD13-2, RN1-16;
Net name 00048, LD8-1, U2-11, K8-2;
Net name 00009, J1-16, T2-1;
Net name 00049, R11-A, LD8-2;
Net name 00050, J4-16, K8-4, R19-A, C11-B;

TABLE 8-continued

Net List for Digital I/O Module
NET NAME LIST FOR PCB Digital I/O Module

Net name 00051, K8-1, J4-15, R19-B, C11-A;
Net name 00052, LD14-2, D13-1, RN2-10;
Net name 00005, R2-B, J1-13, J2-13;
Net name 00000, J1-19, 12-19, U3-1;
Net name J1-3, J1-4, J2-3, J2-4;
Net name 00015, J1-20, T3-1;
Net name 00016, J2-14, T4-1;
Net name 00021, J2-16, T5-1;
Net name 00087, U1-13, U2-8;
Net name BROIL, J1-1, J1-2, J2-2, J2-1;
Net name 00053, J1-17, U1-8;
Net name 00054, R1-A, LD9-2;
Net name 00055, LD15-2, D14-1, RN2-12;
Net name 00026, J2-20, T6-1;
Net name 00056, U4-5, LD11-1;
Net name 00057, J5-15, RN1-5;
Net name 00058, J5-2, RN1-6;
Net name 00059, U4-3, LD12-1;
Net name 00060, J5-14, RN1-3;
Net name 00061, J5-3, RN1-4;
Net name 00062, U4-1, LD13-1;
Net name 00063, J5-13, RN1-1;
Net name 00064, J5-4, RN1-2;
Net name 00065, LD14-1, U5-7;
Net name 00066, J5-12, RN2-7;
Net name 00067, J5-5, RN2-8;
Net name 00068, LD15-1, U5-5;
Net name 00069, J5-11, RN2-5;
Net name 00070, J5-6, RN2-6;
Net name 00071, U5-3, LD16-1;
Net name 00073, J5-10, RN2-3;
Net name 00074, J5-7, RN2-4;
Net name 00076, J5-9, RN2-1;
Net name 00077, J5-8, RN2-2;
Net name 00078, R28-A, U3-4, U5-15, U5-11, U5-9, U5-13;
Net name 00079, U1-11, U3-3, U4-9, U4-11, U4-15, U4-13;
Net name 00080, U1-12, U4-16, U5-16;
Net name 00081, U1-2, U4-14, U5-14;
Net name 00082, D15-1, LD16-2, RN2-14;
Net name 00083, U1-4, U4-10, U5-10, R20-A;
Net name 00086, R3-B, J1-15, J2-15;
Net name 00088, U1-14, U2-7;
Net name 00084, D16-1, LD17-2, RN2-16;
Net name 00090, J4-6, K3-1, R14-B, C6-A;
Net name 00091, U1-18, U2-4;
Net name 00092, U1-19, U2-3;
Net name 00093, U1-20, U2-2;
Net name 00094, U1-1, U2-1.

Detailed Description of the Temperature Sensor Module

FIG. 1 shows the temperature module 24. Multiple temperature sensor modules may be attached to the same system. The temperature sensor module 24 preferably accommodates up to 8 resistive thermal device (RTD) temperature probes. The computer module 10 preferably reads the temperatures via the I²C bus.

FIGS. 8A-8F show a preferred temperature module circuit board schematic formed in accordance with the present invention. RN1 and capacitors C10-C17 form a filter bias network for the temperature probes. MM74HC4051 U4 is a Multiplexer that selects one of 8 temperature probes. U3 is an amplifier that preferably amplifies the temperature probe voltage. Analog-to-digital converter MCP3201SN U2 converts the analog voltage to digital data. Microcontroller 87LPC762 U1 drives U2 and U4. The data is then transmitted to the computer module via the I²C bus.

Multiple modules may be plugged into the system. The modules are addressed using auto address-in signal J1-17 and auto address-out signal J2-17. The auto-addressing scheme is described below.

Table 9 is a preferred parts list for the temperature sensor module shown in FIGS. 8A-8F.

Parts List for Temperature Sensor Module

| Item | Qnty | Part Number | Title | Detail | Reference |
| --- | --- | --- | --- | --- | --- |
| 1 | 1 | 634-RA-20 | Socket, .100 | Socket, 20 Pos, Right Angle .100 (Samtec) | J2 |
| 2 | 1 | 634-2-RA-20 | Header Dual .100 | Header, 10 Pos Right Angle .100 Dual Row | J1 |

-continued

Parts List for Temperature Sensor Module

| Item | Qnty | Part Number | Title | Detail | Reference |
|---|---|---|---|---|---|
| 3 | 1 | 634-1-ST-02 | Header, .100 | Header, 2 Pos Straight .100 (Crane) | JP1 |
| 4 | 1 | 6300-02-16 | Connector | Mod IV Hdr Shrded Dbl Row RT Ang 16 Pin (Amp) | J4 |
| 5 | 1 | 540-MC-87LPC762 | IC | IC Microcontroller P87LPC762BD SMD (Philips Semiconductor) | U1 |
| 6 | 1 | 540-AMP-INA155 | IC, Surface Mount | IC, Surface Mount, Instrumentation Amplifier (Burr-Brown) | U3 |
| 7 | 1 | 540-AD-3201 | IC, SURFACE MOUNT | IC, A/D 12 BIT 1 CHANNEL, MCP3201CI/SN (Micro Chip) | U2 |
| 8 | 1 | 540-74HC4051 | IC | IC 8-Channel Multiplexer, MM74HC4051M (Fairchild) | U4 |
| 9 | 1 | 540-24LC16 | IC | IC Ram, 16K(2Kx8) Serial EEPROM 24LC16/SN (Micro Chip) | U5 |
| 10 | 1 | 531004 | Voltage Regulator | Voltage Reg, Shunt Reference, LM4050CIM3-4.1 (National) | VR1 |
| 11 | 1 | 511000 | IC, Surface Mount | IC, Surface Mount, LED, Red (Lite-On) | LD1 |
| 12 | 1 | 400380 | PCB, Intemod RTD Board | PCB, Intemod RTD Board, Rev. A | |
| 13 | 3 | 314-2-10UF-16V | Surface Mount Tantalum Electrolytic Chip Cap. | Cap 10 uF, 16 V, +/−20% (Panasonic) | C2, C4, C6 |
| 14 | 13 | 313-0-.1UF-50V | Surface Mount Multilayer Ceramic Chip Cap. | Cap .1 uF, 50 V, +/−10% (Panasonic) | C3, C5, C7-C17 |
| 15 | 1 | 152473 | SIP Resistor, Surface Mount | SIP, Surface Mount, 15 Res. 47K, Bussed, SOP Pkg. (CTS) | RN1 |
| 16 | 1 | 08-3-001.0K | Surface Mount Thick Film Chip Resistor | Resistor, 1K, ⅛ W, 5% (1206 5000 mag) (Panasonic) | R1 |
| 17 | 2 | 08-0-200 | Surface Mount Thick Film Chip Resistor | Resistor, 200, ⅛ W, 5%, 1206 (Panasonic) | R8, R9 |
| 18 | 2 | 07-3-010.0K | Surface Mount Thick Film Chip Resistor | Resistor, 10.2K, ⅛ W, 1% (1206 5000 mag) (Panasonic) | R4, R5 |
| 19 | 1 | 07-3-002.7K | Surface Mount Thick Film Chip Resistor | Resistor, 2.7K, ⅛ W, 1% (1206) (Panasonic) | R2 |
| 20 | 2 | 07-3-001.0K | Surface Mount Thick Film Chip Resistor | Resistor, 1.0K, ⅛ W, 1% (1206 5000 mag) (Panasonic) | R6, R7 |

Table 10 is a preferred net list for the temperature sensor module 14. The net list provides a listing of connectivity between components located on the circuit board according to the reference designations corresponding to the components and pin numbers for the components shown in FIGS. 8A-8F.

TABLE 10

Net List for Temperature Sensor Module
NET NAME FOR PCB 400380

Net name 00001, J2-14, JP2-2;
Net name 00033, T5-1, U1-8;
Net name 00022, U1-17, U4-11;
Net name GND, TP2-1, U5-7, U1-5, U2-3, U2-4, J1-12, J1-11, LD1-1, J2-12, J2-11, VR1-2, C3-B, C5-B, C1-B, C2-2, C4-2, C7-B, C9-B, C6-2, U3-5, U3-4, R7-A, R6-A, U4-8, U4-7, U4-6, J4-4, J4-3, J4-2, C16-B, C15-B, C14-B, C10-B, C11-B, C12-B, C13-B, J4-6, J4-7, J4-8, J4-5, C17-B, J4-1, U5-4;
Net name 00023, U5-2, U1-12;
Net name 00019, R4-A, U4-3;
Net name 00020, R7-B, JP1-2;
Net name 00027, J1-13, J2-13, R9-B;
Net name VCC, U1-15, U2-8, J1-10, J1-9, R1-B, J2-10, J2-9, R2-B, C3-A, C1-A, C2-1, C7-A, C9-A, C6-1, U3-7, U4-16, U5-8;
Net name +14 V, J1-8, J1-7, J2-7, J2-8;
Net name +14 V-BROIL, J1-5, J1-6, J2-6, J2-5;
Net name V_REF, RN1-16, U2-1, R2-A, VR1-1, C5-A, C4-1;
Net name 00000, J1-19, J2-19;
Net name +24 V, J1-3, J1-4, J2-3, J2-4;
Net name +24 V-BROIL, J1-1, J1-2, J2-2, J2-1;
Net name 00053, U1-6, J1-17;
Net name 00054, R1-A, LD1-2;
Net name 00060, U1-20, U2-6;
Net name 00086, U5-6, U1-10, R8-A;
Net name 00062, U1-19, U2-7;

TABLE 10-continued

Net List for Temperature Sensor Module
NET NAME FOR PCB 400380

Net name 00002, J2-16, JP2-4;
Net name 00003, J2-20, JP2-6;
Net name 00004, J1-14, JP2-1;
Net name 00010, J1-20, JP2-5;
Net name 00011, J1-16, JP2-3;
Net name 00021, T1-1, U1-18;
Net name 00013, U1-7, J1-18, J2-17;
Net name 00014, U1-14, U4-9;
Net name 00015, RN1-1, J4-9, U4-13, C10-A;
Net name 00026, U5-5, U1-9, R9-A;
Net name 00028, J1-15, R8-B, J2-15;
Net name 00005, U4-14, C11-A, RN1-2, J4-10;
Net name 00006, U1-16, U4-10;
Net name 00016, U4-15, C12-A, RN1-3, J4-11;
Net name 00024, U5-3, U1-13;
Net name 00018, U4-12, C13-A, RN1-4, J4-12;
Net name 00032, U4-1, C14-A, J4-13, RN1-5;
Net name 00025, U5-1, U1-11;
Net name 00034, U4-5, C15-A, RN1-6, J4-14;
Net name 00029, T2-1, U1-2;
Net name 00036, U4-2, C16-A, RN1-7, J4-15;
Net name 00030, T3-1, U1-3;
Net name 00038, U4-4, RN1-8, J4-16, C17-A;
Net name 00039, TP1-1, U2-2, U3-6;
Net name 00031, T4-1, U1-4;
Net name 00007, U3-8, U3-1, R3-2, R3-1;
Net name 00008, R4-B, C8-A, U3-3;
Net name 00009, R5-B, C8-B, U3-2;
Net name 00017, U1-1, U2-5;
Net name 00012, R5-A, R6-B, JP1-1, RN1-15.

Detailed Description of the Pressure Sensor Module

FIG. 1 shows the pressure sensor module 26 in the system. The pressure sensor module 26 preferably measures gas pressure and liquid pressures in the 0-15 PSI range.

FIGS. 9A-9D show a preferred pressure sensor module circuit board schematic formed in accordance with the present invention. Four pressure sensors MPX2010GP-O PS1-PS4 are preferably mounted on one pressure module 26. The signals from the pressure sensors are fed into a multiplexer 74HC4052 U5 and amplified by amplifiers INA155U U4 and OPA2336 U3a. Amplifier OPA2336 U3b injects offset voltage to compensate for the zero pressure offset voltage of the device. Converter MCP32015N U2 converts analog voltages to digital data. Microprocessor 87LPC762 U1 selects the multiplexer channels and drives the converter U2. The digital values read by the processor U1 are buffered and, when commanded, the numbers are sent to the computer module 10 via the I²C bus.

EPROM 24LC16 U6 preferably contains the calibration information for the pressure module 26. This allows the board to be moved from system to system while retaining offset and gain calibration parameters.

Multiple modules may be plugged into the system. The modules are addressed using auto address-in signal J1-17 and auto address-out signal J2-17. The auto-addressing scheme is described below.

Table 11 is a preferred parts list for the pressure sensor module 26 shown in FIGS. 9A-9D.

TABLE 11

Parts List for Pressure Sensor Module

| Item | Qty | Part | Title | Detail | Reference |
|---|---|---|---|---|---|
| 1 | 1 | 634-RA-20 | Socket, .100 | Socket, 20 Pos, Right Angle .100 (Samtec) | J2 |
| 2 | 1 | 634-2-ST-06 | Header, Dual .100 | Header, 6 Pos Straight .100 Dual Row (Crane) | JP1 |
| 3 | 1 | 634-2-RA-20 | Header Dual .100 | Header, 10 Pos Right Angle .100 Dual Row (Crane) | J1 |
| 4 | 2 | 580003 | Sensor | Pressure Sensor PCB Mount 1.5 PSI (Motorola) | PS1, PS2 |
| 5 | 1 | 540-MM74HC4052 | IC, Surface Mount | IC, Dual 4-Channel Analog Multiplexer MM74HC4052M (Fairchild) | U5 |
| 6 | 1 | 540-MC-87LPC762 | IC | IC Microcontroller P87LPC762BD SMD (Philips Semiconductor) | U1 |
| 7 | 1 | 540-AMP-OPA2336 | IC, Surface Mount | IC, Surface Mount, Cmos Dual OpAmp, OPA2336 (Burr-Brown) | U3 |
| 8 | 1 | 540-AMP-INA155 | IC, Surface Mount | IC, Surface Mount, Instrumentation Amplifier (Burr-Brown) | U4 |

TABLE 11-continued

Parts List for Pressure Sensor Module

| Item | Qty | Part | Title | Detail | Reference |
|------|-----|------|-------|--------|-----------|
| 9 | 1 | 540-AD-3201 | IC, SURFACE MOUNT | IC, A/D 12 BIT 1 CHANNEL, MCP3201CI/SN (Micro-Chip) | U2 |
| 10 | 1 | 540-24LC16 | IC | IC Ram, 16K(2Kx8) Serial EEPROM 24LC16/SN (Micro-Chip) | U6 |
| 11 | 1 | 531004 | Voltage Regulator | Voltage Reg, Shunt Reference, LM4050CIM3-4.1 (National) | VR1 |
| 12 | 1 | 511000 | IC, Surface Mount | IC, Surface Mount, LED, Red (Lite-On) | LD1 |
| 13 | 1 | 400385 | PCB, Intemod Pressure Board | PCB, Intemod Pressure Board, Rev. A (National Tech.) | |
| 14 | 3 | 314-2-10UF-16V | Surface Mount Tantalum Electrolytic Chip Cap. | Cap 10 uF, 16 V, +/−20% (Panasonic) | C8, C9, C10 |
| 15 | 7 | 313-0-.1UF-50V | Surface Mount Multilayer Ceramic Chip Cap. | Cap .1 uF, 50 V, +/−10% (Panasonic) | C1, C2, C3, C4, C5, C6, C7 |
| 16 | 1 | 313-0-.01UF-50V | Surface Mount Multilayer Ceramic Chip Cap. | Cap .01 uF, 50 V, +/−10% (Panasonic) | C11 |
| 17 | 2 | 08-3-010.0K | Surface Mount Thick Film Chip Resistor | Resistor, 10K, ⅛ W, 5% (1206 5000 mag) (Panasonic) | R10, R11 |
| 18 | 1 | 08-3-001.0K | Surface Mount Thick Film Chip Resistor | Resistor, 1K, ⅛ W, 5% (1206 5000 mag) (Panasonic) | R1 |
| 19 | 2 | 08-0-200 | Surface Mount Thick Film Chip Resistor | Resistor, 200, ⅛ W, 5%, 1206 (Panasonic) | R3, R4 |
| 20 | 1 | 07-3-030.1K | Surface Mount Thick Film Chip Resistor | Resistor, 30.1K, ⅛ W, 1% (Panasonic) | R6 |
| 21 | 2 | 07-3-02.49K | Surface Mount Thick Film Chip Resistor | Resistor, 2.49K, ⅛ W, 1% (Panasonic) | R5, R7 |
| 22 | 1 | 07-3-012.7K | Surface Mount Thick Film Chip Resistor | Resistor, 12.7K, ⅛ W, 1% (Panasonic) | R8 |
| 23 | 1 | 07-3-002.7K | Surface Mount Thick Film Chip Resistor | Resistor, 2.7K, ⅛ W, 1% (1206) (Panasonic) | R2 |
| 24 | 2 | 07-3-001.0K | Surface Mount Thick Film Chip Resistor | Resistor, 1.0K, ⅛ W, 1% (1206 5000 mag) (Panasonic) | R9 |
| 25 | 4 | 011800 | Hardware | Nylon Key-Hole Clip | PS1, PS2 |
| 26 | 1 | 011000 | Hardware | Plastic Rod .125" dia. (8' Lengths) | PS1, PS2 (CUT TO 2.40") |

Table 12 is a preferred net list for the pressure sensor module 26. The net list provides a listing of connectivity between components located on the circuit board according to the reference designations corresponding to the components and pin numbers of the components shown in FIGS. 9A-9D.

TABLE 12

Net List for Pressure Sensor Module
NET NAME FOR PCB 400385

Net name 00005, U5-3, R10-A;
Net name 00000, U1-18, T1-1;
Net name 00001, U1-14, T6-1;
Net name GND, U1-5, U6-7, C6-B, C1-B, U2-3, U2-4, TP4-1, U3-4, R9-A, C2-B, C3-B, C9-2, J1-12, J1-11, LD1-1, VR1-2, J2-12, J2-11, C7-B, C8-2, PS1-1, PS2-1, U4-4, U5-6, U5-8, U5-7, C4-B, C5-B, C10-2, J3-1, J4-1, U6-4;
Net name 00002, U1-8, T5-1;
Net name 00006, U5-13, R11-A;
Net name +V1, U2-1, R8-B, R2-A, VR1-1, C7-A, C8-1, PS1-3, PS2-3, J3-3, J4-3;
Net name +14 V, J1-7, J1-8, J2-8, J2-7;
Net name VCC, U1-15, C6-A, C1-A, U2-8, U3-8, C2-A, C3-A, C9-1, R1-B, J1-10, J1-9, R2-B, J2-9, J2-10, U4-7, U5-16, C4-A, C5-A, C10-1, U6-8;
Net name +14 V-BROIL, J1-6, J1-5, J2-6, J2-5;
Net name +24 V, J1-4, J1-3, J2-3, J2-4;
Net name 00012, U2-2, TP3-1, U3-1, R6-B;
Net name +24 V-BROIL, J1-2, J1-1, J2-2, J2-1;
Net name 00036, JP1-2, J2-14;
Net name 00037, JP1-4, J2-16;
Net name 00057, U5-11, J4-4;
Net name 00038, JP1-6, J2-20;
Net name 00060, U1-20, U2-6;

TABLE 12-continued

Net List for Pressure Sensor Module
NET NAME FOR PCB 400385

Net name 00086, U1-10, U6-6, R3-A;
Net name 00062, U1-19, U2-7;
Net name 00040, JP1-5, J1-20;
Net name 00041, JP1-3, J1-16;
Net name 00042, U1-7, J1-18, J2-17;
Net name 00043, J1-19, J2-19;
Net name 00044, U1-6, J1-17;
Net name 00045, R1-A, LD1-2;
Net name 00058, U5-15, J3-4;
Net name 00014, U3-3, R5-B;
Net name 00026, U1-9, U6-5, R4-A;
Net name 00046, R4-B, J1-13, J2-13;
Net name 00015, U3-2, R6-A, R7-B;
Net name 00022, U1-11, U6-1;
Net name 00019, R8-A, R9-B, U3-5;
Net name 00020, U3-7, U3-6, U4-5, R7-A;
Net name 00018, U1-12, U6-2;
Net name 00021, U1-13, U6-3;
Net name 00047, R3-B, J1-15, J2-15;
Net name 00048, JP1-1, J1-14;
Net name 00051, PS2-4, U5-14;
Net name 00052, PS1-4, U5-12;
Net name 00053, U5-4, J4-2;
Net name 00054, J3-2, U5-2;
Net name 00039, U4-6, R5-A;
Net name 00055, PS2-2, U5-5;
Net name 00056, PS1-2, U5-1;
Net name 00059, U1-16, U5-9;
Net name 00003, U1-4, T4-1;
Net name 00063, U1-17, U5-10;
Net name 00004, U1-3, T3-1;

TABLE 12-continued

Net List for Pressure Sensor Module
NET NAME FOR PCB 400385

Net name 00007, U4-8, U4-1;
Net name 00008, U4-3, R10-B, C11-A;
Net name 00009, U4-2, C11-B, R11-B;
Net name 00017, U1-1, U2-5;
Net name 00010, U1-2, T2-1.

Detailed Description of the Motor Control Module

FIG. 1 shows the motor control module 28 in accordance with the present invention. The motor control module 28 preferably supplies a voltage directly to 12-24VCD motors. The motor may be run forward or reverse. The speed is sensed and may be tightly controlled with the computer module 10.

FIGS. 10A-10E show a preferred motor control module circuit board schematic formed in accordance with the present invention. The motor connects directly to connector TB1A-TB1C. Transistor STP45NE05 Q1 switches the motor to ground preferably in a pulse width modulation mode. Connector TB1E-TB1D preferably provides the encoder input. Buffers 7406 U2 drive a motor pulse width modulation signal PWM to drive transistor Q1. Relay K1 preferably reconnects the motor windings to allow the motor to reverse direction on command.

The encoder is attached to the motor shaft and preferably feeds back a frequency proportional to motor speed. Relays K2 and K3 are spare relays.

Microprocessor P87LCP762BD U1 receives motor set speed data from the computer module 10 via the I²C bus. The actual speed is transmitted to the computer module 10.

Multiple modules may be plugged into the system. The modules are addressed using auto address in-signal J1-17 and auto address out-signal J2-17. The auto-addressing scheme is described below.

Table 13 is a preferred parts list for the motor control module 28 shown in FIGS. 10A-10E.

TABLE 13

Parts List for Motor Control Module

| Item | Qty | Part | Title | Detail | Reference |
|---|---|---|---|---|---|
| 1 | 1 | 663022 | Terminal Block | Terminal Block, Plug 6 Pin (Weidmuller) | TB1 |
| 2 | 1 | 663021 | Terminal Block | Terminal Block, Header 6 Pin (Weidmuller) | TB1 |
| 3 | 1 | 634-RA-20 | Socket, .100 | Socket, 20 Pos, Right Angle .100 (Samtec) | J2 |
| 4 | 1 | 634-3-ST-06 | Header, .156 | Header, 6 Pos, Straight Locking .156 (Crane) | J3 |
| 5 | 1 | 634-2-ST-06 | Header, Dual .100 | Header, 6 Pos Straight .100 Dual Row (Crane) | JP1 |
| 6 | 1 | 634-2-RA-20 | Header Dual .100 | Header, 10 Pos Right Angle .100 Dual Row (Crane) | J1 |
| 7 | 3 | 620235 | Relay | Relay 12VDC DPDT 8A/30VDC contact (Omron) | K1, K2, K3 |
| 8 | 1 | 561000 | Crystal | Crystal, Surface Mount, 11.0592 MHZ, Quartz (Citizen) | Y1 |
| 9 | 1 | 550016 | Transistor | Transistor Fet, STP45NE06 (Motorola) | Q1 |
| 10 | 1 | 540-MC-87LPC762 | IC | IC Microcontroller P87LPC762BD SMD (Philips Semiconductor) | U1 |
| 11 | 1 | 540-7407 | IC, Surface Mount | IC, Surface Mount, HEX Inverter DM7407M (National) | U3 |
| 12 | 1 | 540-7406 | IC, Surface Mount | IC, Surface Mount, HEX Inverter DM7406M (National) | U2 |
| 13 | 1 | 513002 | Diode | Diode, 1N5819MCT, Surface Mount (Diodes Inc.) | D5 |
| 14 | 3 | 513001 | Diode | Diode, 1N4148, Surface Mount (Micro-chip) | D1, D2, D3 |
| 15 | 6 | 511000 | IC, Surface Mount | IC, Surface Mount, LED, Red (Lite-On) | LD1, LD2, LD3, LD4, LD5, LD6 |
| 16 | 1 | 400502 | PCB, I/O and Relay Board, Add-On | PCB, I/O and Relay Board, (Jet Technology) | |
| 17 | 1 | 314-2-10UF-16V | Surface Mount Tantalum Electrolytic Chip Cap. | Cap 10 uF, 16 V, +/−20% (Panasonic) | C8 |
| 18 | 2 | 313-2-27PF-50V | Surface Mount Multilayer Ceramic Chip Cap. | Cap 27 pF, 50 V, +/−5% (Panasonic) | C2, C3 |
| 19 | 4 | 313-0-.1UF-50V | Surface Mount Multilayer Ceramic Chip Cap. | Cap .1 uF, 50 V, +/−10% (Panasonic) | C4, C5, C6, C7 |
| 20 | 1 | 306-4-2200UF-50V | Cap., Electrolytic, Radial | Cap, 2200 uF, 20%, 50 V (Panasonic) | C1 |
| 21 | 1 | 121000 | Fuse | Fuse Resetable, 1.1 A Surface Mount PTC (Little Fuse) | F1 |

TABLE 13-continued

Parts List for Motor Control Module

| Item | Qty | Part | Title | Detail | Reference |
|------|-----|------|-------|--------|-----------|
| 22 | 5 | 08-3-004.7K | Surface Mount Thick Film Chip Resistor | Resistor, 4.7K, ⅛ W, 5% (1206 5000 mag) (Panasonic) | R5, R8, R9, R10, R11 |
| 23 | 1 | 08-3-002.7K | Surface Mount Thick Film Chip Resistor | Resistor, 2.7K, ⅛ W, 5% (1206) (Panasonic) | R4 |
| 24 | 1 | 08-3-001.0K | Surface Mount Thick Film Chip Resistor | Resistor, 1K, ⅛ W, 5% (1206 5000 mag) (Panasonic) | R1 |
| 25 | 2 | 08-0-200 | Surface Mount Thick Film Chip Resistor | Resistor, 200, ⅛ W, 5%, 1206 (Panasonic) | R2, R3 |
| 26 | 2 | 08-0-100 | Surface Mount Thick Film Chip Resistor | Resistor, 100, ⅛ W, 5%, 1206 (Panasonic) | R6, R7 |

Table 16 is a preferred net list for the motor control module 28. The net list provides a listing of connectivity between components located on the circuit board according to the reference designations corresponding to the components and pin numbers for the components shown in FIGS. 10A-10E.

TABLE 16

Net List for Motor Control Module
NET NAME LIST FOR PCB 400502

Net name 00090, U3-2, U1-11;
Net name 00011, R5-A, LD2-2;
Net name 00001, J2-14, JP1-2;
Net name GND, U3-3, U2-5, U2-3, U2-1, C3-B, C2-B, C4-B, C5-B, C6-B, U1-5, LD1-1, J1-12, J1-11, J2-11, J2-12, C8-2, C7-B, TB1-4;
Net name 00089, U1-17, U3-13;
Net name RELAY_SYNC_IN, U1-12, J1-20, JP1-5;
Net name +24 V, J1-3, J1-4, J2-3, J2-4, C1-PLUS, F1-2;
Net name AUTO_ADDR_OUT, U1-2, J1-18, J2-17;
Net name VCC, C4-A, C5-A, C6-A, U1-15, U1-4, R1-B, J1-9, J1-10, J2-9, J2-10, R7-B, U2-14, U3-14;
Net name +14 V, J1-7, J1-8, J2-7, J2-8, R9-B, R10-B, R11-B, K3-1, J3-1, D3-1, R4-B, ;R5-B, R8-B, D2-1, K2-1, K1-1, D1-1;
Net name 00008, LD6-1, U3-12, J3-2;
Net name 00091, U1-13, T1-1;
Net name 00085, U1-9, R2-A;
Net name 00004, U1-20, T2-1;
Net name 00046, U3-6, LD3-1, D2-2, K2-16;
Net name 00016, LD5-1, U3-10, J3-3;
Net name +24 V-BROIL, J1-2, J1-1, J2-1, J2-2, C1-MINUS, Q1-3;
Net name 00045, D4-1, D5-K, F1-1, K1-6, K1-9;
Net name 00042, K3-8, K3-9, J3-5;
Net name 00012, LD6-2, R11-A;
Net name 00043, K3-4, K3-13, J3-4, K2-4, K2-13;
Net name 00013, LD5-2, R10-A;
Net name 00014, LD4-2, R9-A;
Net name 00055, U1-19, U3-9;
Net name 00024, R4-A, U2-8, Q1-1;
Net name 00027, LD2-1, U2-10, K1-16, D1-2;
Net name 00026, D4-2, D5-A, Q1-2, K1-8, K1-11;
Net name 00025, K1-13, TB1-1;
Net name 00028, K1-4, TB1-2;
Net name 00033, C2-A, Y1-1, U1-7;
Net name 00034, C3-A, Y1-2, U1-6;
Net name 00015, LD3-2, R8-A;
Net name 00048, R6-A, TB1-6;
Net name +14 V-BROIL, J1-5, J1-6, J2-5, J2-6, U2-7, U3-7;
Net name 00044, J3-6, K2-8, K2-9;
Net name 00041, LD4-1, U3-8, K3-16, D3-2;
Net name 00018, U1-14, U3-5;
Net name 00073, J1-16, JP1-3;
Net name 00074, U1-3, J1-17;
Net name 00023, U1-18, U2-9;
Net name 00075, U1-16, J2-20, JP1-6, U3-11;

TABLE 16-continued

Net List for Motor Control Module
NET NAME LIST FOR PCB 400502

Net name 00076, J1-14, JP1-1;
Net name 00078, U1-10, R3-A;
Net name 00080, R2-B, J1-13, J2-13;
Net name 00002, R6-B, U2-13;
Net name 00040, U1-1, U2-11;
Net name 00082, R3-B, J1-15, J2-15;
Net name 00083, J2-16, JP1-4;
Net name 00084, R1-A, LD1-2;
Net name 00086, U3-1, J1-19, J2-19;
Net name 00009, U1-8, U2-12;
Net name EARTH, TB1-3, T4-1;
Net name 00007, C8-1, R7-A, TB1-5, C7-A.

Detailed Description of the RS-232 Expansion Module

FIG. 1 shows additional modules 30 plugging into the system in accordance with the present invention. The RS-232 expansion module is preferably one example of an additional module 30. The RS-232 expansion module preferably includes two RS-232 ports.

FIGS. 11A-11D show a preferred RS-232 expansion module circuit board schematic in accordance with the present invention. Two RJ11 connectors J3 and J4 are preferably used to connect external computers to the system. RS-232 transceiver U3 level shifts the data from +5 levels to +/−10 volt RS-232 levels.

87LPC762BD U1 and U2 are microprocessors that contain UARTs that are programmed to receive data at baud rates programmed by the computer module 10. The data is transmitted using the I²C bus.

Multiple modules may be plugged into the system. The modules are addressed using auto address-in signal J1-17 and auto address-out signal J2-17. The auto-addressing scheme is described below.

Table 15 is a preferred parts list for the RS-232 expansion module shown in FIGS. 11A-11D.

TABLE 15

Parts List for the RS-232 Expansion Module

| Item | Qnty | Part Number | Title | Detail | Reference |
|---|---|---|---|---|---|
| 1 | 1 | 634-RA-20 | Socket, .100 | Socket, 20 Pos, Right Angle .100 (Samtec) | J2 |
| 2 | 1 | 634-2-ST-06 | Header, Dual .100 | Header, 6 Pos Straight .100 Dual Row (Crane) | JP1 |
| 3 | 1 | 634-2-RA-20 | Header Dual .100 | Header, 10 Pos Right Angle .100 Dual Row (Crane) | J1 |
| 4 | 2 | 633-1-6X6-T | Connector | Phone Jack, 6x6 Top Entry Without Stops (Amp) | J3, J4 |
| 5 | 2 | 561000 | Crystal | Crystal, Surface Mount, 11.0592 MHZ, Quartz (Citizen) | Y1, Y2 |
| 6 | 1 | 540-RS-MAX232 | IC, Surface Mount | IC RS-232 Transmitter and Receiver, MAX232CSE (SGS Thompson) | U3 |
| 7 | 2 | 540-MC-87LPC762 | IC | IC Microcontroller P87LPC762BD SMD (Philips Semiconductor) | U1, U2 |
| 8 | 1 | 511000 | IC, Surface Mount | IC, Surface Mount, LED, Red (Lite-On) | LD1 |
| 9 | 1 | 400361 | PCB, Internod RS-232 Board | PCB, Internod RS-232t Board, Rev. A (National Tech.) | |
| 10 | 4 | 314-2-10UF-16V | Surface Mount Tantalum Electrolytic Chip Cap. | Cap 10 uF, 16 V, +/−20% (Panasonic) | C7, C8, C9, C10 |
| 11 | 4 | 313-2-27PF-50V | Surface Mount Multilayer Ceramic Chip Cap. | Cap 27 pF, 50 V, +/−5% (Panasonic) | C2, C3, C4, C5 |
| 12 | 3 | 313-0-.1UF-50V | Surface Mount Multilayer Ceramic Chip Cap. | Cap .1 uF, 50 V, +/−10% (Panasonic) | C1, C6, C11 |
| 13 | 1 | 08-3-001.0K | Surface Mount Thick Film Chip Resistor | Resistor, 1K, ⅛ W, 5% (1206 5000 mag) (Panasonic) | R1 |
| 14 | 2 | 08-0-200 | Surface Mount Thick Film Chip Resistor | Resistor, 200, ⅛ W, 5%, 1206 (Panasonic) | R2, R3 |

Table 16 is a preferred net list for the RS-232 expansion module. The net list provides a listing of connectivity between components located on the circuit board according to the reference designations corresponding to the components and pin numbers for the components shown in FIGS. 11A-11D.

TABLE 16

Net List for RS-232 Expansion Module
NET NAME LIST FOR PCB 400361

Net name GND, U3-15, U1-5, C2-B, C3-B, U2-5, C6-B, C4-B, C5-B, J1-12, J1-11, LD1-1, J2-11, J2-12, C1-B, C7-1, J3-2, J4-2, C11-B;
Net name VCC, U3-16, U1-15, U2-15, C6-A, J1-10, J1-9, R1-B, J2-10, J2-9, C1-A, C10-2, C11-A;
Net name +14 V, J1-7, J1-8, J2-8, J2-7;
Net name +14 V-BROIL, J1-6, J1-5, J2-6, J2-5;
Net name +24 V, J1-3, J1-4, J2-4, J2-3;
Net name +24 V-BROIL, J1-1, J1-2, J2-2, J2-1;
Net name 00001, J2-14, JP1-2;
Net name 00005, U3-11, U1-12;
Net name 00021, JP2-2, U2-3, J1-18, J2-17;
Net name 00002, J2-16, JP1-4;
Net name 00003, JP1-6, J2-20;
Net name 00004, J1-14, JP1-1;
Net name 00010, J1-20, JP1-5;
Net name 00011, J1-16, JP1-3;
Net name 00022, JP2-1, U1-3, U2-2;
Net name 00006, U3-10, U2-12;
Net name 00085, U1-9, U2-9, R2-A;
Net name 00075, U3-14, J3-4;
Net name 00007, J1-19, J2-19;
Net name 00008, U1-2, J1-17;
Net name 00009, R1-A, LD1-2;
Net name 00012, U1-10, U2-10, R3-A;
Net name 00014, J1-13, J2-13, R2-B;
Net name 00015, R3-B, J1-15, J2-15;
Net name 00013, U3-9, U2-11;

TABLE 16-continued

Net List for RS-232 Expansion Module
NET NAME LIST FOR PCB 400361

Net name 00033, Y1-1, U1-7, C2-A;
Net name 00034, Y1-2, U1-6, C3-A;
Net name 00016, Y2-1, U2-7, C4-A;
Net name 00017, Y2-2, U2-6, C5-A;
Net name 00018, U1-1, T3-1;
Net name 00019, U1-20, T10-1;
Net name 00023, U3-12, U1-11;
Net name 00138, U3-1, C9-1;
Net name 00143, U3-2, C10-1;
Net name 00069, U3-5, C8-2;
Net name 00073, U3-6, C7-2;
Net name 00074, U3-3, C9-2;
Net name 00076, U3-4, C8-1;
Net name 00020, U1-19, T9-1;
Net name 00026, U3-13, J3-3;
Net name 00028, U3-8, J4-3;
Net name 00027, U3-7, J4-4;
Net name 00024, U1-18, T8-1;
Net name 00025, U1-17, T7-1;
Net name 00029, U1-16, T6-1;
Net name 00030, U1-14, T5-1;
Net name 00031, U1-13, T4-1;
Net name 00032, U1-8, T1-1;
Net name 00035, U1-4, T2-1;
Net name 00036, U2-1, T11-1,
Net name 00045, U2-20, T14-1;
Net name 00046, U2-19, T15-1;
Net name 00047, U2-18, T16-1;
Net name 00048, U2-17, T17-1;
Net name 00049, U2-16, T18-1;
Net name 00050, U2-14, T19-1;
Net name 00051, U2-13, T20-1;
Net name 00052, U2-8, T13-1;
Net name 00053, U2-4, T12-1.

Detailed Description of Auto-addressing

FIG. 12 is a flow chart for auto-addressing formed in accordance with the present invention. On power up, each module type is initialized with a unique board type in the computer module in step 68, as shown in Table 17.

TABLE 17

Board Identifier Addresses

| Board Type | Identifier |
|---|---|
| 21 | Digital I/O Module |
| 32 | Temperature Module |
| 33 | Pressure Module |
| 43 | Motor Module |

Each I/O module processor preferably initializes the corresponding I²C port on the I/O module off in step 70. Each I/O module processor will then continuously check its auto address-in pin for a low or ground in step 72.

The power supply module will preferably have auto address-in pin grounded. This is preferably the first board to be addressed. When the I/O module processor detects the auto address-in pin low, the I²C port is activated in step 74.

The computer module has a table listing of the boards that are connected to the system. The computer module then preferably addresses the next board in the list in step 76. If the board responds with a correct message, the computer module sets the address to a sequential numeric address in step 78. If the board responds with an incorrect message, the computer module preferably halts and displays an error in step 80. The computer module preferably re-addresses the I/O board with its new address in step 82.

When the I/O module sets its new address, it preferably sets its auto address-out pin low in step 84, which signals the next board to activate its I²C port in step 86.

The computer module preferably checks its list, and if it is not finished, it continues through the address setting process until all the boards are addressed in step 88. This method allows for the I/O boards to have fixed identifiers with the ability to place multiple identical I/O boards on the bus. Because of external hookup considerations once the application forms the board list, the boards will preferably be placed in the same order each time.

Detailed Description of the Font Bit Map Conversion Method

FIG. 13 shows bitmap representations of part of the ANSI character set formed in accordance with the present invention. The entire character set is preferably generated for each height and font style required to be shown on the LCD display.

The characters are preferably placed on top of each other in the order of the ASCII character standard. A ruler 90 is preferably placed to the left for reference. Characters are spaced with two spaces above and one space below. In the top space of each character is placed a kerning dot 92. This kerning dot 92 is used to determine the length of each character to be drawn. The character set being drawn preferably determines the character height. The example is of a 10-pitch character height.

FIG. 14 shows the output of the conversion file alphabet, as formed in accordance with the present invention. A conversion program preferably reads the picture file and creates two arrays 94, 96 in hexadecimal format. The first line read is preferably the kerning bit. This bit is converted to the length of the picture of the character. This number is preferably written out. The next number is preferably the height of the character. The example hexadecimal 0xC0 is 10 decimal. The next 10 lines are preferably read and the bits are converted so that 1=pixel on and 0=pixel off. This continues through the file until the character set is converted.

The second array 96 is preferably created for the index of the beginning location of each character in the array. The letter W takes more array space than the letter I, so a second array is preferably created to account for the random number of bytes it takes to create a character.

The embedded system can then address a picture by indexing into the first array, which preferably provides the starting location of the beginning of the picture. This number is placed as a pointer into the picture array and then is drawn as a picture in the middle of the screen.

Description of LCD Drivers

The main software LCD drivers in the preferred embodiment are:

1—Auto write graphics to the entire screen; and
2—Write a portion of a graphic or icon starting at any xy pixel point, write across x number of pixels and down y number of pixels in positive or negative mode.

It is anticipated that the busses, such as the I²C bus, referred to above may be serial, parallel, wired, or wireless while remaining within the scope of the present invention.

The embedded control system formed in accordance with the present invention avoids many of the disadvantages inherent in systems utilizing a common backplane, which couples a plurality of boards. Backplanes, such as those used in VME (versamodule eurocard) bus systems, limit the number of boards or modules that may be connected to the backplane since only a predefined quantity of slots are provided. In addition, if fewer than this predefined quantity of boards are used, the connections left open on the backplane connectors are subject to noise caused by signal reflections due to lack of termination. Thus, by providing input and output connectors on the power supply module and input/output modules, any quantity of these modules may be serially coupled using ribbon cables, or the like without incurring the additional cost and limitations ordinarily imposed in backplane-based systems.

Although illustrative embodiments of the present invention have been described herein with reference to the accompanying drawing, it is to be understood that the invention is not limited to those precise embodiments and that various other changes and modifications may be effected therein by one skilled in the art without departing from the scope or spirit of the invention.

What is claimed is:

1. An integral embedded control system having generically applicable modules, the system comprising:
   a computer module;
   a display module, the display module being operatively coupled to the computer module by a first communication bus;
   a user input module, the user input module being operatively coupled to the computer module by a second communication bus;
   a power supply module, the power supply module being operatively coupled to the computer module by a third communication bus; and
   at least one input/output module, the at least one input/output module being operatively coupled to the power supply module and the third communication bus, the power supply module providing power to the computer module, display module, user input module, and the at least one input/output module, the at least one input/output module being adapted for operatively coupling at least one additional input/output module to the third communication bus, the computer module automatically identifying the at least one input/output module on the third communication bus in response to applying power to the integral embedded control system;

wherein the computer module includes an external communication port, the external communication port including at least one of an infrared port, a serial port, and a parallel port; and wherein the external communication port provides a communication link between the computer module and a handheld computer.

2. An integral embedded control system as defined by claim 1, wherein the display module includes a liquid crystal display adapted for displaying graphics.

3. An integral embedded control system as defined by claim 1, wherein the user input module includes a keyboard.

4. An integral embedded control system as defined by claim 1, wherein the computer module includes software, the software including at least one of an operating system, a device driver, and an application template, the application template including generic functions required by an application program.

5. An integral embedded control system as defined by claim 1, wherein at least two of the first communication bus, second communication bus, and third communication bus are substantially the same bus.

6. An integral embedded control system as defined by claim 1, wherein the at least one input/output module includes at least one of a digital input/output module, a temperature sensing module, a pressure sensing module, a motor control module, an RS-232 expansion module, an Ethernet module, and an Internet module.

7. An integral embedded control system as defined by claim 6, wherein the digital input/output module includes a microcontroller, at least one output relay, and at least one optocoupler, the at least one output relay and the at least one optocoupler being electrically coupled to the microcontroller, the at least one output relay being adapted for driving a load, the at least one optocoupler being adapted for inputting information from an external switch.

8. An integral embedded control system as defined by claim 6, wherein the temperature sensing module includes at least one filter, an amplifier, an analog-to-digital converter, and a microcontroller electrically coupled in series, the at least one filter inputting and filtering an analog signal representative of temperature, the amplifier electrically amplifying the filtered signal, the analog-to-digital converter converting the amplified analog signal to a digital signal, the microcontroller outputting a second digital signal representative of the converted digital signal to the third communication bus.

9. An integral embedded control system as defined by claim 6, wherein the pressure sensing module includes at least one pressure sensor, an amplifier, an analog-to-digital converter, and a microcontroller electrically coupled in series, the at least one pressure sensor outputting an analog signal representative of pressure, the amplifier electrically amplifying the analog signal, the analog-to-digital converter converting the amplified analog signal to a digital signal, the microcontroller outputting a second digital signal representative of the converted digital signal to the third communication bus.

10. An integral embedded control system as defined by claim 6, wherein the motor control module includes a microcontroller, a least one buffer, and at least one relay electrically coupled in series, the microcontroller inputting a digital command signal from the third communication bus, the microcontroller outputting a digital signal representative of at least one of motor speed, motor direction, and heater control to the at least one relay, the at least one buffer driving the digital signal between the microcontroller and the at least one relay, the microcontroller inputting a first digital signal representative of motor speed and outputting a second digital signal representative of the first digital signal to the third communication bus.

11. An integral embedded control system as defined by claim 6, wherein the RS-232 expansion module includes a microcontroller and an RS-232 transceiver electrically coupled to the microcontroller, the microcontroller and the RS-232 transceiver providing an external bidirectional RS-232 communication link to the third communication bus.

12. An integral embedded control system as defined by claim 6, wherein the keyboard module includes a port expander circuit and a plurality of switches electrically coupled to the port expander circuit, the port expander circuit inputting a switch signal representative of a state of the plurality of switches, the port expander circuit outputting a switch signal on the second communication bus representative of the state of the plurality of switches.

13. An integral embedded control system as defined by claim 1, wherein at least one of the first communication bus, second communication bus, and third communication bus is a serial bus.

14. A method of controlling equipment using an integral embedded control system having generically applicable modules, the method comprising the steps of:
providing a computer module;
coupling a display module to the computer module with a first communication bus;
coupling a user input module to the computer module by a second communication bus;
coupling a power supply module to the computer module with a third communication bus;
coupling at least one input/output module to the power supply module and the third communication bus, the power supply module providing power to the computer module, display module, user input module, and the at least one input/output module, the at least one input/output module being adapted for operatively coupling at least one additional input/output module to the third communication bus;
identifying the at least one input/output module on the third communication bus automatically in response to applying power to the integral embedded control system;
coupling an external communication port to the computer module, the external communication port including at least one of an infrared port, a serial port, and a parallel port and
communicating with a handheld computer through the external communication port.

15. A method of controlling equipment using an integral embedded control system having generically applicable modules as defined by claim 14, further including the step of providing software in the computer module, the software including at least one of an operating system, a device driver, and an application template, the application template including generic functions required by an application program.

16. A method of controlling equipment using an integral embedded control system having generically applicable modules as defined by claim 14, wherein the step of communicating with the handheld computer further includes the step of transferring a recipe from the handheld computer to the computer module through the external communication port.

17. A method of controlling equipment using an integral embedded control system having generically applicable modules as defined by claim 14, wherein the computer module includes memory, and wherein the step of communicating with the handheld computer further includes the step of programming the memory from the handheld computer through the external communication port.

18. A method of controlling equipment using an integral embedded control system having generically applicable modules as defined by claim 14, wherein the at least one input/output module includes at least one of a digital input/output module, a temperature sensing module, a pressure sensing module, a motor control module, an RS-232 expansion module, an Ethernet module, and an Internet module.

19. A method of controlling equipment using an integral embedded control system having generically applicable modules as defined by claim 14, wherein the step of identifying the at least one input/output module further includes the steps of:
- deactivating a communication port in response to power being applied to the integral embedded control system, the communication port being located on the at least one input/output module and coupled to the third communication bus;
- setting an address-in signal to a first state by the computer module;
- detecting whether the address-in signal is in the first state by the at least one input/output module;
- activating the communication port by the at least one input/output module in response to detecting the address-in signal being in the first state;
- outputting a query from the computer module on the third communication bus;
- storing a numeric address in the computer module representative of the at least one input/output module in response to receiving a correct reply to the query from the at least one input/output module on the third communication bus;
- displaying an error message in response to receiving an incorrect reply to the query from the at least one input/output module on the third communication bus;
- accessing the at least one input/output module using the numeric address;
- storing the numeric address in the at least one input/output module; and
- setting an address-out signal to a first state by the at least one input/output module in response to storing the numeric address in the at least one input/output module.

20. A method of controlling equipment using an integral embedded control system having generically applicable modules as defined by claim 19, further including the step of halting in response to receiving an incorrect reply to the query from the at least one input/output module on the third communication bus.

21. An oven controller, which comprises:
- a computer module, the computer module including software, the software including at least one of an operating system, a device driver, and an application template, the application template including generic functions required by an application program, computer module including at least one of an infrared port, a serial port, and a parallel port providing a communication link between the computer module and a handheld computer;
- a display module, the display module being operatively coupled to the computer module by a first communication bus;
- a keyboard module, the keyboard module being operatively coupled to the computer module by a second communication bus;
- a power supply module, the power supply module being operatively coupled to the computer module by a third communication bus; and
- at least one input/output module, the at least one input/output module including at least one of a digital input/output module, a temperature sensing module, a pressure sensing module, a motor control module, an RS-232 expansion module, an Ethernet module, and an Internet module, the at least one input/output module being operatively coupled to the power supply module and the third communication bus, the power supply module providing power to the computer module, display module, keyboard module, and the at least one input/output module, the at least one input/output module being adapted for operatively coupling at least one additional input/output module to the third communication bus, the computer module automatically identifying the at least one input/output module on the third communication bus in response to applying power to the integral embedded control system.

* * * * *